United States Patent [19]

Fukasawa

[11] Patent Number: 4,701,588
[45] Date of Patent: Oct. 20, 1987

[54] OSCILLATION CONTROL CIRCUIT OF AN INDUCTION HEATING APPARATUS

[75] Inventor: Minoru Fukasawa, Ohtsu, Japan

[73] Assignee: Sanyo Electric Co., Ltd., Osaka, Japan

[21] Appl. No.: 696,245

[22] Filed: Jan. 29, 1985

[30] Foreign Application Priority Data

| Feb. 9, 1984 | [JP] | Japan | 59-23729 |
| Feb. 13, 1984 | [JP] | Japan | 59-24691 |
| Feb. 13, 1984 | [JP] | Japan | 59-24692 |
| Apr. 20, 1984 | [JP] | Japan | 59-58737 |
| Jun. 13, 1984 | [JP] | Japan | 59-87659 |
| Jun. 20, 1984 | [JP] | Japan | 59-126917 |
| Jul. 17, 1984 | [JP] | Japan | 59-147764 |
| Aug. 9, 1984 | [JP] | Japan | 59-122143 |
| Oct. 8, 1984 | [JP] | Japan | 59-211001 |
| Nov. 19, 1984 | [JP] | Japan | 59-243876 |

[51] Int. Cl.⁴ .............................................. H05B 6/06
[52] U.S. Cl. ........................... 219/10.77; 219/10.49 R; 363/97; 323/283
[58] Field of Search ............ 219/10.77, 10.49 R, 219/10.75; 363/97, 98; 323/283

[56] References Cited

U.S. PATENT DOCUMENTS

| 4,174,496 | 11/1979 | McFall et al. | 323/283 |
| 4,308,443 | 12/1981 | Tucker et al. | |
| 4,344,121 | 8/1982 | Weber | 323/283 X |
| 4,352,000 | 9/1982 | Fujishima et al. | |
| 4,356,542 | 10/1982 | Bruckner et al. | 363/97 X |
| 4,413,224 | 11/1983 | Krupka et al. | 323/283 X |
| 4,453,068 | 6/1984 | Tucker et al. | 219/10.77 |
| 4,456,807 | 6/1984 | Ogino et al. | 219/10.77 |
| 4,471,196 | 9/1984 | Frank et al. | 219/10.77 |

FOREIGN PATENT DOCUMENTS 58-16493  1/1983  Japan .

Primary Examiner—Philip H. Leung
Attorney, Agent, or Firm—Wenderoth, Lind & Ponack

[57] ABSTRACT

This invention relates to an induction heating apparatus including a digitized control circuit and digitizing the ON/OFF control circuit for a switching element which has hitherto utilized the R-C time constant, thereby eliminating the defects, such as a change in the R-C time constant with the time ageing and non-stabilization of the heating output accompanied by a temperature change. Since the digitized control circuit can be a monolithic integrated circuit, the apparatus as a whole can be miniaturized or smaller in thickness and inexpensive to produce. Furthermore, the induction heating apparatus realizes by the digitized control circuit quick overcurrent protection, exact detection of unsuitable load, prevention of noise generation, and facility of design corresponding to various power supply voltage.

21 Claims, 48 Drawing Figures

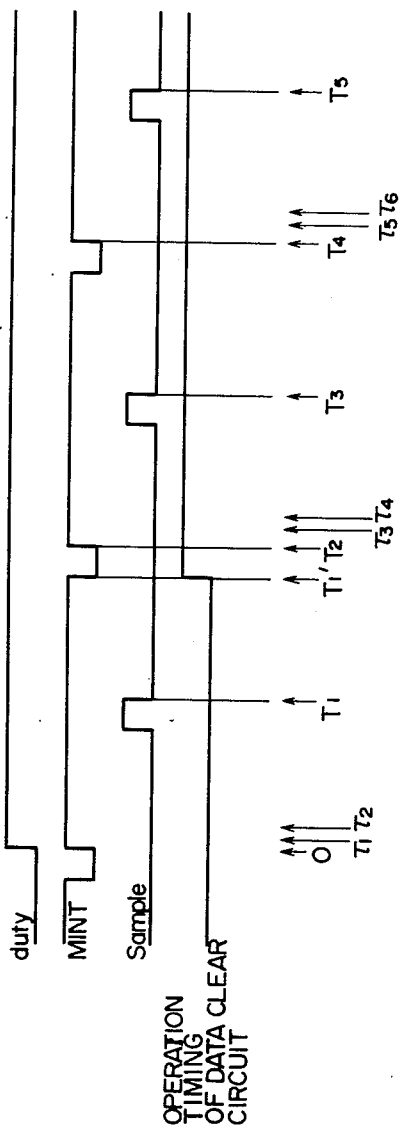
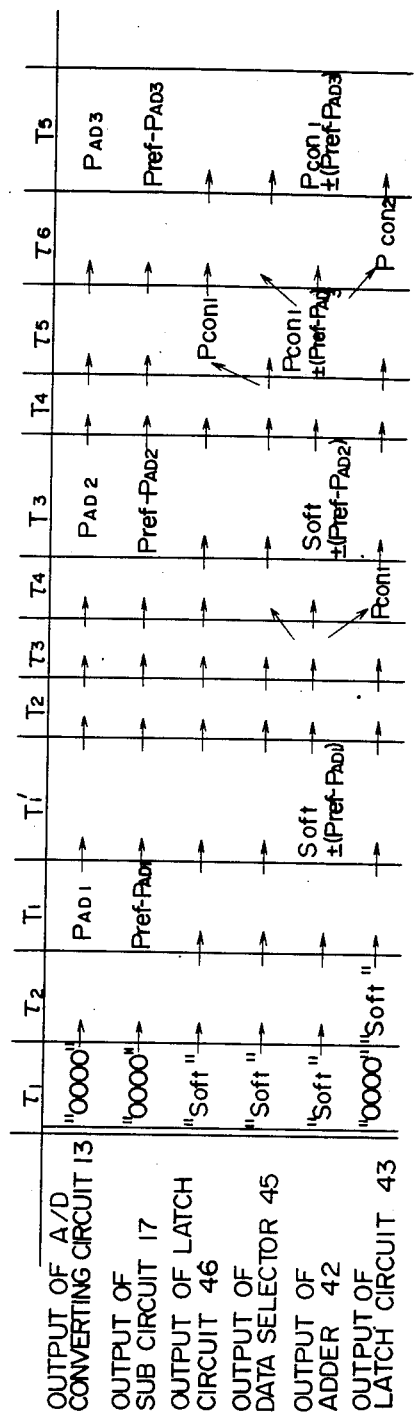
FIG. 9

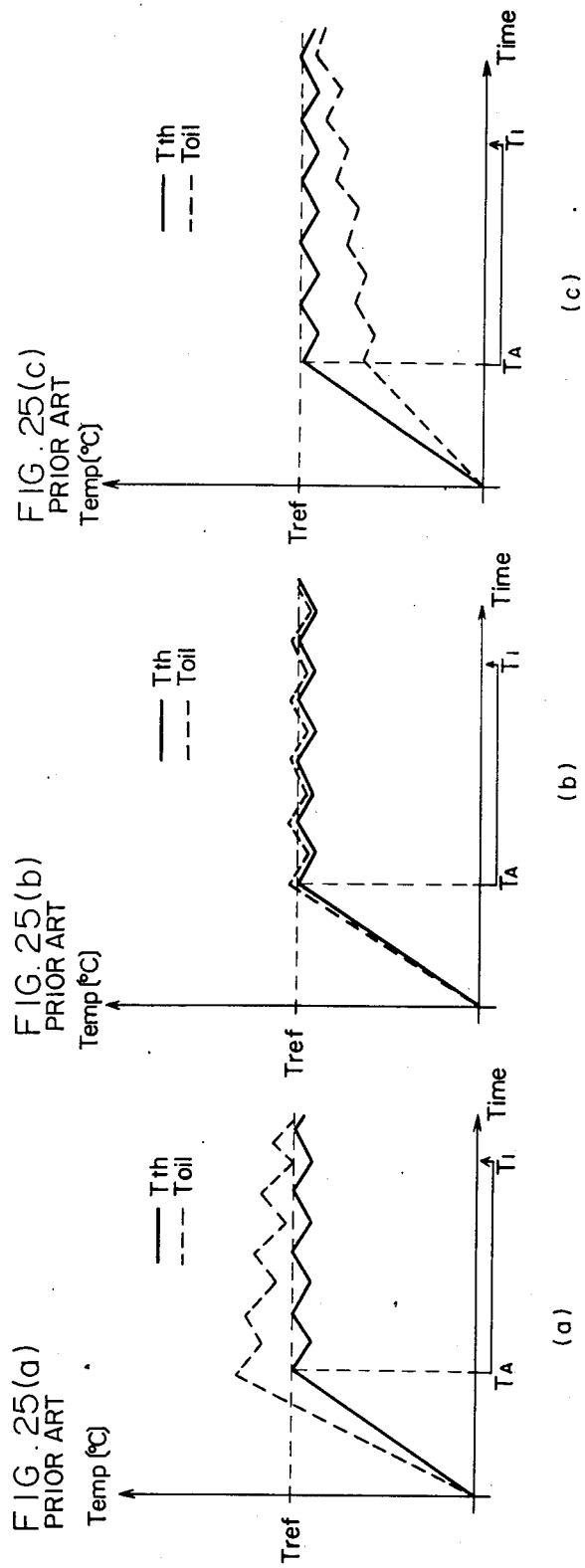

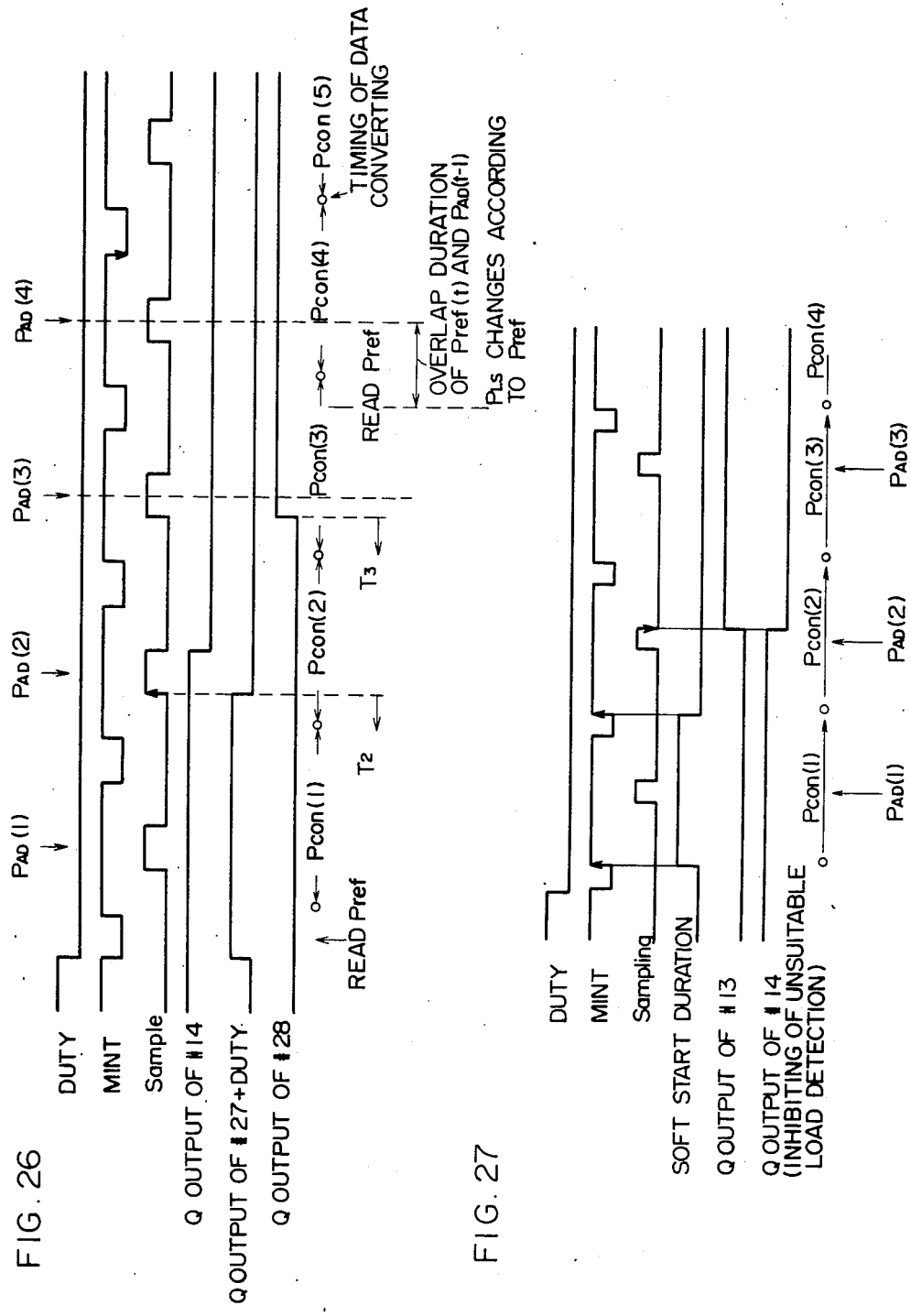

OSCILLATION CONTROL CIRCUIT OF AN INDUCTION HEATING APPARATUS

BACKGROUND OF THE INVENTION

1. Field of the Invention

This invention relates to an induction heating apparatus, and more particularly to an induction heating apparatus using a digitized control circuit.

2. Description of the Prior Art

The induction heating apparatus, as shown in FIG. 1, basically comprises a heating coil 2 connected to a D.C. source, a resonance capacitor 5 constituting a resonance circuit together with the heating coil 2, a switching element 6, a drive circuit 8 therefor, and a control circuit for turning ON/OFF the switching element 6. Such apparatus, when the switching element 6 is controlled to be ON/OFF, generates in a heating coil 4 a resonance current, thereby generating an alternating magnetic field, at which time a cooking utensil 12 (such as a pot or a frying-pan) of iron or 18-8 stainless or the like disposed in proximity to the heating coil 4 is inductive-heated, thereby heating foods in the cooking utensil 12.

The aforesaid conventional induction heating apparatus, as disclosed in, for example, Japanese Patent Laid-Open No. 58-16493 (1983) has used an analog control circuit controlling ON/OFF of the switching element 6 by use of the time constant of resistance 4 and capacitor 3.

Such conventional control circuit using the resistance-capacitor time constant circuit is larger in a change by time ageing and a temperature change of the time constant, whereby it is difficult to maintain exactly in a set value the on duration length of switching element 6. Accordingly, a problem has been occurred in that the heating output coincides with no set value and the actual heating output is different from materials, formations or the size of cooking utensil 12.

The control circuit using the R-C time constant circuit is difficult to integrate, especially to be a monolithic integrated circuit, which has hindered miniaturization and simplification of the control circuit, in turn miniaturization (especially of smaller vertical thickness) and simplification of the induction heating apparatus as a whole, resulting in a hindrance to the provision of induction heating apparatus inexpensive to produce and less in trouble.

In a case of using the cooking utensil of material, such as aluminum, nonmagnetic and of low resistance, the equivalent resistance and equivalent inductance of heating coil becomes smaller. Hence, when the on duration of switching element 6 is longer, a value of a current Icon flowing in the switching element 6 becomes larger to have a fear of thermal breakdown of the switching element 6.

In order to avoid such fear, conventionally, an AC source to an inverter circuit is detected by a current transformer 11 or the like so that when its current value exceeds the predetermined value, the switching element 6 is off, which has been usual. The above-mentioned construction, in which the input current is detected with respect to the AC source (commercial electric source) put into the induction heating apparatus, has the frequency of one-several hundreds in comparison with the ON/OFF frequency (usually 20 kHz or more) of switching element 6. Therefore, the time period from actual flow of an excessive current to detection thereof becomes longer, whereby in some cases the switching element 6 leads to thermal breakdown.

Now, the inverter circuit at the induction heating apparatus includes a damper diode 7 connected in reversed-parallel to the switching element 6 so that after the resonance duration by the induction heating coil 4 and resonance capacitor 5 finishes and terminal voltage at the switching element 6 drops sufficiently, the switching element 6 is turned on. Just after the switching element 6 is on, however, a feedback current ID flows in the damper diode 7, whereby no current flows in the switching element 6 for the diode duration of flowing the feedback current in the diode 7. Hence, in a case where the control circuit at the induction heating apparatus is digitized merely to detect the on duration of switching element 6 as that of flowing a current therein, it cannot be said to perform output control and overcurrent protection with accuracy.

When the input current value becomes lower than the reference value detected by the current transformer 11, a load is deemed unsuitable, in which just after the heating starts, the input current is smaller so that suitable load is not detectable. Accordingly, since a certain time period is required until the unsuitable load is detected, when the load is actually unsuitable, the power is consumed in vain. Furthermore, the reference value of unsuitable utensil detection is required to correspond to a heating output set value, which will complicate the circuitry when the control circuit is digitized.

Furthermore, in the induction heating apparatus, when the load is smaller to a certain extent than the heating output, in other words, when a small object is loaded, the heating is adapted to stop for protection of switching element 6 or the like. The small object, however, is different in the size due to the condition of a country using the induction heating apparatus or circumstances of a user himself or the like. Accordingly, it is necessary to manufacture the induction heating apparatus which sets the various detection levels of small object. Since the small object detection level actually is set as a ratio with respect to the set value of heating output, so that when the control circuit is digitized, a logical operation circuit is required which converts the set value of heating output into the small object level, resulting in the complicated circuitry, in turn the complicated manufacturing process and a high manufacturing cost.

When the control circuit at the induction heating apparatus is digitized, it is considered that various inconveniences will occur unless the sampling cycle period is set proper. For example, in detection of unsuitable utensil as aforesaid, when the set value of heating output is changed in heating operation, until the next detection timing of input current, in other words, until the next sampling timing, the detected value in the former sampling timing is used. Hence, there is possibility of detecting the unsuitable load by mistake during the above period.

In a case where the control circuit is digitized, it is problematical to what extent the bit number is decided for transmitting the digital signal. For example, if a smaller bit number is taken, a change in width of the ON/OFF duration of switching element caused by a change in the unit bit, or a variation in the input power following the above change, becomes larger, thereby creating inconvenience like noise generation. On the contrary, in a case of increasing the bit number, an A/D converter circuit is complicated to cause a high manufacturing cost and there is possibility of creating the hunting phenomenon in the ON/OFF duration control of switching element.

When the control circuit of induction heating apparatus further is digitized, it is of course considered to make it a monolithic integrated circuit (MIC). A household induction heating apparatus, however, uses the commercial AC power source as full wave rectification. Hence, even when the on duration of switching element is constant, if voltage of commercial power source is different, an amount of a current flowing in the switching element is different, the heating output also being different. Accordingly, it is required to manufacture a control circuit adjustable of the on duration of switching element corresponding to voltage of the commercial power source in use, or a MIC control circuit corresponding to voltage at the same.

Now, there are some induction heating apparatus which is obtainable of the mode of setting a heating temperature to heat the cooking utensil other than the heating mode to set the heating output and heat the cooking utensil. The induction heating apparatus obtainable of such mode is usually constructed such that a thermistor provided at the rear surface of a top plate on which the cooking utensile is placed, detects indirectly a temperature of the content in the cooking utensile.

FIG. 25 shows the relation between an oil temperature T oil and a detection temperature T th in, for example, cooking of deep fry (tempura), in which a graph (a) plots the use of a cooking utensile whose bottom is smaller in thickness and apart at the central portion from the top plate of induction heating apparatus, that (b) shows the same high in thermal conductivity and in close contact at the overall bottom with the top plate, and that (c) whose bottom is thick and, as a whole, in close contact with the top plate. At the time $T_A$ when the detection temperature Tth by the thermistor reaches the set temperature Tref, the oil temperature Toil may, as shown in FIG. 25(c), be considerably lower than the set temperature Tref. Hence, in this kind of conventional apparatus, following method is well known; after the detection temperature Tth at first reaches the set temperature Tref and at the time $T_1$ after the lapse of time for several minutes (usually 4 to 5 minutes), a buzzer is sounded, or an indicator lamp is lighted, to thereby inform the user that the oil temperature Toil reaches the set temperature Tref. However, some utensils, as shown in FIG. 25(a), may have rised at the oil temperature Toil higher than the set temperature Tref at the time $T_A$ when the detection temperature reaches the set temperature Tref, or some ones, as shown in FIG. 25(b), may almost coincide at its detection temperature Tth with the oil temperature Toil. Therefore, in a case of using such utensil, the conventional induction heating apparatus will cause the power to be wasted.

Lastly, the problem will be discussed when quick heating is carried out when in use of the conventional induction heating apparatus. Namely, in the conventional induction heating apparatus, even when the quick heating is required, was limited to raise its heating output only in a range of the set input power. Hence, release of the restriction of input power is proposed, in which the on duration of switching element becomes very large, thereby occuring possibility of causing thermal breakdown in the switching element.

OBJECT OF THE INVENTION

In the light of the above circumstances, this invention has been designed. A first object thereof is to provide an induction heating apparatus which is capable of digitizing its control circuit to control ON/OFF of the switching element with accuracy.

A second object of the invention is to provide an induction heating apparatus which digitizes the control circuit to be a monolithic integrated circuit, thereby enabling miniaturization of being smaller in thickness of the apparatus.

A third object of the invention is to provide an induction heating apparatus which is performable quickly of overcurrent protection for the switching element.

A fourth object of the invention is to provide an induction heating apparatus which is capable of maintaining the constant heating output regardless of material, shape and size of a cooking utensil.

A fifth object of the invention is to provide an induction heating apparatus which is capable of accurately setting a quantity of a current flowing in the switching element by excluding it from the on duration of the switching element until a feedback current finishes its flow in a diode after the switching element is on.

A sixth object of the invention is to provide an induction heating apparatus which compares a variation in a quantity of input current with that in a set value for the on duration of switching element, thereby enabling detection of unsuitable load just after the oscillation starts.

A seventh object of the invention is to provide an induction heating apparatus changeable desirably and easily of the level of small object load corresponding to a demand of the user.

A eighth object of the invention is to provide an induction heating apparatus which is adapted not to detect an unsuitable load until the input current value is subsequently sampled when the set value of heating output is changed, thereby not detecting the unsuitable load by mistake.

A ninth object of the invention is to provide an induction heating apparatus which reduces the number of bits for transmitting signals, samples an input current at peak of the cycle of input current, and outputs a signal for controlling the on duration of switching element at near zero level of the cycle of input current, thereby enabling prevention of non-stabilization of inverter oscillation and of noise generation during the change of input power while avoiding complication of an A/D converter in construction.

A tenth object of the invention is to provide an induction heating apparatus which is capable of keeping the heating output constant with ease even when voltage of commercial AC power source in use is different.

A eleventh object of the invention is to provide an induction heating apparatus which does not waste the power when food to be heated is detected of its temperature to control the heating output.

A twelfth object of the invention is to provide an induction heating apparatus which is capable of quick heating as much as possible without thermal breakdown in the switching element.

The above and further objects and features of the invention will more fully be apparent from the following detailed description with accompanying drawings.

BRIEF DESCRIPTION OF THE DRAWINGS

FIG. 9 is a timing chart of the operation timing of an data clear circuit of the on-duration setting circuit, FIGS. 25(a) to 25(c) are graphs each showing a relation between the detection temperature and the temperature of the content in the cooking utensil when the conventional induction heating apparatus is used to perform the heating by the temperature setting, FIGS. 26 through 31 and 34 are timing charts explanatory of an operation of the eighth embodiment.

DETAILED DESCRIPTION OF THE INVENTION

Figure 1:
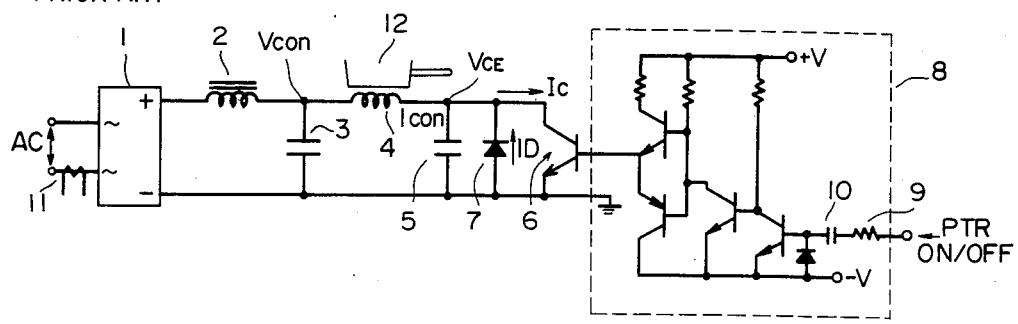
FIG. 1 is a circuit diagram of an inverter of a prior art induction heating apparatus.

Referring to FIG. 1, reference numeral 1 designates a rectifier circuit for full-wave-rectifying AC power supply voltage, 2 designates a choke coil connected to an output terminal of the full-wave rectifier circuit 1, 3 designates a filter capacitor constituting a filter circuit together with the choke coil 2, 4 designates an induction heating coil connected to one end of filter capacitor 3, 5 designates a resonance capacitor constituting a resonance circuit together with the induction heating coil 4, 6 designates a switching element, such as a transistor, connected in parallel to the resonance capacitor 5, 7 designates a damper diode connected in antiparallel to the switching element, 8 designates a drive circuit given an ON/OFF signal from a control circuit to be discussed below and turning ON/OFF the switching element 6, the drive circuit 8 providing at its input stage a differentiating circuit composed of the resistance 9 and capacitor 10 so that switching is rapidly raised or lowered, 11 designates a current transformer provided at the AC power supply line to detect an AC current given into the inverter circuit, and 12 designates a cooking utensil to be heated by the induction heating apparatus of the invention.

Figure 2:
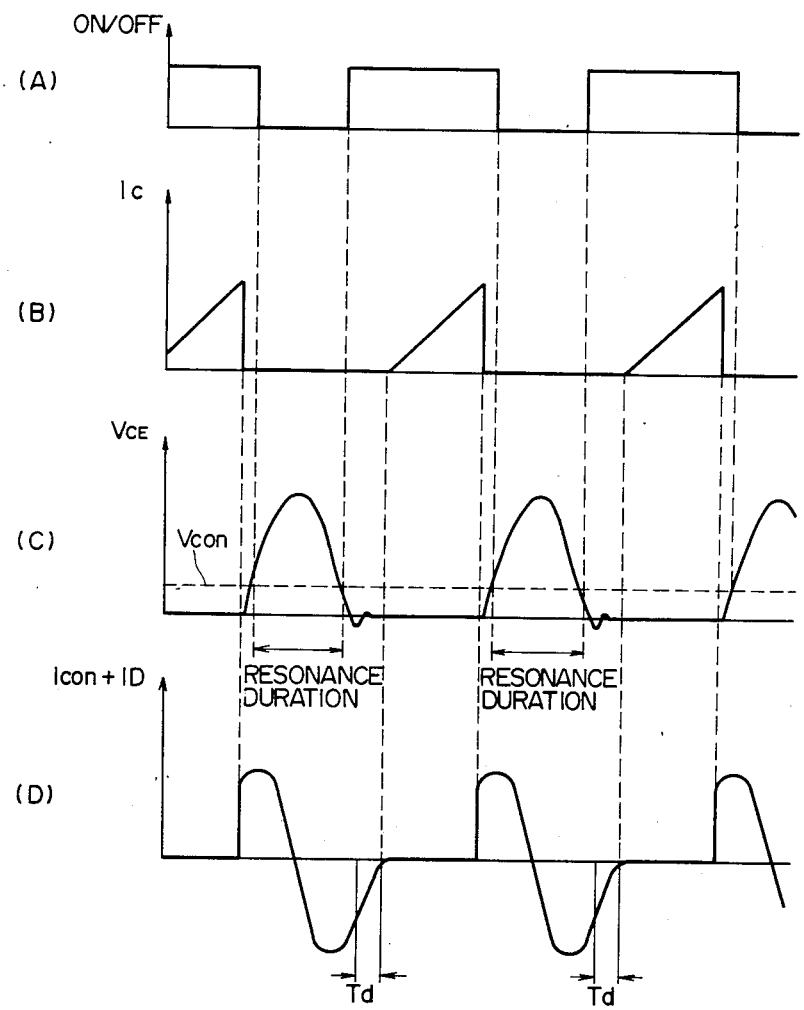
FIG. 2 is a timing chart thereof, in which (A) shows waveforms of ON/OFF signals for a switching element, (B) shows values of currents flowing in the switching element, (C) shows voltages at the terminal of switching element, and (D) shows the sum of current flowing in a resonance chapacitor and that flowing in a damper diode.

In such inverter circuit, the switching element 6, when applied with an ON/OFF signal as shown in FIG. 2(A) through the drive circuit 8, flows a current IC shown in FIG. 2(B) so that voltage $D_{CE}$ across the terminals of switching element 6 varies as shown in FIG. 2(C), at which time a current I con flowing in the resonance capacitor 5 and that $I_D$ flowing in the diode 7 vary as shown in FIG. 2(D). In addition, reference Td designates a diode duration of flowing a diode current. Such oscillation flows the resonance current in the heating coil 4 to generate a high frequency alternating field, which is supplied to the cooking utensil 12 of iron or 18-8 stainless steel series metal positioned in proximity to the induction heating coil 4, the cooking utensil being induction-heated. In addition, reference V con designates full-wave rectification voltage given from the full-wave rectifier circuit through the choke coil 2.

Figure 3A:
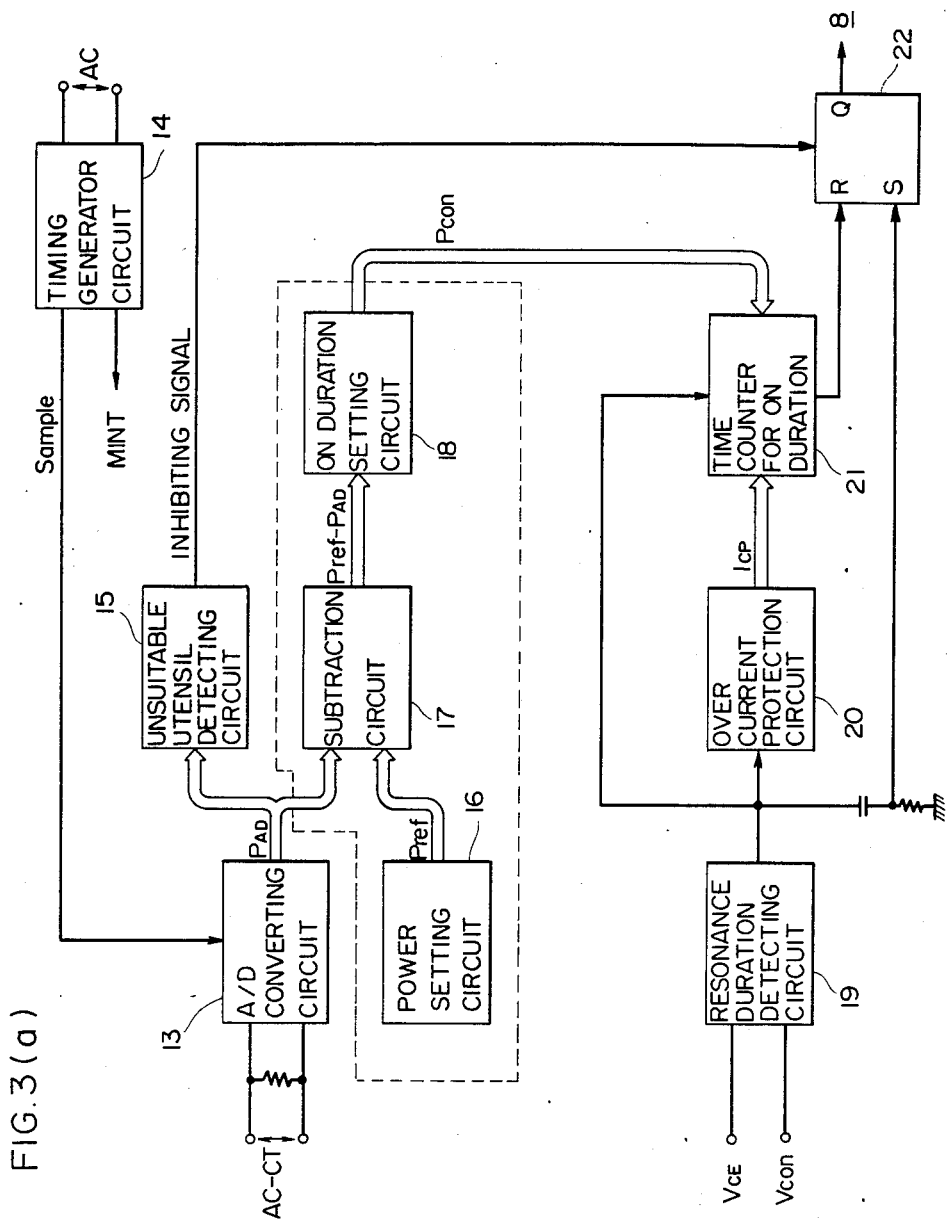
FIG. 3(a) is a block diagram of a control circuit of the first embodiment of the induction heating apparatus of the invention.

Referring to FIG. 3(a), reference numeral 13 designates an A/D converting circuit which converts the input current value detected by the current transformer 11 into input data $P_{AD}$ digital and of m-bits relatively smaller in bit number, 14 designates a timing generator circuit for generating a Sample signal giving the timing for A/D conversion of the A/D converting circuit 13 and a MINT signal in synchronism with the near zero level of a cycle in a pulsating current full-wave-rectifying AC power supply voltage, the sample Signal and MINT signal being output with the predetermined timing for the full-wave-rectified AC voltage, 15 designates an unsuitable utensil detecting circuit given input data PAD from the A/D converting circuit 13 to detect the state where a small object, such as a knife or a fork, is disposed, or the no-load state where nothing is disposed, the unsuitable utensil detecting circuit 15 outputting an inhibiting signal when the input data PAD is smaller than the predetermined value, 16 designates a power setting circuit for setting power setting data P ref corresponding to the heating output to be output from this apparatus at the digital value of m-bits. Reference numeral 17 designates a subtraction circuit (to be hereinafter called the SUB circuit) given the set data Pref of m-bits from the power setting circuit 16 and the input data PAD from the A/D converting circuit 13, so that a value of Pref-PAD: a remainder in a subtraction of input data PAD from set data Pref, is output as a signal represented by the bit of sign bit and m+1-bits, and 18 designates an on-duration setting circuit for setting as the digital data of n-bits (n≧m) on-duration data Pcon corresponding to the duration during which the switching element 6 is turn on. The on-duration setting circuit 18 is given from the SUB circuit 17 difference data Pref-PAD: the remainder in a subtraction of input data PAD from the setting data Pref, thereby generating the on-duration data Pcon. Also, reference numeral 19 designates a resonance duration detecting circuit for outputting a detection signal at the "L" level during the resonance period wherein $V_{CE} > D_{con}$ is obtained by comparing DC voltage Dcon from the full-wave rectifier circuit 1 with terminal voltage $D_{CE}$ at the switching element 6, which circuit 19 serves also as an on timing detecting circuit indicating the timing of turning on the switching element 6 by extinction of detection signal when $V_{CE} < V_{con}$ occurs, 20 designates an overcurrent protection circuit which measures a resonance duration length by the detection signal from the resonance duration detecting circuit 19 so as to set limiting data Icp of n-bits for limiting the on-time of switching element 6 corresponding to the resonance duration length, thereby preventing a flow of an excessive current into the switching circuit.

Reference numeral 21 designates a time counter for on duration which is given the detection signal from the over current protection circuit 20 and starts counting from a finish of detection signal and outputs a coincident signal when the counted value is equal to the on-duration data Pcon held by the on-duration setting circuit 18, or the limiting data Icp at the overcurrent protection circuit 20, and 22 designates a flip-flop circuit which is set when the detection signal from the resonance duration detecting circuit 19 finishes, in other words, when $V_{CE} < V_{con}$, and reset by the coincident signal from the time counter for on duration 21, so that the control signal changing in the level of "H" or "L" by setting or resetting the flip-flop circuit 22 and controlling ON or OFF of switching element 6 is sent to the drive circuit 8, the flip-flop circuit 22 being so constructed that the inhibiting signal from the unsuitable utensil detecting circuit 15 (an unsuitable load detection signal) inhibits the aforesaid operation. In such control circuit, when the detection signal at the "L" level from the resonance duration detecting circuit 19 disappears and its output is at a "H" level, the flip-flop circuit 22 is set to transmit an ON signal therefrom to the drive circuit 8 for the switching element 6. The ON signal actuates the drive circuit 8 to turn on the switching element 6, whereby the time counter for on duration 21 is actuated to start counting so that when the on duration data Pcon obtained by the on duration setting circuit 18 coincides with the counted value, usually the reset signal is transmitted to the flip-flop circuit 22, whereby the flipflop circuit 22 is reset and the OFF signal for the switching circuit 6 is transmitted to the drive circuit 8. Hence, when in normal operation, the on duration data Pcon output from the ON duration setting circuit 18 decides the actual ON duration length of switching element 6, in other words, the duration for actually flowing a current with the switching element 6.

On the other hand, the power setting data Pref set by the power setting circuit 16 and the input data PAD obtained by A/D converting the input current value in comparison with the AC input current by use of the A/D converting circuit 13, are transmitted to the SUB circuit 17 corresponding to the Sample signal, the SUB circuit 17 transmitting to the on duration setting circuit 18 difference data Pref−PAD in subtraction of input data PAD from the power setting data Pref. Upon receiving the difference data Pref−PAD, the on duration setting circuit 18 adds the difference data Pref−PAD to the on duration data Pcon initially set, therby obtaining new on duration data Pcon, which functions to increase the on duration data to elongate the on duration of switching element to thereby increase the input power when the input data PAD is smaller than the power setting data Pref. On the other hand, when the input data PAD is smaller than the power setting data Pref, the new data Pcon reduces the on duration data Pcon to reduce the on duration of switching element 6, thereby reducing the input power. Such operation is repeated until the input data PAD coincides with the power setting data Pref, in other words, until the difference data: Pref−PAD=0 is obtained. Therefore, the input power, which varies due to material, shape or conductivity, of the cooking utensil such as a pot in use, is automatically adjusted to be always constant.

In a case where the heating operation of the inverter is carried out when no-loaded or loaded by a small object, an input current value detected by the current transformer 11 decreases and the input data PAD from the A/D converting circuit 13 also becomes smaller, the unsuitable utensil detecting circuit 15 detecting the value of such input data PAD smaller than the predetermined value, thereby giving inhibition to the flip-flop circuit 22. Accordingly, the ON/OFF signal from the flip-flop circuit 22 to the drive circuit 8 for the switching element 6 is inhibited. In addition, it is preferable that the predetermined value, when the value of power setting data Pref at the power setting circuit 16 is set larger, largely changes in association with a power setting nob (not shown) and, when the value of Pref is set smaller, changes to be smaller in a similar manner.

In a case where a cooking utensil of non-magnetic material, such as aluminum, is disposed in proximity to the heating coil 4 and heated thereby, equivalent inductance thereof becomes lower than when the magnetic cooking utensil is used, thereby reducing the length of resonance duration wherein the terminal voltage $V_{CE}$ of switching element 6, after the switching element 6 is off, becomes higher than DC voltage Vcon from the full-wave rectifier circuit 1. The resonance duration detecting circuit 19 detects the duration and the overcurrent protection circuit 20 reduces the value of limiting data Icp which limits the actual duration of switching element 6 corresponding to the detected length of resonance duration. Hence, the time counter for on duration 21, even when the on duration data Pcon at the on duration setting circuit 18 is set to be of larger value so as to enlarged the on duration of switching element 6, is limited of its counting by the value of limiting data Icp of overcurrent protection circuit 20, and there is no fear that the on duration of switching element 6 is reduced to lead to a flow of an excessive current in the switching element 6.

Next, detailed explanation will be given on each block in the induction heating apparatus of the invention.

Figure 4:
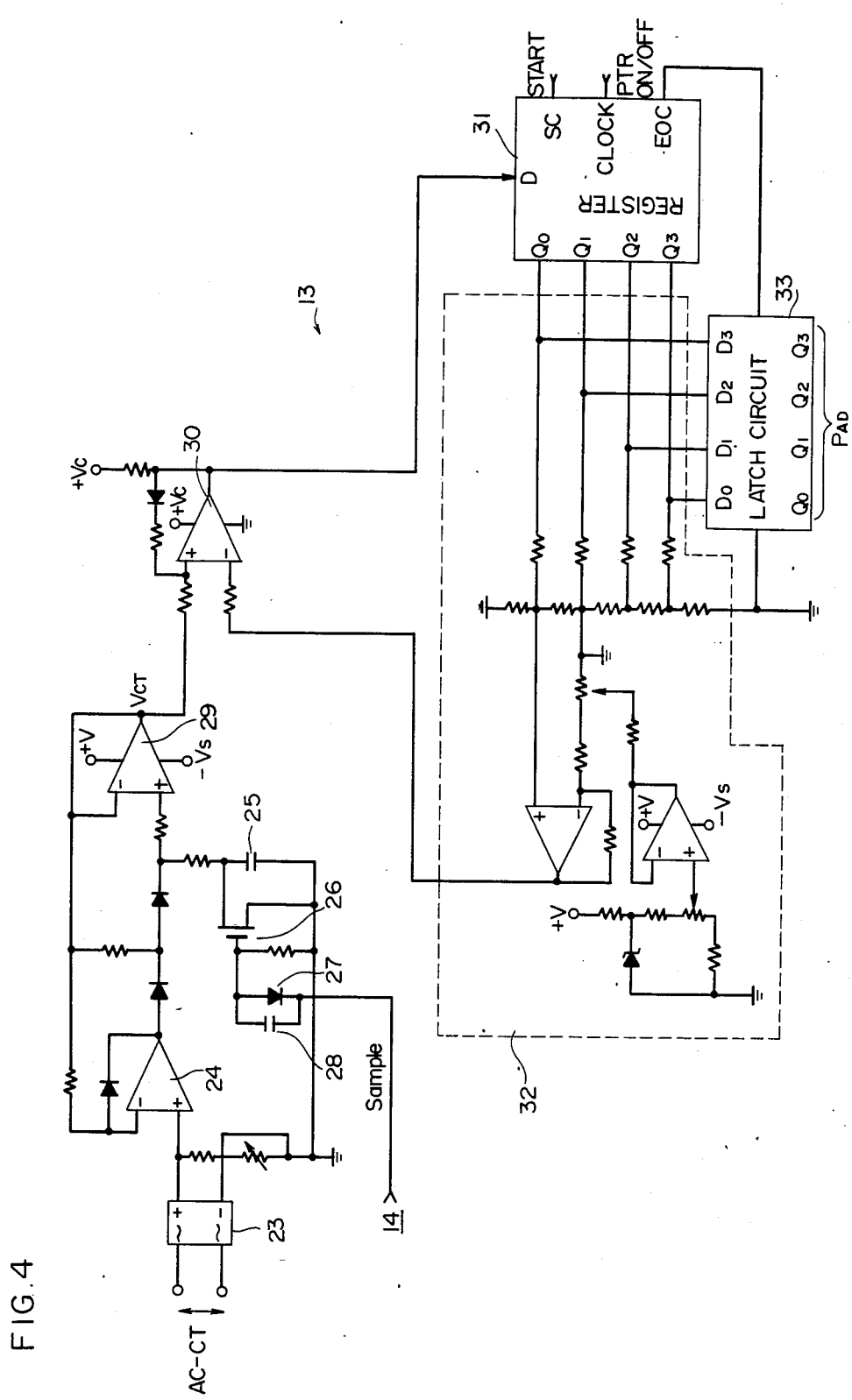
FIG. 4 is a circuit diagram of an A/D converting circuit of the first and second embodiments of the same.

In the FIG. 4 showing the circuit diagram of an embodiment of A/D converting circuit 13, reference numeral 23 designates a full-wave rectifier circuit for full-wave-rectifying AC voltage from the current transformer 11, 24 designates a first operational amplifier for amplifying the signal from the rectifier circuit 23, 25 designates a peak holding capacitor charged by the first operational amplifier 24, 26 designates a field effect transistor (FET) connected in parallel to the peak holding capacitor 25 and given at the gate electrode thereof the Sample signal from the timing generator circuit through a parallel circuit comprising a diode 27 and a capacitor 28. In addition, the Sample signal uses the pulsating current which full-wave-rectifies the AC voltage and is given with the timing of the peak of pulsating current. Also, reference numeral 29 designates a second operational amplifier for amplifying the terminal voltage of the peak holding capacitor 25, 30 designates a first comparator given at its $\oplus$ input terminal an output $V_{CT}$ of the second operational amplifier 29, 31 designates a successive approximation registers which is given at its drive terminal D the signal from the first comparator 30, so that a start signal is given to the terminal SC for starting operation and an ON/OFF signal $P_{TR}$ ON/OFF for the switching element 6 is given to the clock input terminal CLOCK, whereby successive approximation registers 31, develops outputs, for example in this invention, $Q_0$ to $Q_3$ of 4-bits in variation, 32 designates a D/A converter to D/A convert the successive approximation registers 31 output, which is given to the $\ominus$ input terminal at the first comparator 30, 33 designates a latch circuit for latching the output from the successive approximation registers 31, which carries out latching when the A/D conversion by the A/D converter circuit is complete and the outputs $Q_0$ to $Q_3$ from the successive approximation registers 31 as the aforesaid input data PAD.

Figure 5:
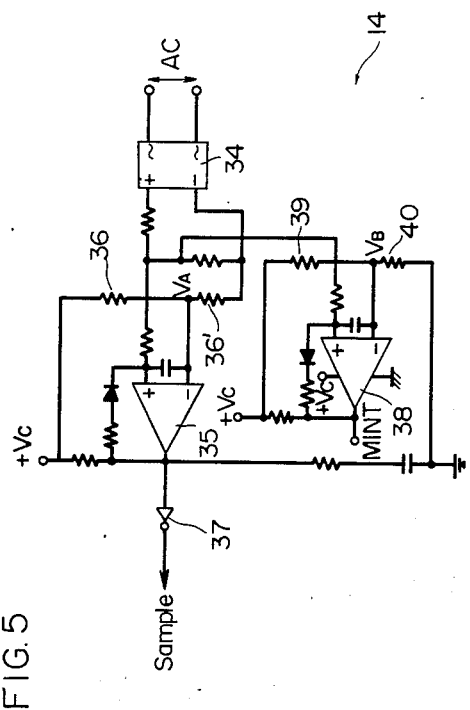
FIG. 5 is a circuit diagram of a timing generator circuit of the first and second embodiments of the same.
Figure 6:
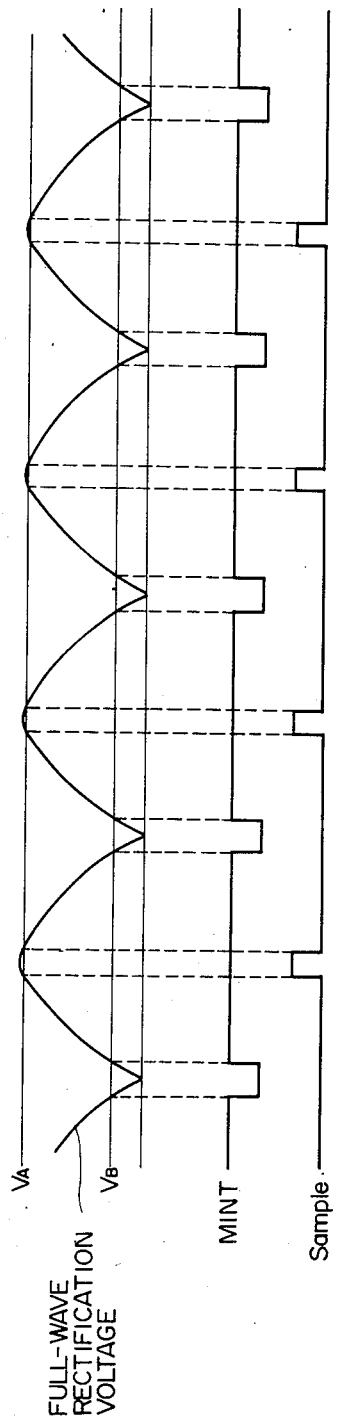
FIG. 6 is a timing chart for each node at the timing generator circuit.

Referring to FIG. 5 which shows a construction of the timing generator circuit, reference numeral 34 designates a full-wave rectifier circuit for full-wave-rectifying AC power supply voltage, 35 designates a third comparator which puts into the $\oplus$ input terminal the full-wave rectified voltage from the full-wave rectifier circuit 34 and devides constant voltage Vc by resistances 36 and 36' to thereby give the divided voltage VA into the $\ominus$ input terminal, the output of the third comparator 35 being the Sample signal output through an inverter 37, and 38 designates a fourth comparator which puts into the $\oplus$ input terminal the full-wave-rectified voltage from the full-wave rectifier circuit 34 and into the $\ominus$ input terminal voltage $V_B$: constant voltage+Vc devided by resistances 39 and 40, the output of the same being the MINT signal. In addition, the voltage $V_A$ has been set to be slightly lower than the peak voltage of AC power supply voltage and the voltage $V_B$ slightly higher than zero voltage, whereby the Sample signal at the "H" level, as shown in FIG. 6, is generated in the vicinity of the peak of voltage of full-wave-rectified supplied power, the MINT signal at the "L" level being generated in the vicinity of zero voltage of power supply voltage full-wave-rectified.

In the A/D converter circuit 13 and timing generator circuit 14, the signal detected by the current transformer 11 and corresponding to the input current is transmitted to the terminal of peak holding capacitor 25 through the first operational amplifier 24. When the full-wave rectified voltage value of AC power supply voltage is low, no Sample signal is generated, whereby FET26 is on and the capacitor 25 is not charged. In the vicinity of the peak of full-wave rectified voltage of AC power source, the Sample signal is transmitted from the timing generator circuit 14 to the gate of FET26, so that FET26 is off, at which time the input current given through the current transformer 11 and full-wave rectifier circuit 23 is the peak of each pulsating current, thereby conserving in the peak holding capacitor 25 the charge corresponding to the peak of input current. Thus, voltage developed at the capacitor 25 terminal is given as $V_{CT}$ to the $\oplus$ terminal of first comparator 30 through a second operational amplifier 29, the signal of voltage $V_{CT}$ allowing the first comparator 30 to output the signal at "H" level. The successive approximation registers 31 is given at its SC terminal a start signal generated by the Sample signal and ON/OFF signal for switching element 6 given at the clock terminal, thereby starting operation of A/D converting circuit 13. When the ON signal at first is given to the clock terminal of successive approximation registers 31, since the D terminal of the same is at the "H" level, the outputs from terminals $Q_0$, $Q_1$, $Q_2$ and $Q_3$ of the same become logical "1000", which is D/A-converted by the D/A converter circuit 32 and given to the $\ominus$ input terminal at the first comparator 30. In this condition, for example, when voltage at the $\oplus$ input terminal of the first comparator 30 is higher than that at the $\ominus$ input terminal, the signal given from the first comparator 30 to the D terminal at the successive approximation registers 31 is kept at the "H" level. Therefore, the successive approximation registers 31 synchronizes with the rising of the next ON signal and outputs a logical "1100" of the former output "1000" added with a logical "0100", which is fed to the $\ominus$ input terminal at the first comparator 30 through the D/A converter circuit 32, at which time, for example, when voltage at the $\ominus$ input terminal at the first comparator 30 is higher than that at the $\oplus$ input terminal of the same, the output is at the "L" level and given to the D terminal at the successive approximation registers 31. Since the D terminal at the successive approximation registers 31 thus is given the "L" level signal, the successive approximation registers 31 in synchronism with the rising of the next on signal outputs a logical "1010": the remainder in subtraction of "0010" from the former output logical "1100". Such successive comparison operation is continuously repeated and then finishes at the time when the successive approximation registers 31 is given five times the ON signal. After the comparison, while keeping the outputs $Q_0$ through $Q_3$ set by the above operation, for example, logical "1001", the successive approximation registers 31 gives a signal from the EOC terminal thereof to the latch circuit 33, which latches by said signal the outputs $Q_0$ through $Q_3$ from successive approximation registers 31 and then gives the latched outputs $Q_0$ to $Q_3$ into the unsuitable utensil detecting circuit 15 and subtraction circuit 17.

Figure 7:
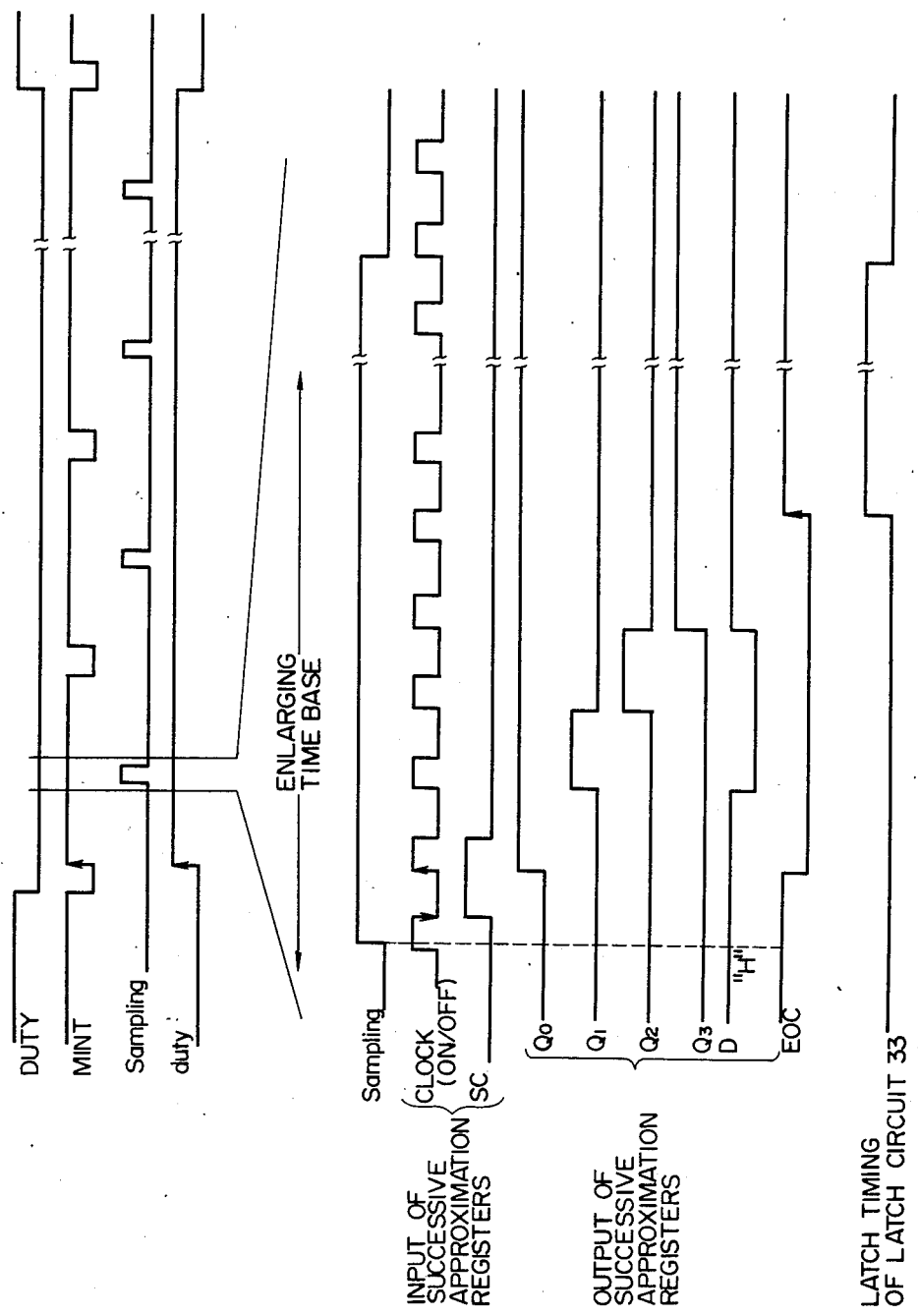
FIG. 7 is a timing chart showing the timing for A/D conversion.

In addition, the A/D converting circuit 13 of the invention is not defined to the successive approximation registers 31. The timing chart of A/D conversion and the timing of latch operation of latch circuit 33 will be shown in FIG. 7, in which the term "DUTY" designates the timing for commanding inverter oscillation and stop by control from a duty control circuit (not shown) and that "duty" designates the timing for actual oscillation of the inverter.

Figure 8:
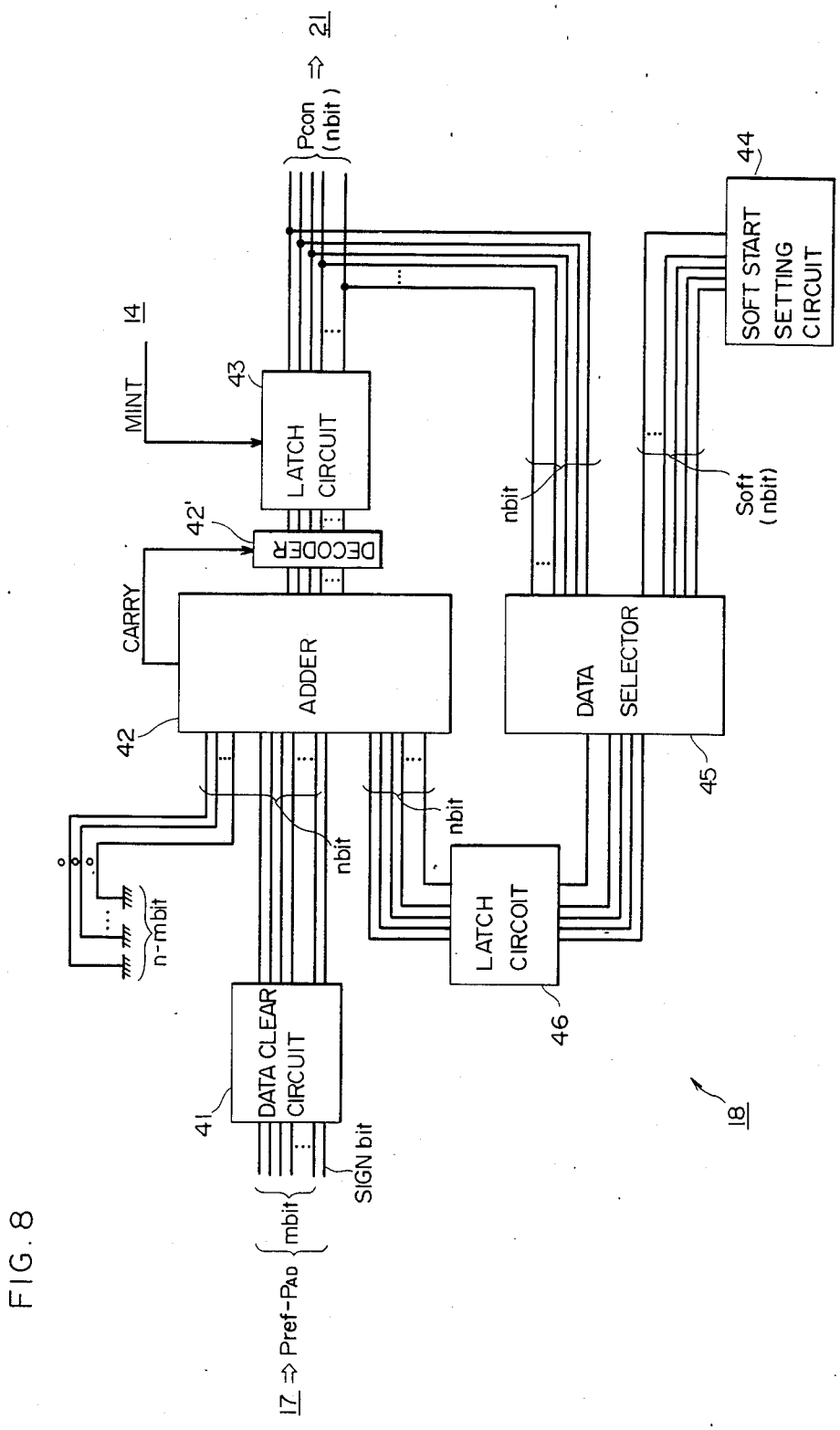
FIG. 8 is a block diagram of an on-duration setting circuit of the first and second embodiments of the invention.

Referring to FIG. 8, reference numeral 41 designates an data clear circuit which is given the power setting data Pref from the SUB circuit 17 and also a difference Pref—PAD from the power setting circuit 16, which outputs logical "0" during the initial oscillation of the inverter circuit. The reason is that the data clear circuit 41 makes the difference data Pref—PAD be zero to carry out a soft start operation. Reference numeral 42 designates an adder which adds the digital value of n-m-bits, that of m-bits, and that of m+1-bits applied with sign bit which represents positive or negative sign so as to output the on duration data Pcon to a decoder 42', so that m-bits in lower order of the input to the adder 42 are given the logical "0" from the data clear circuit 41 during the initial oscillation of inverter and n-m-bits in upper order are always given a logical "0", the sign of the difference data Pref—PAD being given to a sign bit. The decoder 42' changes whole n-bits into logical "0" when a carry signal is output from adder by reaching the whole n-bits of the on duration data Pcon output from the adder 42 to logical "1"(for example "111111" when n=6) and fixes the data given to a latch circuit 43 in "111111". 43 designates a latch circuit which stores and holds the output Pcon from adder 42 through the decoder 42' until the next data is given, the latch timing of latch circuit 43 synchronizing with the leading edge of MINT signal and the output of the same being given to the time counter for on duration 21, 44 designates a soft start setting circuit storing therein data soft of initial value of n-bit at the low level, 45 designates a data selector given the output Pcon of latch circuit 43 and that soft of soft start setting circuit 44 to select which data is output, the initial data soft being selected when the inverter starts oscillation, and 46 designates a latch circuit to latch the output of data selector 45, the latched signal by data selector 45 being given to another input terminal at the adder 42.

In such on duration setting circuit 18, during the initial oscillation of the inverter, since the data clear circuit 41 is kept in the inhibiting condition, data from subtraction circuit 17 is changed into logical "0" and given to the adder 42, whereby the m-bit data transmitted from the SUB circuit 17 to the adder 42 through the data clear circuit 41 has each bit of zero apparently.

Also the data selector 45 is in the state where it outputs the data Soft of soft start setting circuit 44, in which the data Soft is given to the latch circuit 43 through the data selector 45, latch circuit 46 and adder 42, the latch circuit 43 outputting to the time counter for on-duration 21 and latch circuit 43 the data Soft as the on-duration data Pcon with the timing nearly in synchronism with the MINT signal. Also, after the inverter starts its oscillation, the data clear circuit 41 is released from initial state in synchronism with the next MINT signal, whereby the SUB circuit 17 gives the difference data Pref—PAD to the adder 42, the data selector 45 selecting the output from the latch circuit 43. Therefore, the output Pcon from the latch circuit 43, in other words, the former output of adder 42, is given to the adder 42 through the data selector 45 and latch circuit 46.

The adder 42 adds or subtracts the absolute value of difference data Pref—PAD given from the SUB circuit 17 corresponding to the positive or negative sign of absolute value to or from the m-bits in lower order of the n-bit on-duration data Pcon given from the latch circuit 43, the Pcon+(Pref—PAD) being output as the new on-duration data at the timing of MINT signal to the latch circuit 43 and once latched to be output to the time counter for on duration 21.

The above operation successively corrects the on-duration data Pcon corresponding to the difference between Pref and PAD. Such variation in the data is given in the following recurrence formula:

$$\text{Pcon } k = \text{Pcon } k-1 + (\text{Pref} - \text{PAD}k)$$

[where $k=1, 2, 3 \ldots$, Pcon0=Soft].

FIG. 9 shows a timing chart of the timing at this time and a table indicating data transition, in which reference $\tau 2m-1 (=1, 2, 3 \ldots$, i.e., 2m-1 is odd number) designates the timing when the input to the latch circuit 46 appears at its output, and $\tau 2m(m=1, 2, 3 \ldots$, i.e., 2m: even number) designates the timing when the input to the latch circuit 43 appears at its output.

Since the correction of on-duration data Pcon by addition in the adder 42 is carried out with respect only to the m-bits in low order of n-bit on-duration data Pcon, variation in the on-duration of switching element 6 due to once resetting the on-duration data Pcon decreases to lead to decrement in variation in the input power.

Figure 10A:
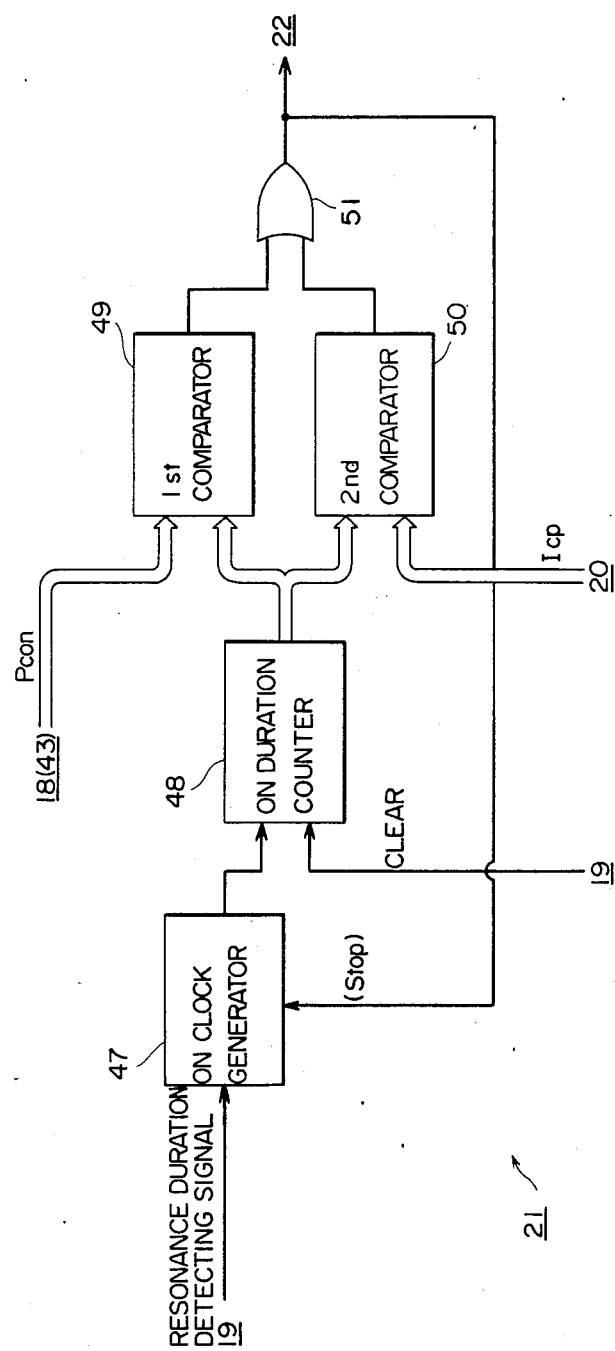
FIG. 10(a) is a block diagram of a time counter for on-duration of the first embodiment of the invention.

Next, FIG. 10(a) is a block diagram of the time counter for on duration. In FIG. 10(a), reference numeral 47 designates an on clock generator which starts oscillation when the resonance duration detection signal disappear from the resonance duration detecting circuit 19, that is, with the on timing of the switching element 6, the oscillation operation being stopped corresponding to the off-timing of switching element 6, 48 designates an on-duration counter for count-up by a clock signal from the on clock generator 47, which is cleared when the detection signal from the resonance duration detecting circuit 19 disappears, 49 designates a first comparator for comprising the counting output of on-duration counter 48 with the on duration data Pcon of output from the latch circuit 43 at the on duration setting circuit 18 so as to output a coincident signal when both the outputs coincide with each other, 50 designates a second comparator which compares the counting output from the on duration counter 48 with the limiting data Icp of output from the overcurrent protection circuit 20 so as to output a coincident signal when both the outputs coincide with each other, and 51 designates an OR gate given the coincident signal from the first and second comparators 49 and 50, which gives the reset signal to the flip-flop circuit 22 in FIG. 3 and sends a stop signal to the on clock generator 47 when given the coincident signal from at least one comparator circuit 49 or 50.

Accordingly, in the time counter for on duration 21, at the time when the detection signal at the "L" level from the resonance duration detecting circuit 19 disappears, the switching element 6 is on, the on clock generator 47 starts its oscillation to generate a clock pulse. At the same time, the on duration counter 48 is cleared to the initial condition and counted-up by the clock pulse from the on clock generator 47, the output of on duration counter 48 being transmitted successively to the first and second comparators 49 and 50 corresponding to the counting up. The first comparator 49 compares the output from the on duration counter 48 with the output of on duration data Pcon each time the output of on duration counter 48 is transmitted to the same. The second comparator 50 compares the output of on duration counter 48 with the output of limiting data Icp from the overcurrent protection circuit 20 each time the on duration counter 48 output is transmitted to the same. Since the on duration data Pcon in normal condition, for example, an enamel pot or the like having a relatively large equivalence resistance is used, is smaller than the limiting data Icp, when the content of on duration counter 48 becomes to coincide with the on duration data Pcon, the coincident signal is transmitted from the first comparator 49 to the reset terminal R and on clock generator 47 through the OR gate 51. Therefore, the flip-flop 22 is reset and the switching element 6 is off to start the resonance duration by means of heating coil 4 and resonance capacitor 5 in the inverter circuit and also the oscillation of on clock generator 47 is stopped by the above coincident signal. Upon disappearing of detection signal from the resonance detecting circuit 19 after completion of resonance duration, the flip-flop 22 is reset and the switching element 6 is on, thereby repeating the on duration counting.

On the other hand, in a case where a pot of material, such as aluminum, of non-magnetic and high conductivity, is used as the cooking utensil, the limiting data Icp is smaller than the on duration data Pcon. In such case, when the output of on duration counter 48 and the value of limiting data Icp coincide with each other on the process of counting-up of on duration counter 48, the second comparator 50 outputs the coincident signal, which is transmitted to reset terminal R at the flip-flop 22 and resets it, in other words, the limiting data Icp limits the on duration.

Figure 11A:
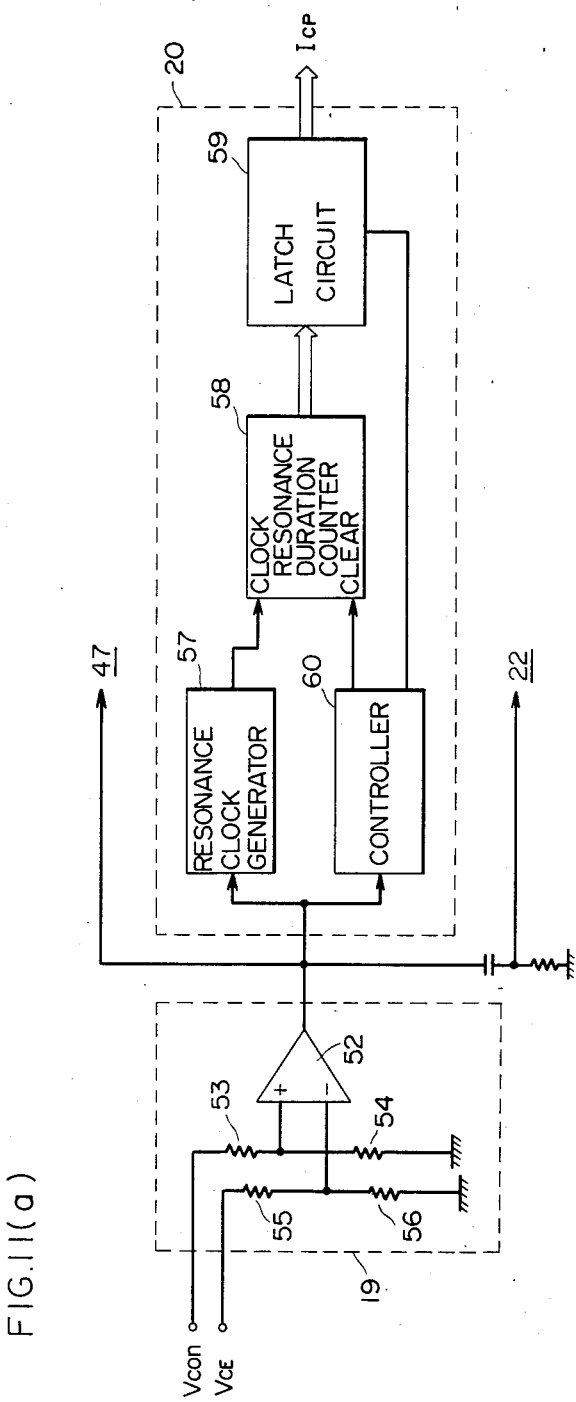
FIG. 11(a) is a block diagram of a resonance duration detection circuit and an overcurrent protection circuit of the first embodiment of invention.

FIG. 11(a) is a block diagram of the resonance duration detecting circuit 19 and overcurrent protection circuit 20, in which the components corresponding to those in FIG. 3 are designated by the same reference numerals. In FIG. 11, reference numeral 52 designates a fifth comparator whose ⊕ input terminal is given power supply voltage Vcon transmitted through the full-wave rectifying circuit 1 and choke coil 2 and divided by dividing resistances 53 and 54 and whose ⊖ input terminal is given terminal voltage $V_{CE}$ at the switching element 6 divided by dividing resistances 55 and 56, 57 designates a resonance clock generator which is given the resonance duration detection signal from the fifth comparator 52 to start oscillation, 58 designates a resonance duration counter for counting up by a clock pulse from the resonance clock generator 57, 59 designates a latch circuit to latch the contents counted-up by the resonance duration counter 58, and 60 designates a controller given the output from the fifth comparator 52, which generates a clear signal sent to the resonance duration counter 58 and the latch-timing signal to the latch circuit 59.

Figure 3B:
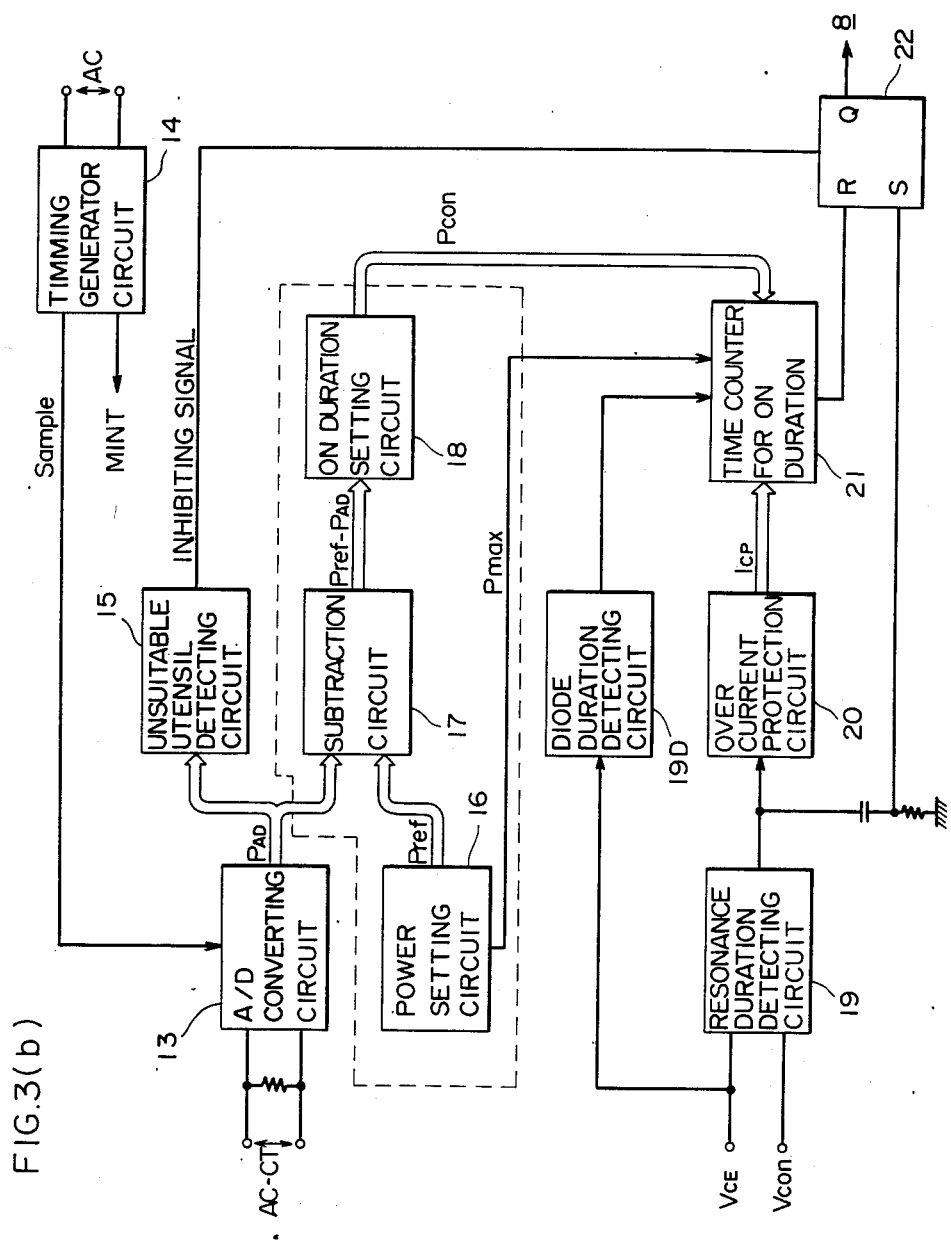
FIG. 3(b) is the same of the second embodiment of the invention.
Figure 10B:
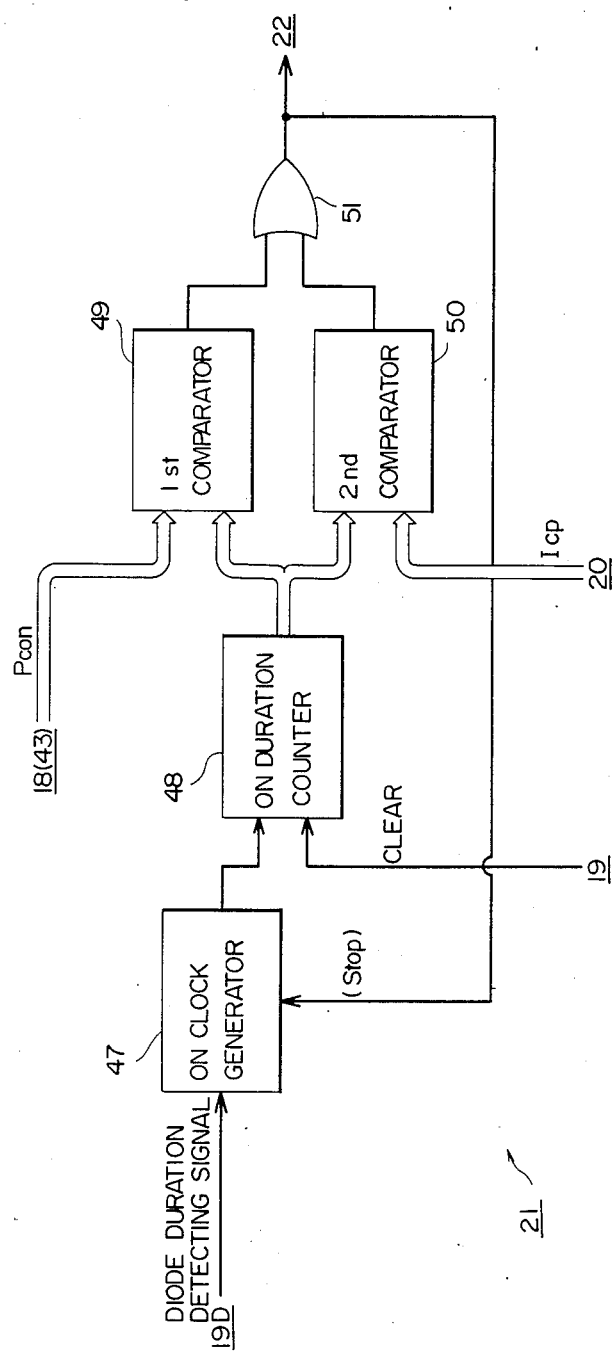
FIG. 10(b) is the same of the second embodiment of the invention.
Figure 11B:
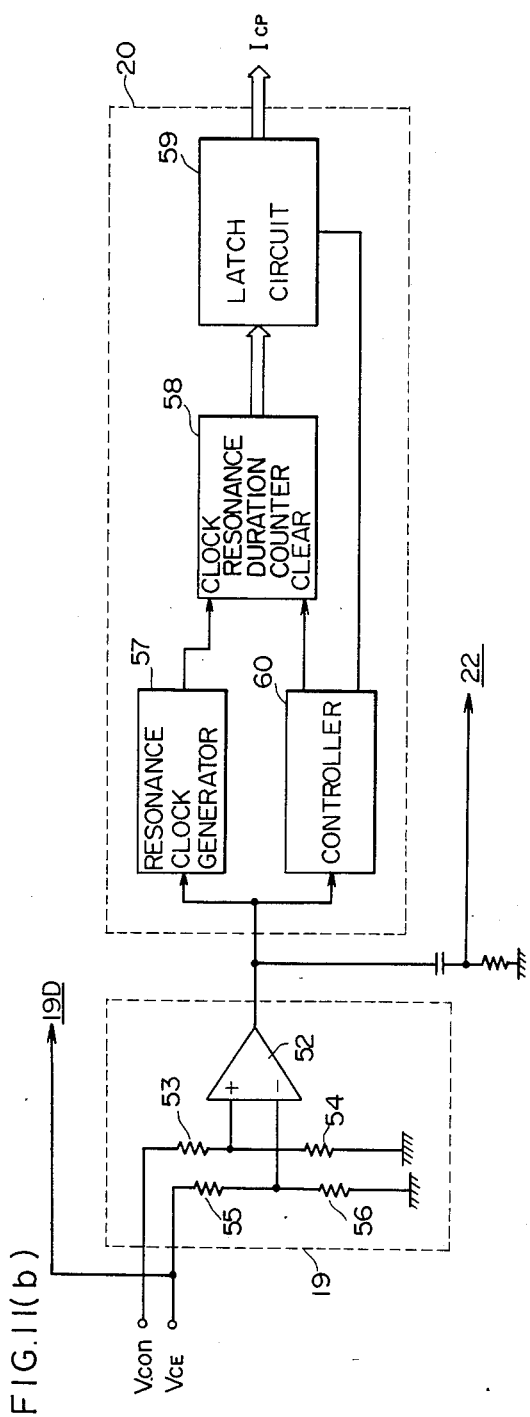
FIG. 11(b) is the same of the second embodiment of the invention.
Figure 12:
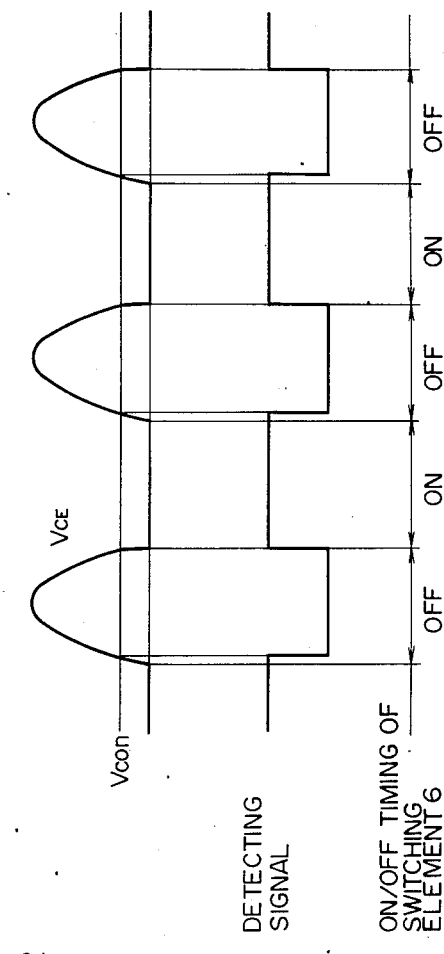
FIG. 12 is a wave form chart showing a relation between terminal voltage at the switching element, voltage at DC power source, and a detection signal of a resonance duration detecting circuit.

While the switching element 6 is kept on at such resonance duration detecting circuit 19 and overcurrent protection circuit 20, terminal voltage $V_{CE}$ at the switching element 6 is zero, so that the ⊕ input terminal at the fifth comparator 52 is higher in voltage than the ⊖ input terminal, thereby outputting a signal at the "H" level. While the "H" level signal is being given, the resonance clock generator 57 and controller 60 are not-operative. When the flip-flop 22 is reset and the switching element 6 is off as above-mentioned, the heating coil 4 and resonance capacitor 5 starts resonance to raise the terminal voltage $V_{CE}$ at the switching element 6 to plot the resonance wave form as shown in FIG. 2(C). A length of the resonance duration depends on material of cooking utensil 12. For example, when a cooking utensil of material, such as aluminum, non-magnetic and of high conductivity is used, the equivalent inductance of heating coil becomes lower to reduce the resonance duration, while, that of metal in iron series and ferromagnetic and of relatively high resistance elongates the same. When the resonance duration starts to raise the terminal voltage $V_{CE}$ at the switching element 6 more than the full-wave rectified power supply voltage Vcon, the fifth comparator 52 outputs a resonance duration detection signal at the "L" level. The controller 60 is given the detection signal to clear the contents of resonance duration counter 58 and the resonance clock generator 57 receives the detection signal and starts to give the clock pulse to the cleared resonance duration counter 58, which is counted-up corresponding to the clock pulse. Upon a finish of resonance duration, when the terminal voltage $V_{CE}$ of switching element 6 becomes lower than the power supply voltage Vcon, the fifth comparator 52 outputs the signal at the "H" level, the flip-flop 22 being set corresponding to the above and the switching element 6 is on. At the same time, the resonance clock generator 57 stops its oscillation to stop the count-up of resonance duration counter 58, thereby holding into the resonance duration counter 58 data corresponding to the resonance duration. Furthermore, at the same time, the controller 60 transmits a latch signal to the latch circuit 59, whereby the data held by the resonance duration counter 58 is output as the limiting data Icp for limiting the on duration length to the time counter for on duration 21 through the latch circuit 59. In addition, FIG. 12 shows the relation between the resonance voltage $V_{CE}$ and the full-wave rectified power supply voltage. FIG. 3(b), 10(b) and 11(b) show a second embodiment of the control circuit of the induction heating apparatus of the invention.

The control circuit of the second embodiment provided with a diode duration detecting circuit 19D for detecting the diode duration wherein the terminal voltage $V_{CE}$ at the switching element 6 is negative, thereby outputting a diode duration detecting signal, which rises when the diode current is eliminated. The diode duration detecting signal output from diode duration detecting circuit 19D is given to the on clock generator 47 of time counter for on duration 21 instead of the resonance duration detecting signal of the first embodiment.

In this second embodiment, also, power setting circuit 16 and time counter for on duration are constructed that when the heating output is set to a maximum by the power setting circuit 16, the maximum output signal Pmax is given to a time counter for on duration 21 to cut off the output of the first comparator 49 thereof.

In such construction, in operation of the apparatus, when the ON signal actuates the drive circuit 8 to turn on the switching element 6, the resonance capacitor 5 is changed in the reverse direction for a while to thereby obtain $V_{CE}<0$.

Hence, a feedback current ID begins to flow through the diode 7 and the diode duration detecting circuit 19D detects that the terminal voltage of switching element 6 becomes negative, thereby outputting the diode duration detecting signal. Thereafter, the accumulated charge is emitted from the resonance capacitor 5 to obtain $V_{CE}=0$ and when the feedback current ID at the diode 7 is zero, the diode duration detecting signal is extinct. whereby the time counter for on duration 21 is actuated to start counting.

On the other hand, when the maximum heating output is set at the power setting circuit 16, the time counter for on duration is given the maximum output signal Pmax from the power setting circuit 16, the first comparator 49 outputs no coincident signal and the second comparator 50 only outputs the coincident signal, in other word, only the limiting date Icp output from the overcurrent protection circuit 20, will decide the on duration of switching element 6.

Hence, in a case where the maximum heating output is set at the power setting circuit 16, the maximum heating output is obtainable in a range wherein the switching element 6 leads to no thermal breakdown.

Figure 13:
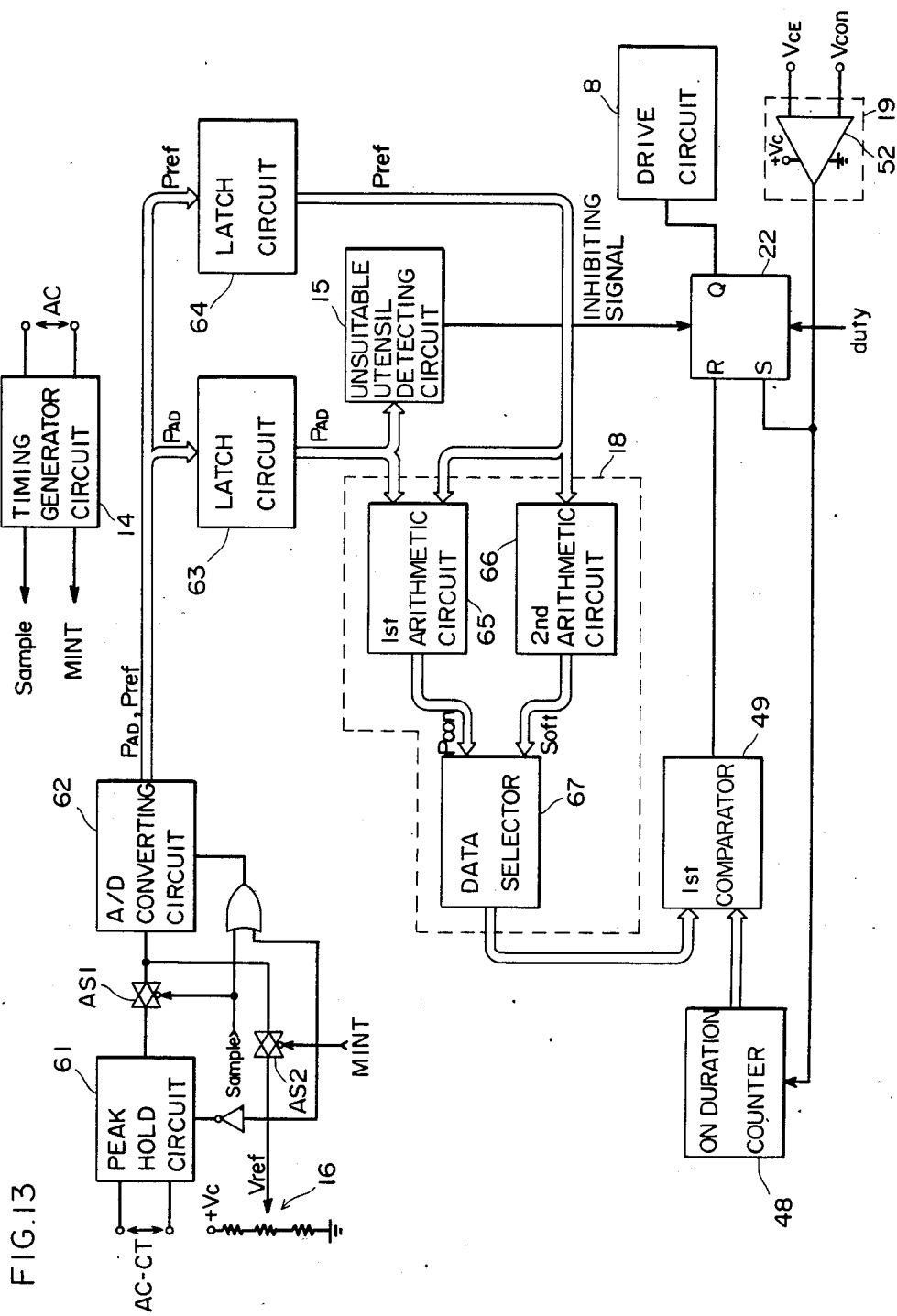
FIG. 13 is a block diagram of a third embodiment of the control circuit at the induction heating apparatus of the invention.

Next, a third embodiment of the control circuit for the induction heating apparatus of the invention is shown in FIG. 13, in which the components corresponding to those in the first and second embodiment are designated by the same reference numerals. In the third embodiment, an AC input current is peak-held by a peak hold circuit 61, and after converted into input data PAD by an A/D converting circuit 62, transmitted to a latch circuit 63. On the other hand, the power setting circuit 16 comprises an analog circuit using variable resistances, an output of which is converted into the power setting data Pref by the A/D converting circuit 62 with the timing different from the A/D conversion timing of peak hold voltage and then transmitted to a latch circuit 64. In other words, this embodiment uses the A/D converting circuit 62 in time division. In addition, this time division operation is carried out in such a manner that an analog switch AS1 is on with the timing for Sample signal generated by the timing generator circuit 14 to connect the peak hold circuit 61 to the A/D converting circuit 62 so that an analog switch AS2 is on with the timing for the MINT signal, thereby connecting the power setting circuit 16 to the A/D converting circuit 62.

Also, in this embodiment, the on duration setting circuit 18 is given input data PAD and power setting data Pref from the latch circuits 63 and 64 respectively so that a first arithmetic circuit 65 generates the on duration data Pcon and a second arithmetic circuit 66 generates data Soft of Pref reduced at a predetermined ratio, the data Pcon and Soft being selectively output by a data selector 67. In other words, the data selector 67 generates data Soft when the inverter starts oscillation and outputs Pcon after the lapse of predetermined time from the start of oscillation.

Figure 14:
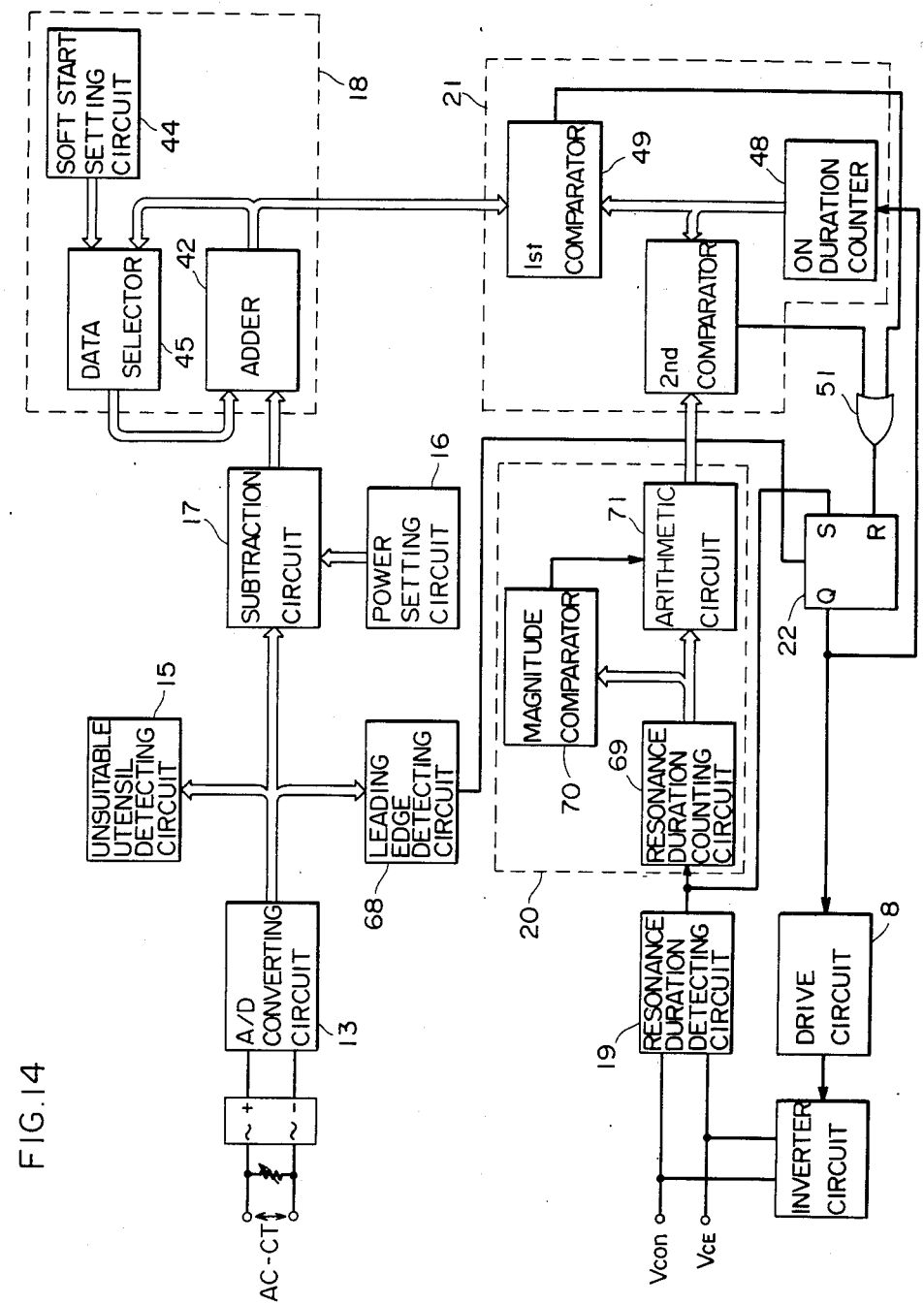
FIG. 14 is a block diagram of a fourth embodiment of the same.

Referring the FIG. 14, a fourth embodiment of the control circuit at the induction heating apparatus of the invention is shown, in which the components corresponding to those in the former embodiments are designated by the same reference numerals. In the fourth embodiment, a leading edge detecting circuit 68 is provided which detects the difference PAD2−PAD1 between the initial input data PAD1 after the start of oscillation of inverter and the next input data PAD2, thereby inhibiting the flip-flop 22 when PAD2−PAD1 is smaller than the predetermined value. The overcurrent protection circuit 20 is provided with a resonance duration counting circuit 69 for counting the resonance duration, a magnitude comparator 70 for outputting signals when the counting content of resonance duration counting circuit 69 is lower than a certain set value, and an arithmetic circuit 71 which receives the content of counting circuit 69 and normally outputs the counting content as the limiting data Icp for limiting the on duration of switching element 6, thereby correcting the counting content of counting circuit 69 to be decreased only when the magnitude comparator 70 gives signal to the same. In other words, the arithmetic circuit 71, when the resonance duration is short, further reduces the count content of counting circuit 69 and outputs it as the limiting data Icp. In addition, in case that a shift register is used as the arithmetic circuit 71 so that when a signal is given from the magnitude comparator 70, the content is once shift, for example, from logical "0101" to "0010", the above correction is easy.

As seen from the above, the induction heating apparatus of the invention realizes largely accurate measurement of on duration and accurate output adjustment as compared with conventional one which uses the analog circuit, such as CR time constant circuit, to set the on duration of switching elements. Also, the on duration of switching element can be easily set by changing the on duration data in the on duration setting circuit. Also, such inverter's control circuit is digitized to enable the control circuit to be the monolithic integrated circuit, thereby expecting a small-sized control circuit, in turn the induction heating apparatus small-sized, light-weight and smaller in thickness.

Furthermore, the second embodiment of the induction heating apparatus of the invention is so constructed that when the maximum heating output is set, means for clear off the signal output from the means for obtaining the on duration of switching element 6, that is, the on duration setting circuit 18, decides the on duration of switching element 6 through the switching element protection means only, that is, the overcurrent protection circuit 20. Hence, the rapid heating is possible to a maximum while preventing the switching element 6 from thermal breakdown.

Figure 15:
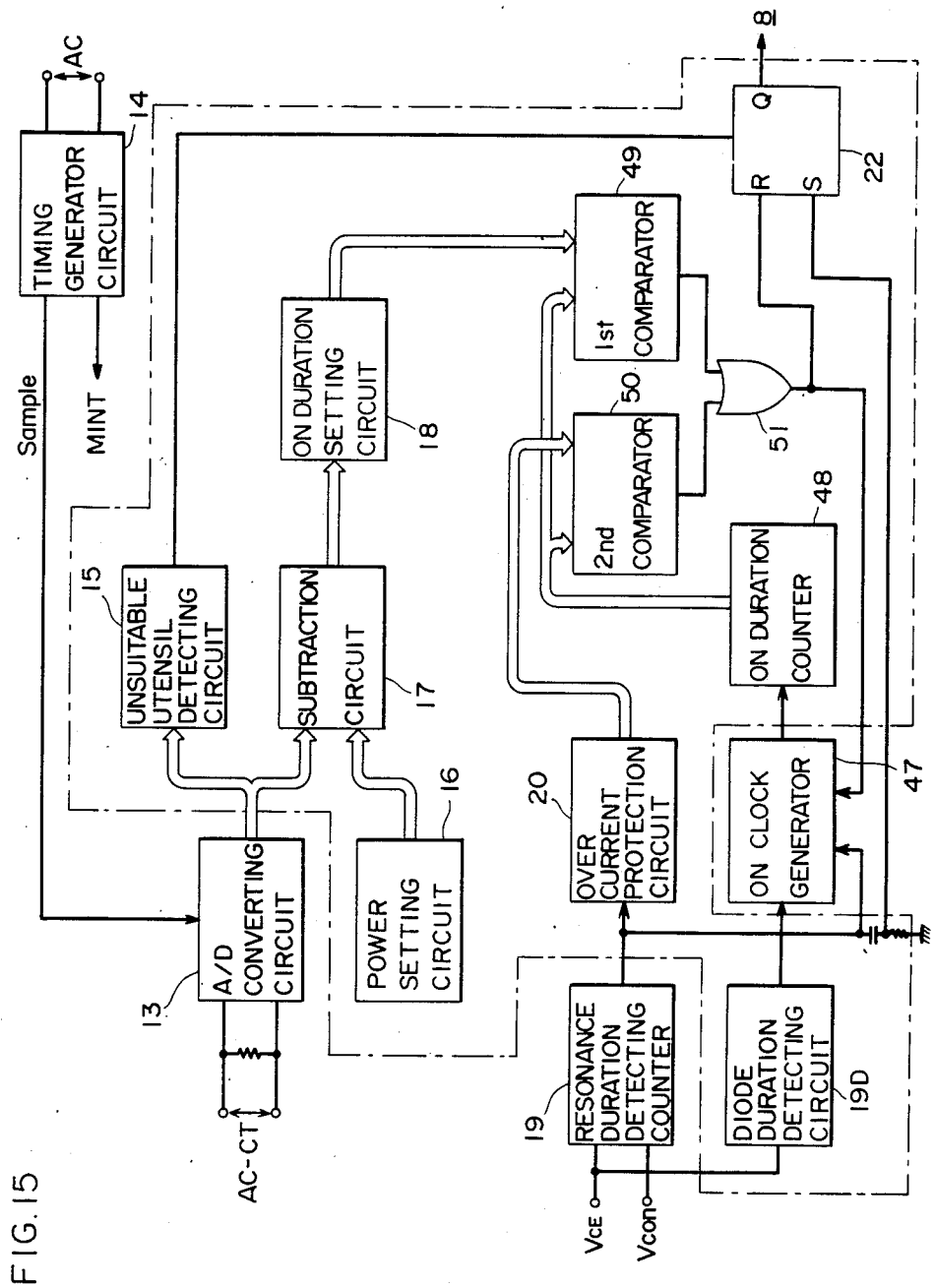
FIG. 15 is a block diagram of a fifth embodiment of the same.
Figure 16:
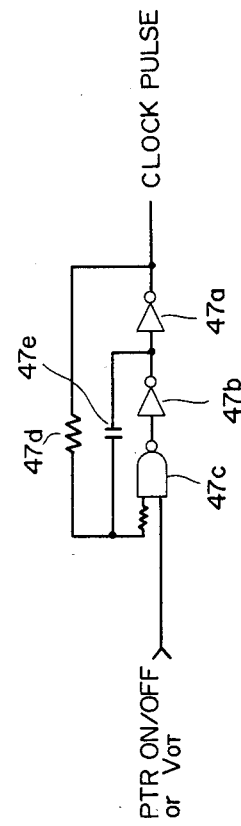
FIG. 16 is a circuit diagram of an on-clock generator of the same.

In a fifth embodiment of the invention shown in FIG. 15, in which the components corresponding to those in the former embodiments are designated by the same reference numerals, only the portion encircled by the broken line is the monolithic-integrated circuit, in other words, an on clock generator 47 is an external part. The on clock generator 47 comprises inverters 47a and 47b, NAND gate 47c, resistance element 47d and capacity element 47e, for example, as shown in FIG. 16, which are packaged to one chip IC. Accordingly, the on clock generator 47 is only externally attached which is capable of changing the values of resistance element 47d and capacity element 47e to be adjusted in the predetermined clock cycle period corresponding to power supply voltage in a region wherein the apparatus is used, whereby the induction heating apparatus of the same output mode, even in a region where the power supply voltage differs, can be provided. Thus, this embodiment will increase the general use of control circuit at the induction heating apparatus and saves the number of parts to be prepared in the shop, thereby improving the productivity.

Figure 17:
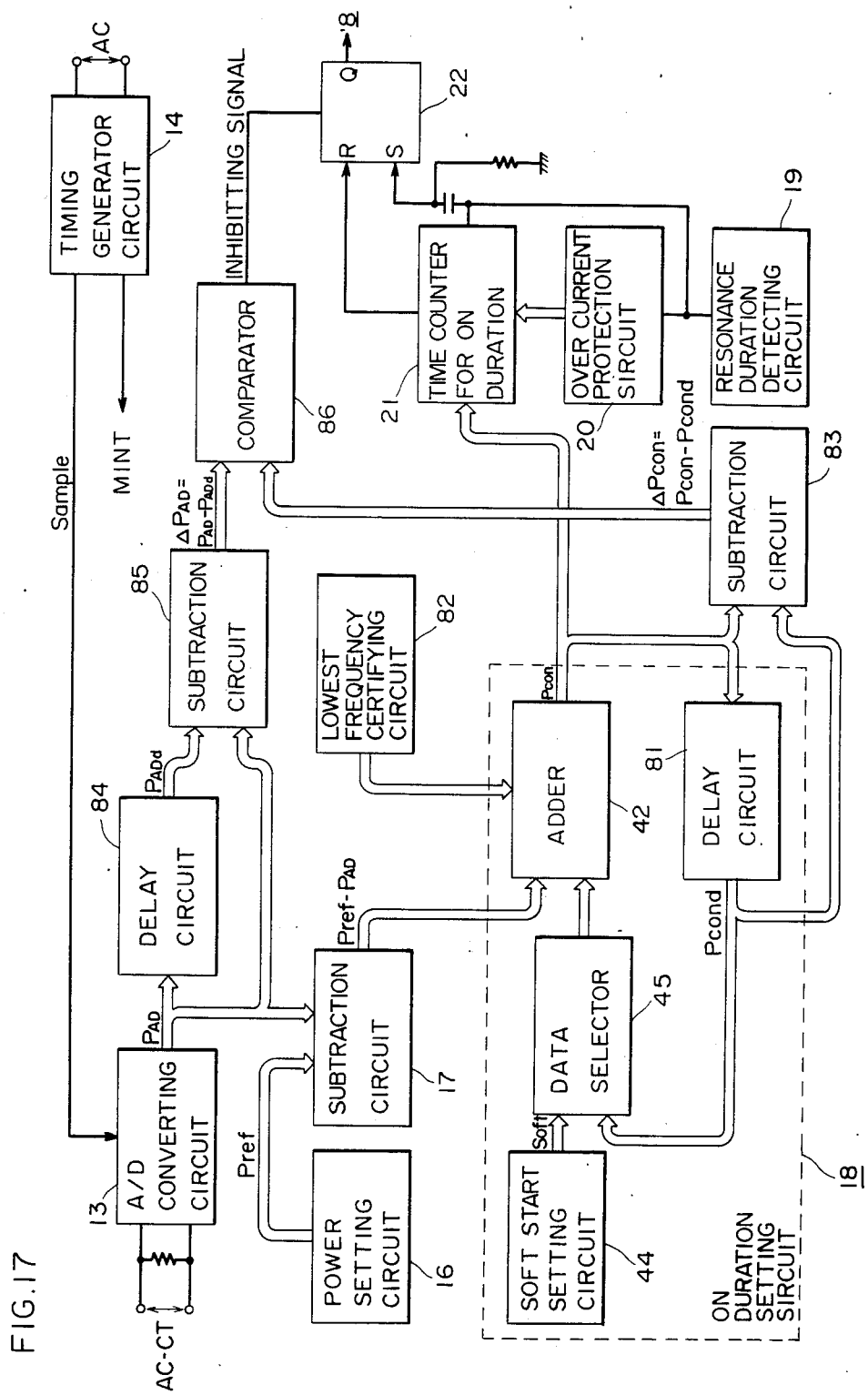
FIG. 17 is a block diagram of a sixth embodiment of the control circuit of the induction heating apparatus of the invention.

Next, a sixth embodiment of the invention is shown in the block diagram in FIG. 17, in which a control circuit includes means for computing a variation ΔPcon of the on duration data Pcon, means for computing a variation ΔPAD of the input data PAD, and means for comparing both the variations. In a case where the comparator detects that ΔPAD is smaller than ΔPcon as a result of comparison, a load is decided to be unsuitable to thereby turn off the switching element 6. Hence, such construction enables detection of unsuitable load immediately after the inverter circuit starts its oscillation.

Next, explanation will be given on the sixth embodiment in FIG. 17, in which the components corresponding to those in FIGS. 3(a), (b) and 8 are designated by the same reference numerals. In FIG. 17, an on duration setting circuit 18 comprises an adder 42 for outputting the on duration data Pcon, a delay circuit 81 for delaying the on duration data Pcon from the adder 42 by one data, i.e., one MINT signal, thereby outputting the delay signal as Pcond, a soft start setting circuit 44 for setting the relatively smaller initial on duration data Soft when the apparatus of the invention starts its oscillation, and a data selector 45 which selects either data Soft from the soft start setting circuit 44 or data Pcond from the delay circuit 44, the adder 42 being given the output from the data selector 45 and difference data Pref-PAD: the output from the SUB circuit 17. In brief, in the on duration setting circuit 18, when the inverter starts oscillation, the initial on duration data Soft from the soft start setting circuit 44 is selected by the data selector 45, the data Soft being output as the on duration data Pcon through the adder 42. Once oscillation starts, the on duration data Pcon output from the adder 42 is delayed by the delay circuit 81 and regiven to the adder 42 through the data selector 45 so that the adder 42 adds to Pcon the difference data Pref-PAD given from the SUB circuit 17, thereby operating to output new on duration data Pcon. Such operation in the adder 42 is carried out in synchronism with the MINT signal.

In FIG. 17, reference numeral 82 designates a lowest frequency certifying circuit for certifying the lowest frequency of this apparatus, which limits the maximum value of on duration data Pcon computed by the adder 42 to prevent the oscillation frequency of the apparatus from lowering below the audible compass, 83 designates a second subtraction (SUB) circuit given the on duration data Pcon output from the adder 42 and the on duration data Pcond delayed by the delay circuit 81 to an extent of one data, which computes a difference between Pcon and Pcond, that is, the variation ΔPcon=Pcon−Pcond of the on duration data, 84 designates a delay circuit which delays the input data PAD output from the A/D converting circuit 13 to an extent of one data, i.e., one MINT signal, 85 designates a third subtraction circuit (SUB circuit) which is given the data PADd from the delay circuit 84 and also the input data PAD from the A/D converting circuit 13 and computes the variation ΔPAD=PAD−PADd in the input data, and 86 designates a comparator receiving the data ΔPcon and ΔPAD from the SUB circuits 85 and 84 and inhibiting the flip-flop 22 when $|\Delta Pcon| > k|\Delta PAD|$ is obtained with respect to the proper positive constant k, thereby stopping switching operation of switching element 6.

Figure 18:
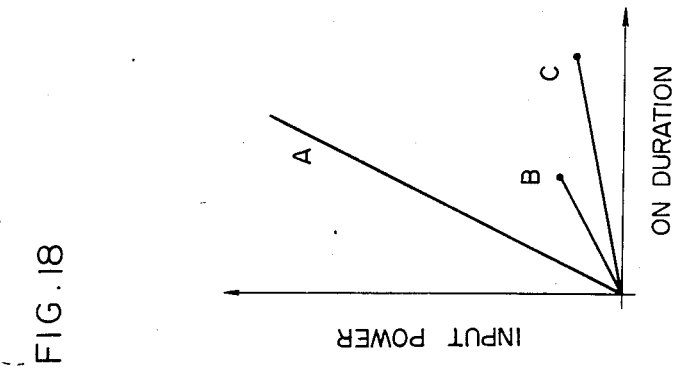
FIG. 18 is a graph showing a relation between the on-duration of the switching element and an input power into the inverter circuit of the sixth embodiment.

Such induction heating apparatus as aforesaid successively increases the on duration data Pcon when oscillation starts, resulting in that the input data PAD made by A/D converting an input current will increase. The ΔPcon in the on duration data Pcon and ΔPAD in the input data PAD are computed to be generated, the comparator 86 checks whether or not $k|\Delta Pcon| > |\Delta PAD|$ is obtained. Normally, when a proper load of magnetic metal, such as iron, is used as the cooking utensil, since $|\Delta PAD|$ is relatively larger than $|\Delta Pcon|$ as shown in the line A in FIG. 18 to result in $k|\Delta Pcon| > |\Delta PAD|$, the comparator 86 applies no inhibition to the flip-flop circuit 22, thereby continuing the oscillation. On the contrary, in case where a cooking utensil of weak magnetic metal, such as aluminum, is used, or oscillation is carried out by a small object load, such as a knife or a fork, or in the no-load condition, since $|\Delta PAD|$ is relatively small with respect to $|\Delta Pcon|$ as shown in the lines B and C in FIG. 18 to result in that $k|\Delta Pcon| < |\Delta PAD|$ is obtained, the flip-flop circuit 22 is inhibited by the comparator 86 to stop the inverter oscillation.

Figure 19:
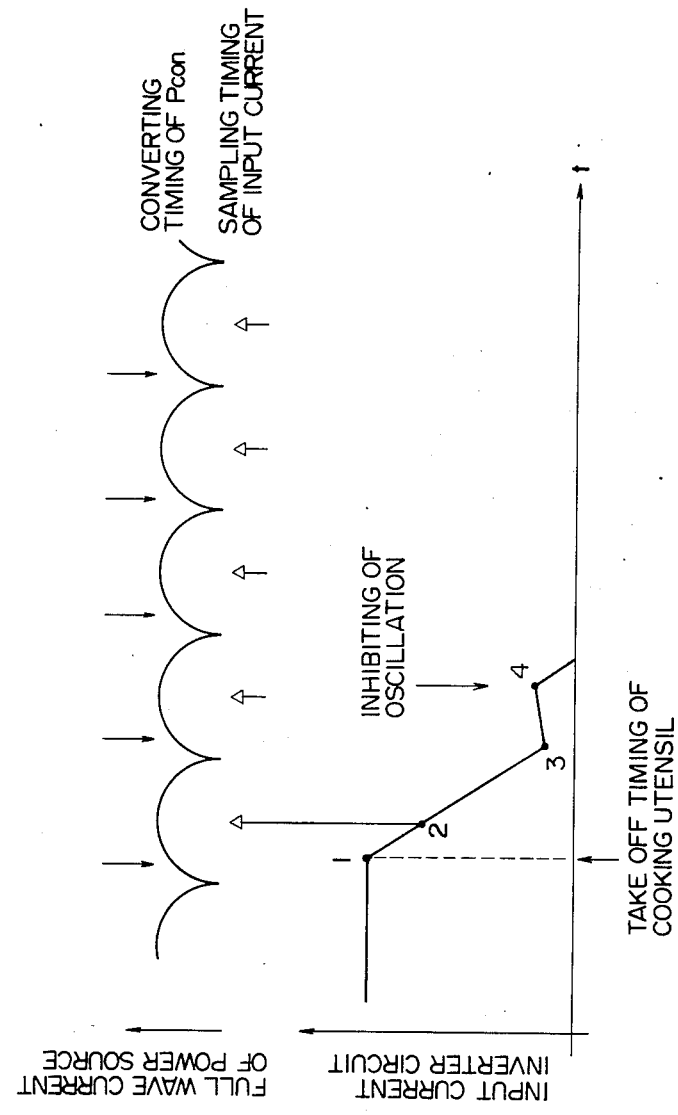
FIG. 19 is a timing chart when a cooking utensil is taken off from the same.

In a case where the cooking utensil 12 is taken off which is properly used to carry out the inverter oscillation, the input current quantity detected by the current transformer 11 is reduced corresponding to the timing of taking off of cooking utensil 12 as shown in FIG. 19, the input current being converted into input data PAD by the A/D converting circuit 13 corresponding to the Sample signal from the timing signal generator circuit 14, whereby the control circuit resets the on duration data Pcon in synchronism with MINT signal so as to increase the input current. Hence, the input current rises to increase the input data PAD and converted with the timing for the next sample signal. At this time, however, the oscillation is carried on in the no-load condition, so that variation ΔPAD in the input data is not so large. Accordingly, the variation ΔPcon in the on duration data and that ΔPAD in the input data have therebetween a relation of $k|\Delta Pcon| > |\Delta PAD|$, thereby giving inhibition from the comparator 86 to the flip-flop circuit 22.

As seen from the above, the control circuit in this embodiment compares the variation ΔPcon in the on duration data with that ΔPAD in the input data so that when ΔPAD is larger than ΔPcon, the inverter oscillation is stopped, so that the unsuitable load is detectable immediately after the oscillation starts, thereby saving useless power consumption. Also, since an abnormal load detection depends on the set output, any complicated circuit is not required and simple construction enables abnormal load detection.

Figure 20:
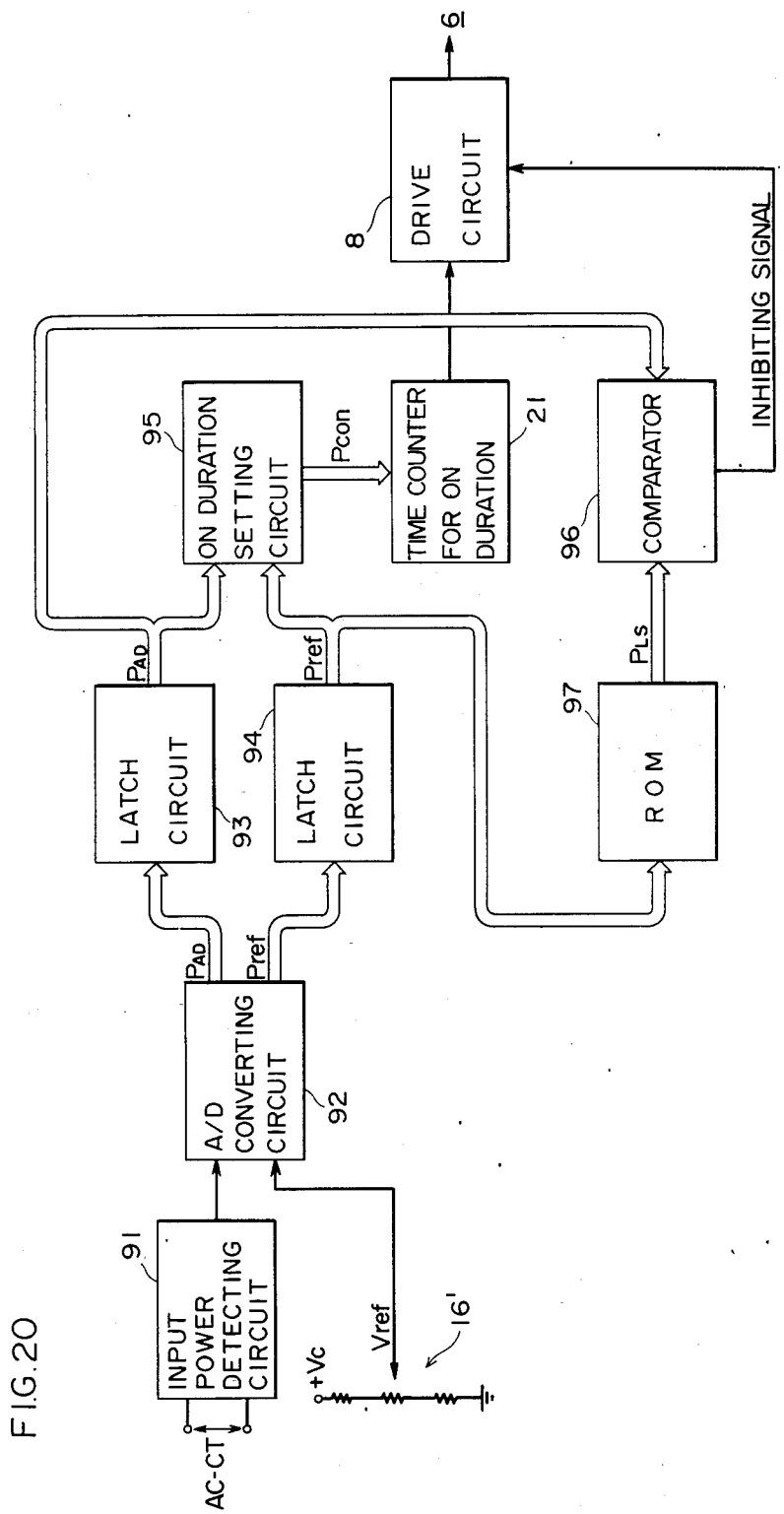
FIG. 20 is a block diagram of a seventh embodiment of the control circuit of the induction heating apparatus of the invention.

A seventh embodiment of the invention shown in the FIG. 20 block diagram, is provided with a read only memory (ROM) 97 which receives as an address input an output from an analog system power setting circuit 16' and stores different small-object detection level PLS with respect to each address and with a comparator 96 which compares the input data PAD with the small object detection level PLS to carry out small object detection. Such construction facilitating setting and change of small object detection characteristic and each induction heating apparatus can set each different small object load detecting characteristic. Next, explanation will be given on the seventh embodiment in accordance with FIG. 20.

In FIG. 20, reference numeral 91 designates an input power detecting circuit for rectifying-smoothing the current transformer 11 and detecting an input current, 16' designates a power setting circuit for setting the heating output of this apparatus and comprising a volume or the like, 92 designates an A/D converting circuit which converts the output of input power detecting circuit 91 into digital input data PAD in synchronism with the peak of cycle at the full-wave rectified voltage of AC power source and the output of power setting circuit 16' into digital setting data Pref in synchronism with the low potential portion of full-wave rectified voltage at AC power source, the outputs of A/D converting circuit 92 being given to latch circuits 93 and 94 respectively, 95 designates an on duration setting circuit given the input data PAD and power setting data Pref from the latch circuits 93 and 94 respectively, which is somewhat different from the on duration setting circuit 18 in each embodiment abovementioned so as to make variable the on duration data Pcon corresponding to the duration to be on by the switching element 6 so that the input data PAD is equal to the power setting data Pref, 21 designates a time counter for on duration given the on duration data Pcon from the on duration setting circuit 95, which counts up a counter housed in the apparatus similarly to that contained in the aforesaid embodiments, when the switching element 6 is on so that when the content of count-up is equal to the on duration data Pcon, the switching element 6 is turned off through the drive circuit 8, 97 designates a ROM (Read Only Memory) given the power setting data Pref as the address, the content of each address is stored in the small object detection level PLS corresponding to the power setting data Pref specifying said address, and 96 designates a comparator given the input data PAD from the latch circuit 93 and the small object detection level PLS from the ROM 97, which when PLS>PAD, applies an inhibiting signal to the drive circuit 8.

In detail, the control circuit adjusts the on duration length of switching element 6 so that the power setting data Pref is equal to the input data PAD by means of the on duration setting circuit 95, and uses the ROM 97 to generate the small object detection level PLS corresponding to the power setting data Pref, thereby comparing through the comparator 96 the small object detection level PLS with the input data PAD, thus detecting the small object load.

Accordingly, the induction heating apparatus of such construction is unnecessary of complex conversion circuit such that the power setting data Pref generates the small object detection level PLS.

The characteristic for variation in the small object detection level PLS corresponding to the power setting data Pref need only be executed by storing a desired content when the memory contents of ROM is set.

Figure 21:
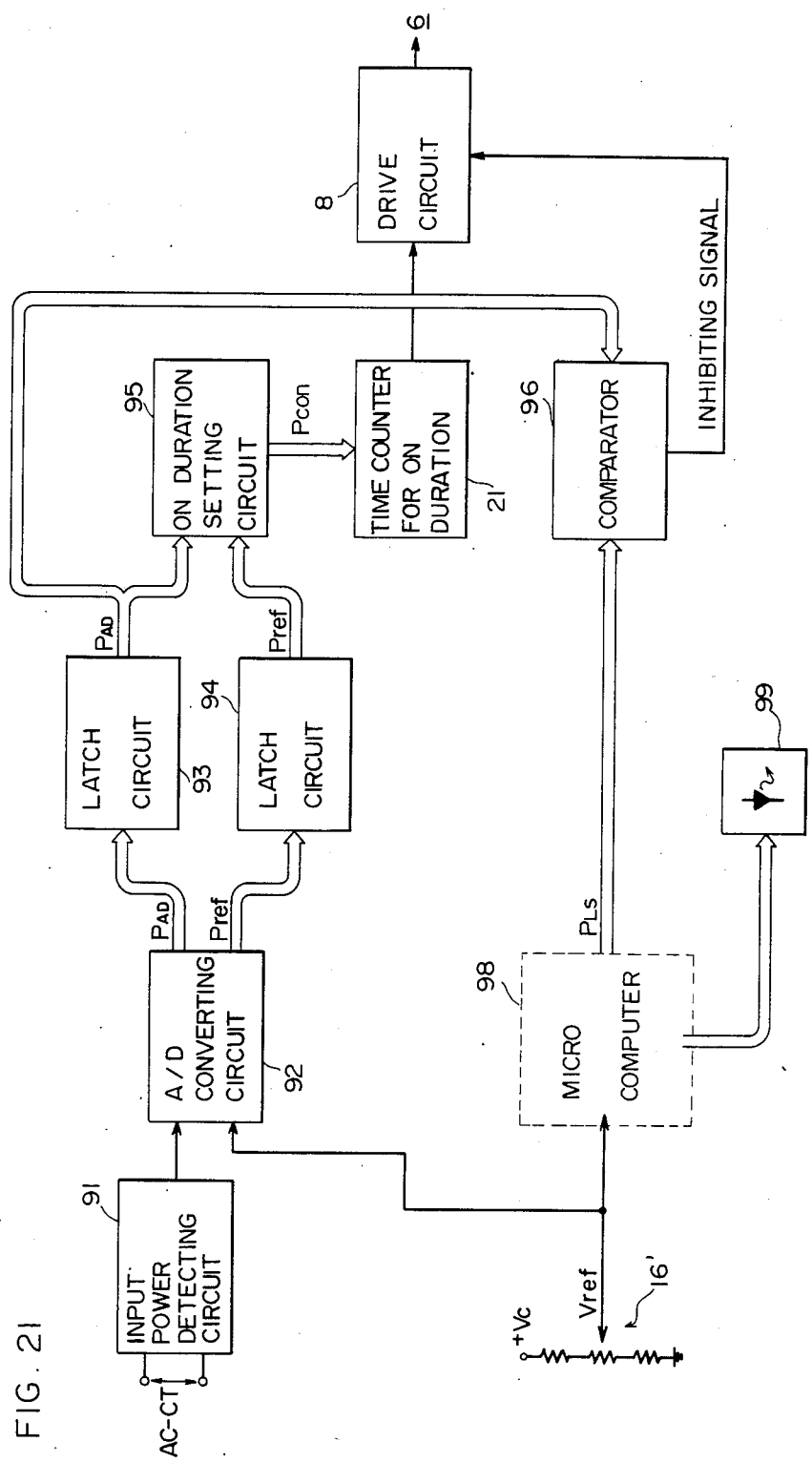
FIG. 21 is a block diagram of the seventh embodiment, in which a microcomputer is used instead of ROM.

FIG. 21 is a block diagram of the seventh embodiment using a microcomputer 98 instead of ROM 97, in which the components corresponding to those in FIG. 20 are designated by the same reference numerals. In FIG. 21, a signal from power setting circuit 16' is given to the microcomputer 98 controlling display of the set power, the microcomputer 98 having therein an A/D converter and ROM (both are not shown) and using them to generate the small object detection level PLS. In addition, reference numeral 99 in FIG. 21 designates a display for displaying the set power or the like.

This embodiment as abovementioned is provided with storing means given the output as the address input from the output setting means and storing the small object detection level changeable corresponding to each address, that is, ROM 97 or microcomputer 98, and a comparator 96 for comparing the input data PAD with the small object detection level PLS to detect the small object. Thus, the memory content of the storing means is written in every induction heating apparatus, whereby every apparatus can set the desired small object detection characteristic with ease and there is no need of using the complicated converter circuit to obtain the desired small object detecting characteristic, thereby expecting miniaturization of the control circuit.

Figure 22:
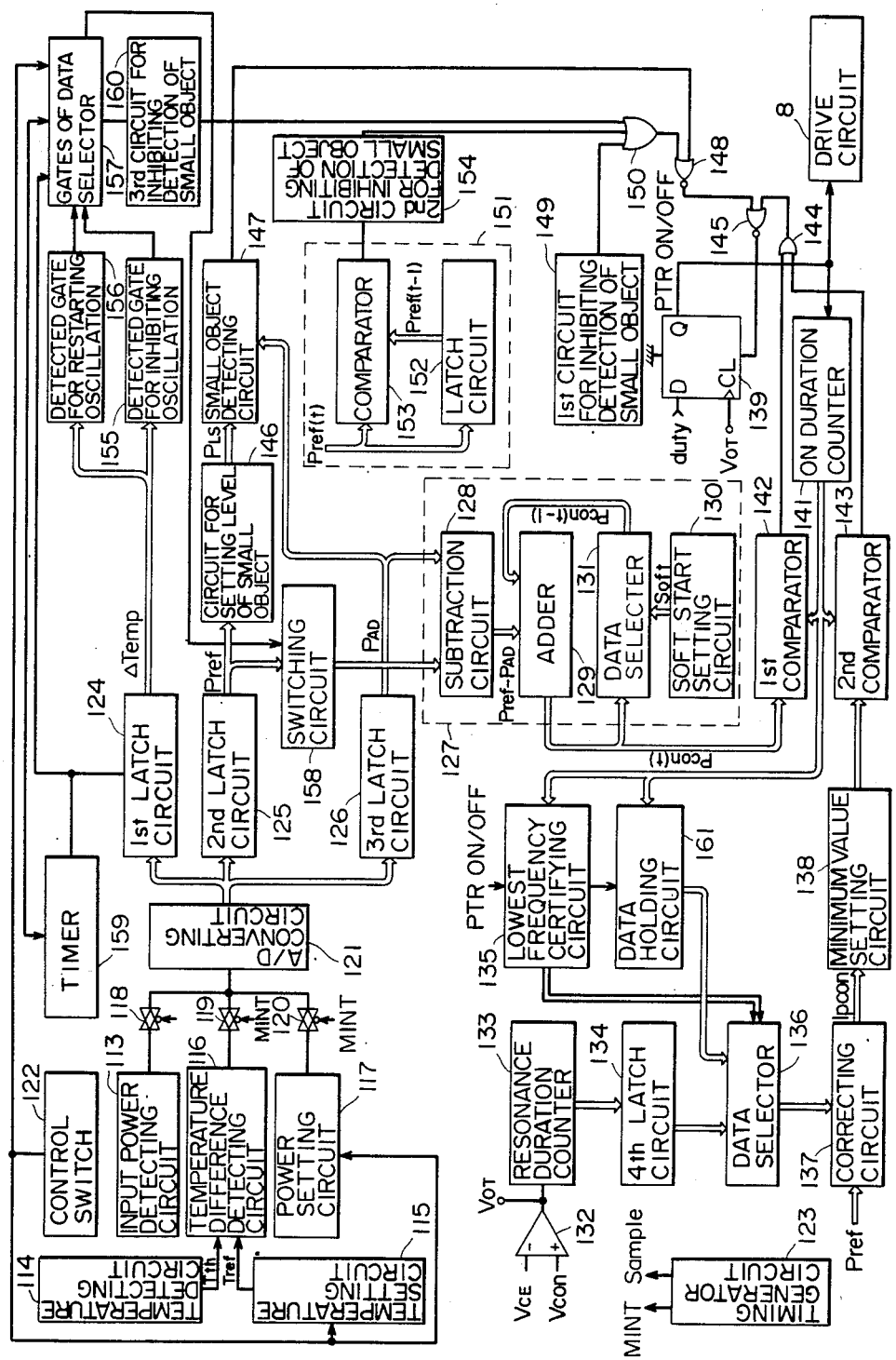
FIG. 22 is a block diagram of a eighth embodiment of the control circuit of the induction heating apparatus of the invention.

Referring to FIG. 22, explanation will be given on the eighth embodiment of the control circuit when used for thermally controlling the apparatus of the invention.

The former embodiments each compare the power setting data Pref from the power setting circuit with the input data PAD corresponding to the input current to thereby detect the unsuitable load and stop the inverter oscillation. In such induction heating apparatus, however, even when the power setting data Pref from the power setting circuit changes, the input data PAD does not change until the next A/D conversion timing, i.e., the sampling timing, whereby it cannot be said that the unsuitable load is not inevitably exactly detected during the change in the power setting data. In fact, even when an oscillation carries out with proper load, it cannot be said that there is no possibility for oscillation stop.

While, this embodiment is so constructed that the oscillation stop by the unsuitable load detection circuit is inhibited until the input current value is A/D converted and new input data is given after a value of power setting data Pref changes.

Next, explanation will be given on the eighth embodiment of the control circuit 4 in accordance with FIG. 22, in which reference numeral 113 designates an input power detecting circuit which rectifies and smoothing the output from the current transformer 11 and detects the input and corresponds to the input power detecting circuit 91 in FIGS. 20 and 21, 114 designates a temperature detecting circuit disposed in proximity to a top plate on which the cooking utensil 12 is placed and comprising a thermister or the like, 115 designates a temperature setting circuit so that a difference between the detected temperature at the temperature detection circuit 114 and the set temperature at the temperature setting circuit 115 is detected by a temperature difference detection circuit 116, 117 designates a power setting circuit for setting the heating output of induction heating apparatus, which corresponding to the power setting circuit 16 at the respective former embodiments, the input power detection circuit 113, temperature difference detection circuit 116 and power setting circuit 117 giving the outputs thereof to an A/D converting circuit 121, 122 designates a control switch for switching temperature control and output control, which switches to decide whether the power setting circuit 117 develops the maximum setting output to make variable the setting temperature by the temperature setting circuit 115, or the set output of power setting circuit 117 is made variable and the set temperature of temperature setting circuit 115 is set to a detecting temperature for preventing miss heating, that is, the maximum set temperature, 123 designates a timing generator circuit, the same as in the former embodiments and corresponding to the circuit 14 in the former embodiment, for generating a Sample signal giving the timing for the high potential portion in a pulsating current of full-wave rectifying the AC power supply voltage and the MINT signal in synchronism with the low potential portion in the same, the Sample signal being given to an analog switch 118, the MINT signal being given selectively to analog switches 119 and 120 not to be simultaneously given, in other words, the different timings turn on the analog switches 118, 119 and 120 respectively, whereby the A/D converting circuit 121 converts through time division the output signals from the input power detection circuit 113, temperature difference detection circuit 116 and power setting circuit 117, into the digital input data PAD, temperature difference data Δtemp. and power setting data Pref respectively, 124 designates a first latch circuit for latching the temperature difference data Δtemp., 125 designates a second latch circuit for latching the power setting data Pref, 126 designates a third latch circuit for latching the input data PAD, 158 designates a switching circuit connected to the second latch circuit, which switches selection either of the output Pref from the second latch circuit 125 or of the data P'ref set in the switching circuit 158 and corresponding to 500 W heating, the switching circuit 158, when in heating operation by output control, always selecting the output Pref of second latch circuit 125; 127 designates an on duration setting circuit connected to the switching circuit 158 and third latch circuit 126, which corresponds to the on duration setting circuit 18 at the respective former embodiments and comprises a SUB circuit 128 for taking the difference Pref-PAD between the power setting data Pref and the input data PAD, an adder 129 which sets on duration data Pcon corresponding to the on duration of switching element 6 and adds Pref-PAD to Pcon to make new on duration data Pcon, a soft start setting circuit 130 setting Soft as the on duration data in the initial oscillation, and a data selector 131 for selecting that either the Soft from the soft start setting circuit 130 or the output Pcon from the adder 129 is to be given into the adder 130. In other words, the on duration setting circuit 127, in the initial oscillation selects by the data selector 131 the data Soft from the soft start setting circuit 130 and gives said data into the adder 129 so that the adder 129 outputs the data Soft as first on duration data Pcon, and after the starting of oscillation, the data selector 131 selects the output Pcon from the adder 129 to give Pcon to the input of adder 129, whereby the adder 129 adds Pref-PAD to Pcon to set new on duration data. Also, reference numeral 132 designates a comparator whose ⊕ input terminal is given power supply voltage Vcon supplied through the full-wave rectifying circuit 1 and choke coil 2 and whose ⊖ input terminal is given terminal voltage VCE of switching element 6, 133 designates a resonance duration counter given an output Vot from the comparator 132 and corresponding to the resonance duration counter 19 at the respective former embodiments, the resonance duration counter 133 counting the duration wherein the output Vot is at the "L" level, in turn the resonance duration length of inverter circuit, 134 designates a fourth latch circuit for latching the output from the resonance duration counter 133, 135 designates a lowest frequency certifying circuit which is given ON/OFF signal from the switching element 6 and corresponds to the lowest frequency certifying circuit 82 in FIG. 17, which circuit 135 measures a period from the beginning of switching-off of the ON/OFF signal by the switching element 6 to a start of the next switching-off period, so that when such period exceeds 50 μsec, that is, when the frequency is below 20 kHz, the switching element 6 is off and also a value at that time of an on duration counter 141 to be discussed below is held in a data holding circuit 161; 136 designates a data selector for selecting a smaller value of the outputs from the fourth latch circuit 134 and data holding circuit 136; 137 designates a correcting circuit for correcting a data value from the data selector 136 corresponding to the power setting data Pref, the correcting circuit 137 having a characteristic such that when the power setting data Pref changes from a minimum to a maximum, the output IPcon from the correcting circuit 137 gradually rises to correspond to the data value IP'con from the data selector 136, thereby outputting the IPcon as the on duration limiting data, 138 designates a minimum value setting circuit for setting a minimum value of on duration limiting data IPcon from the correcting circuit 137, thereby controlling IPcon not to be below the set value, in other words, preventing a difficulty of decision of unsuitable load detection because when IPcon becomes smaller and the input current too smaller, a difference between the input currents in the cases where a cooking utencil (which has relatively large equivalent resistance) easy to accept the input is used and that (which has relatively small equivalent resistance) not so is used; 139 designates a flip-flop circuit of D type, which corresponds to the flip-flop circuit 22 at the respective former embodiments, the flip-flop circuit 139 being given at the data terminal D a duty signal representing the inverter oscillation duration and at the CP terminal the output Vot of comparator 132, the output Q being an ON/OFF signal for switching element 6. In other words, the flip-flop 139 synchronizes with the leading edge of signal Vot to put the output Q at the "H" level. In addition, when no duty control is carried out, the data terminal D at the flip-flop circuit 139 being given always the "H" signal. Also, reference numeral 8 designates a drive circuit receiving the ON/OFF signal to drive the switching element 6 on or off, 141 designates an on duration counter which starts counting in synchronism with the leading edge of output Q of flip-flop circuit 139 and stops counting in synchronism with the trailing edge of output Q of flip-flop circuit 139 and thereafter clears the count value, the count value being given to the lowest frequency certifying circuit 135, 142 designates a first comparator comparing the on duration data Pcon from the adder 129 with the count value of on duration counter 141 so as to output a signal when both the Pcon and count value coincide with each other; and 143 designates a second comparator which compares the limiting data IPcon from the minimum value setting circuit 138 with the count value of on duration counter 141 so as to output a signal when both coincide with each other, this output signal and the output signal from the first comparator 142 being transmitted to the clear terminal CL at the flip-flop circuit 139 through the OR gate 144 and NOR gate 145. In the D-type flip-flop circuit 139, during the oscillation duty, the Q output is "H" by the signal Vot output when the terminal voltage VCE at the switching element 6 is smaller than the power supply voltage Vcon so that the comparator 132 detects completion of resonance duration, and the Q output gives an ON signal to the drive circuit 8 and starts counting operation of on duration counter 141. On the other hand, when the counting value of on duration counter 141 is compared at the first or second comparator 142 or 143 so that when the value coincides with the on duration data Pcon or the limiting data IPcon, the flip-flop circuit 139 is cleared through the OR gate 144 and NOR gate 145, the output Q of flipflop circuit 139 is at the "L" level, and the drive circuit 8 turns off the switching element 6. At the same time, the on duration counter 141, after the counting once stops, is cleared of its contents.

Reference numeral 146 designates a circuit for setting level of small object for receiving the power setting data Pref sent through the second latch circuit 125, which outputs the small object detection level PLS, 147 designates a small object detecting circuit which compares the small object detection level PLS with the input data PAD transmitted through the third latch circuit 126, so that when PAD<PLS, the clear terminal CL of the flip-flop circuit 139 is given a clear signal through a NOR gates 148 and 145, resulting in that the output Q of flip-flop circuit 139 is of the "L" level and the drive circuit 8 turns off the switching element 6; 149 designates a first circuit for inhibiting detection of small object, whose inhibiting signal is given to the NOR gate 148 through an OR gate 150, whereby it is inhibited that the flip-flop circuit 139 is cleared from the small object detection circuit 47 through the NOR gate 148; and 151 designates a variation detection circuit for detecting a variation in the power setting data Pref from the second latch circuit 125, the variation detecting circuit 151 comprising a latch circuit 152 which is given data Pref(t) from the second latch circuit 125 and outputs Pref(t−1) received with the timing once before and a comparator 153 for comparing the output Pref(t−1) of latch circuit 152 with the power setting data Pref(t).

When the comparison in the comparator 153 results in Pref(t)>Pref(t−1), its output is given to a second circuit for inhibiting detection of small object 154, which gives a signal to the OR gate 150 through the signal from the comparator 153. Also, reference numeral 155 designates a detected gate for inhibiting oscillation which is given temperature difference data ΔTemp from the first latch circuit 124 so as to detect that a value of ΔTemp is logical "000000" for example digital data consists 6-bits), 156 designates a detected gate for inhibiting oscillation which is given temperature difference data ΔTemp from the first latch circuit 124 so as to detect that the value of ΔTemp is, for example, logical "000001" or more, and 157 designates gates of data selector connected to the detected gate for inhibiting oscillation 155 and detected gate for restarting oscillation 156. The gates of data selector 157 acts on a switching circuit 158 to stop and start the oscillation corresponding to the detection signal obtained from the detected gate for inhibiting oscillation 155 and detected gate for restarting oscillation 156, thereby switching the value of Pref given to the SUB circuit 128. Also, the gates of data selector 157 is given the bit signal at, for example, the third bit number in low order of the temperature difference data ΔTemp output from the first latch circuit 124, thereby switching the switching circuit 158. In detail, the switching circuit 158 selects the data P'ref so that the heating output is 500 W when the bit signal is logical "1", and is the set value at the on duration setting circuit 127 when the same is logical "0". Accordingly, in a case where the control switch 122 selects the thermal operation, the temperature adjusting operation starts while switching the heating output of 1300 W or 500 W due to the third bit in low order of logical "138 or "0" output from the first latch circuit 124, and after the set temperature is obtained, the outputs of detected gate for inhibiting oscillation 155 and detected gate for restarting oscillation 156 repeat the oscillation stop and heating operation at 1300 W (the maximum set input power). Also, reference numeral 159 designates a timer which starts time-counting when the bit signal output from the first latch circuit 124 is logical "1" at the third bit number in low order, and after the counting for the predetermined time period, indicates to the gates of data selector 157 switching from 500 W to 1300 W, the timer 159 stops to clear its contents when the bit signal becomes logical "0", the gates of data selector 157 serving as the abovementioned when the control switch 122 is set at the temperature control side, and 160 designates a third circuit for inhibiting detection of small object which is connected to the gates of data selector 157, and when indication is given therefrom of switching from 500 W to 1300 W, gives the detection output to the OR gate 150.

FIGS. 23A through 23H are circuit diagrams exemplary of concrete construction of the control circuit at the induction heating apparatus of the invention, in which the components corresponding to those in FIG. 22 and the signal lines corresponding to those in these drawings are designated by the same reference numerals.

Next, explanation will be given on operation of the control circuit of the embodiment constructed as foregoing, which is under thermal operation.

In a case where the control switch 122 selects the thermal operation, the cooking utensil 12 is heated while the heating output is being switched to 1300 W from 500 W due to the third bit signal in low order and either of logical "1" or "0" at the temperature difference data ΔTemp output from the first latch circuit 124. After the time when the detected temperature Tth by the temperature detecting circuit 114 reaches the set temperature Tref set by the temperature setting circuit 115 (the time when temperature difference data ΔTemp is logical "000000"), the output signals from the detected gate for inhibiting oscillation 155 and detected gate for restarting oscillation 156 repeat the oscillation stop and heating by the heating output of 1300 W (the maximum set power).

Figure 24A:
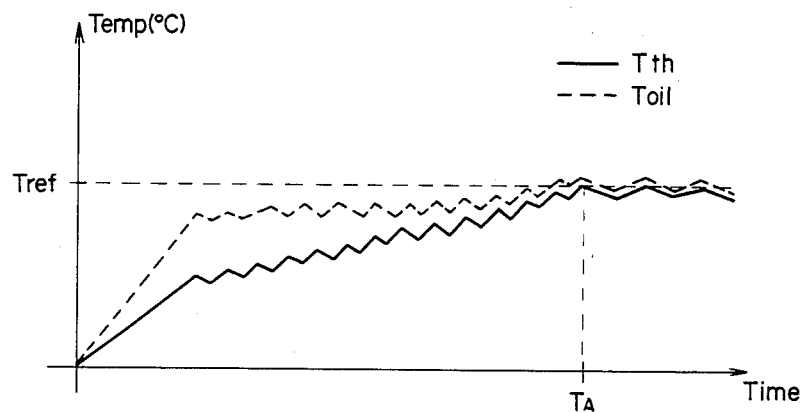
FIGS. 24(a) to 24(c) are graphs each showing a relation between the detection temperature and the temperature of the content in the cooking utensil when the heating is carried out by temperature setting in the eighth embodiment.
Figure 24B:
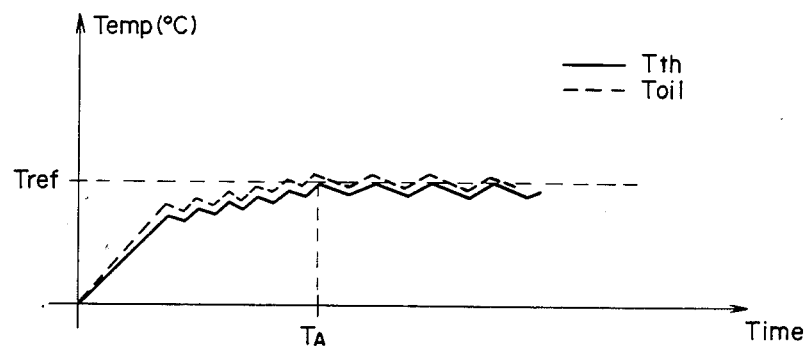
Figure 24C:
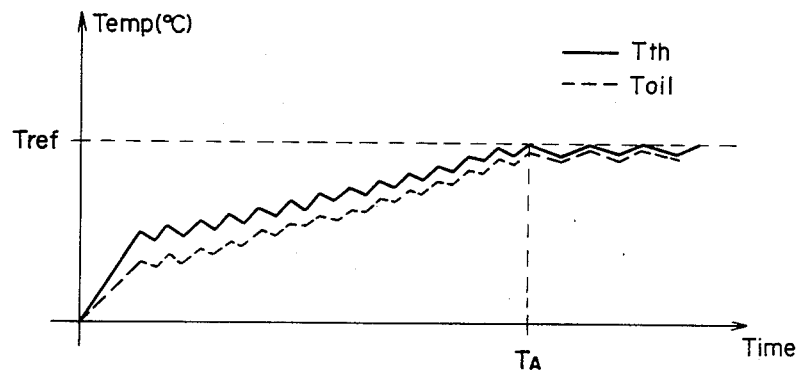

FIG. 24 shows the detected temperature by the temperature detecting circuit 114 (shown by the solid line) and the actual measured temperature Toil (shown by the broken line) of oil within the cooking utensil 12 when the aforesaid thermal operation is carried out, in which FIG. 24(a) shows the above when in use of cooking utensil 12 whose bottom is smaller in thickness and apart at the central portion from the top plate at the apparatus, FIG. 24(b) shows the above when in use of the same having high thermal conductivity and the bottom in close contact with the top plate, and FIG. 24(c) shows the above when using the cooking utensil of the bottom larger in thickness and in close contact with the top plate. Also, FIGS. 25(a), (b) and (c) show the conventional induction heating apparatus as abovementioned.

In this embodiment, since the actual heating, is repeated alternatively 1300 W and 500 W until the detected temperature reaches the time of obtaining the set temperature Tref, the cooking utensil 12 and oil therein are gradually heated, and the overall system comprising the apparatus of the invention, cooking utensil 12 and the contents therein, is in about thermal equilibrium condition. Hence, this embodiment displays the cooking possible at the time TA when the detected temperature Tth reaches the set temperature Tref. On the contrary, the conventional example shown in FIG. 25 displays the cooking possible at the time T1 after the lapse of several minutes from the aforesaid time TA. Accordingly, this embodiment of the invention saves power consumption because of no useless heating.

Next, explanation will be given on operation for detecting an unsuitable load by the control circuit in this embodiment.

In the control circuit of this embodiment, the heating output, when the output operation is selected, is detected by the input power setting circuit 117 and converted by the A/D converting circuit 121 into the power setting data Pref with the timing for the MINT signal and then transmitted to the switching circuit 158 and circuit for setting level of small object 146 through the second latch circuit 125, the switching circuit 158 during the output operation selecting the power setting data Pref to send it to the on duration setting circuit 127. The input current value detected by the input detecting circuit 113 is converted by the A/D converting circuit 121 into the input data PAD with the timing for the Sample signal and then transmitted to the one duration setting circuit 127 and circuit for setting level of small objecr 147 through the third latch circuit 126, wherein the on duration setting circuit 127 as above-mentioned corrects the on duration data Pcon by the power setting data Pref and input data PAD and sends corrected Pcon to the first comparator 142, which is given in the following recurrence formula:

$$Pcon(k) = Pcon(k-1) + (Pref(k-1) - PAD(k-1)).$$

Figure 23A:
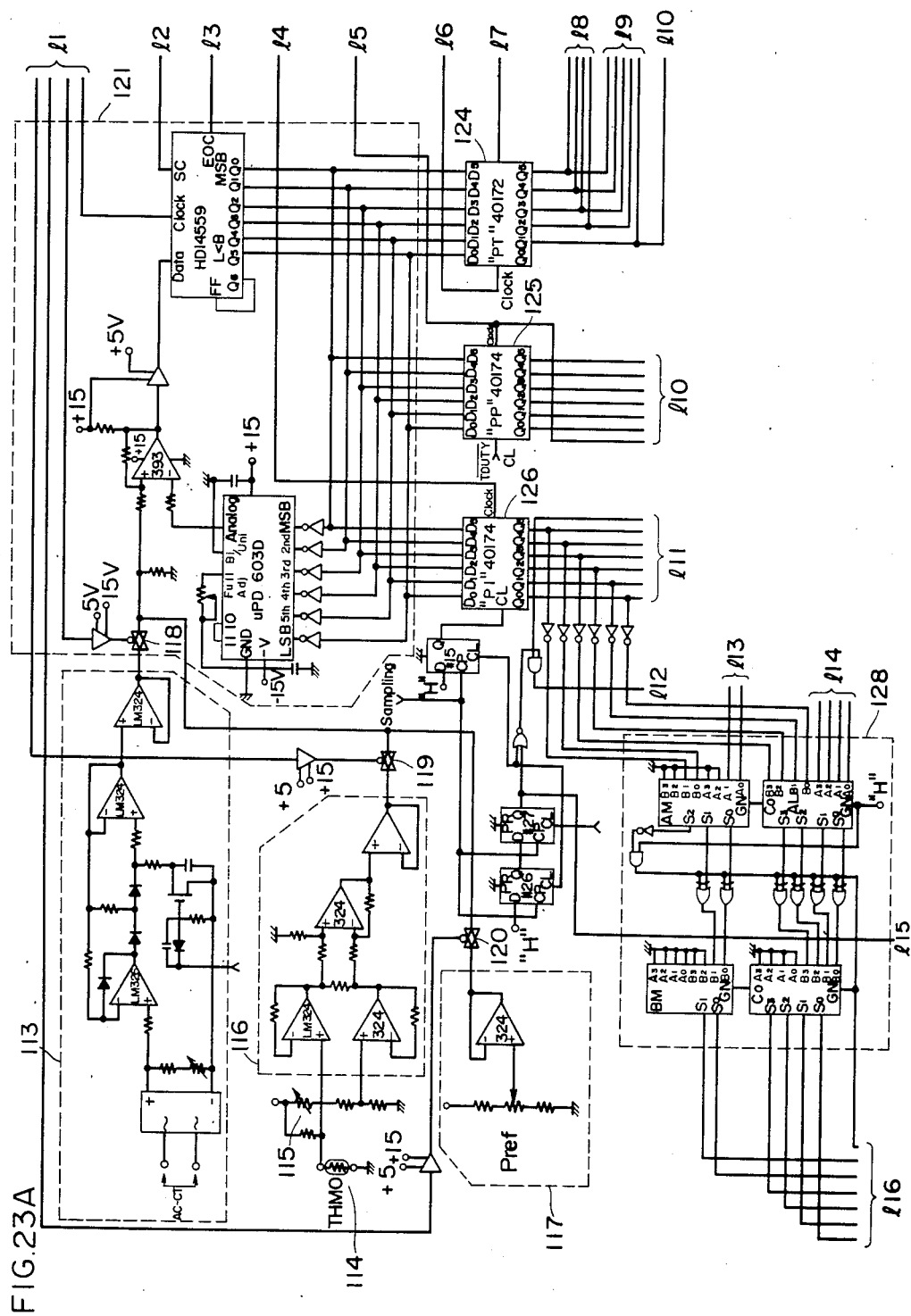
FIGS. 23A through 23H are block diagrams showing concrete constructions of the eighth embodiment.
Figure 23B:
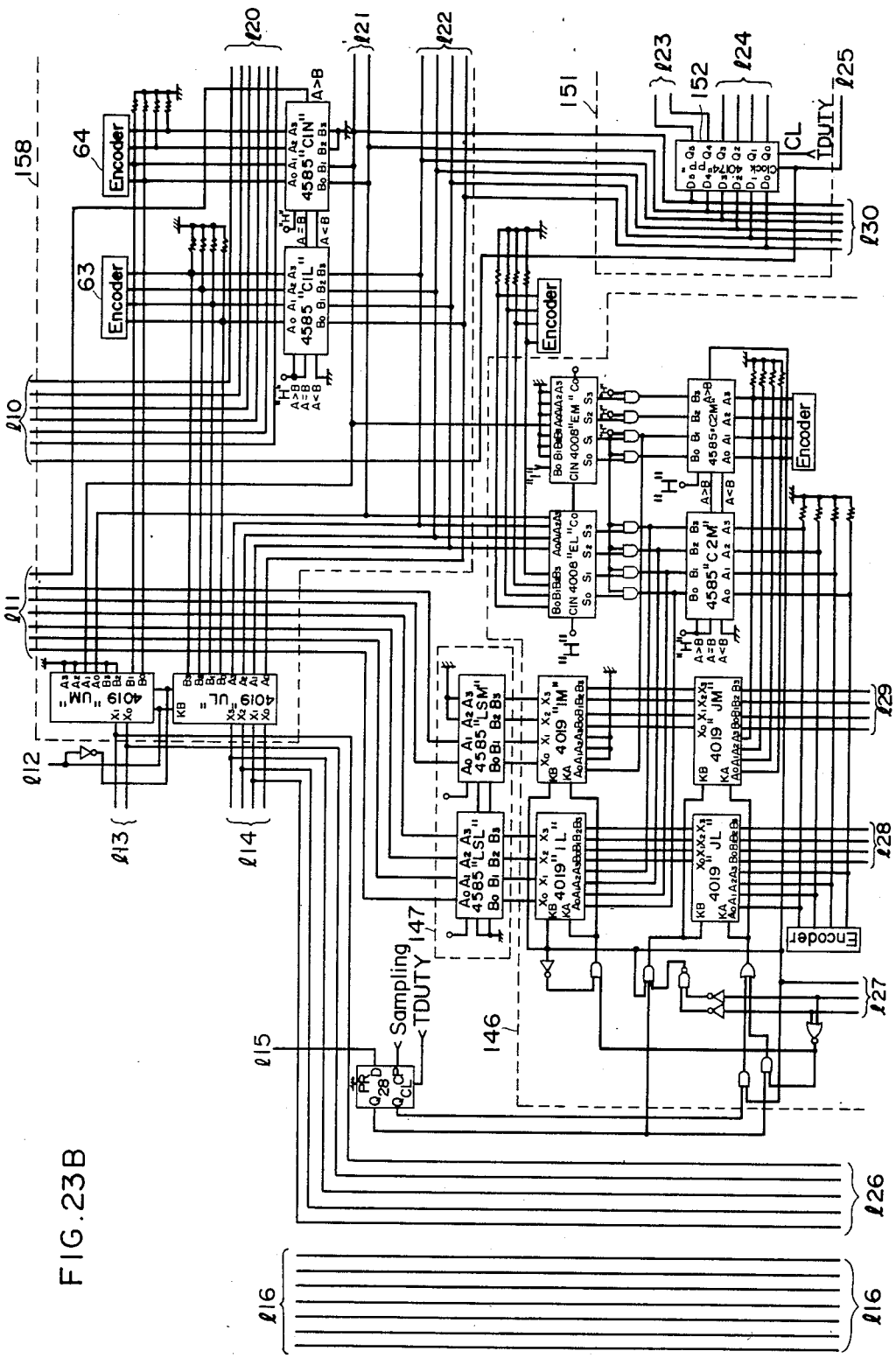
Figure 23C:
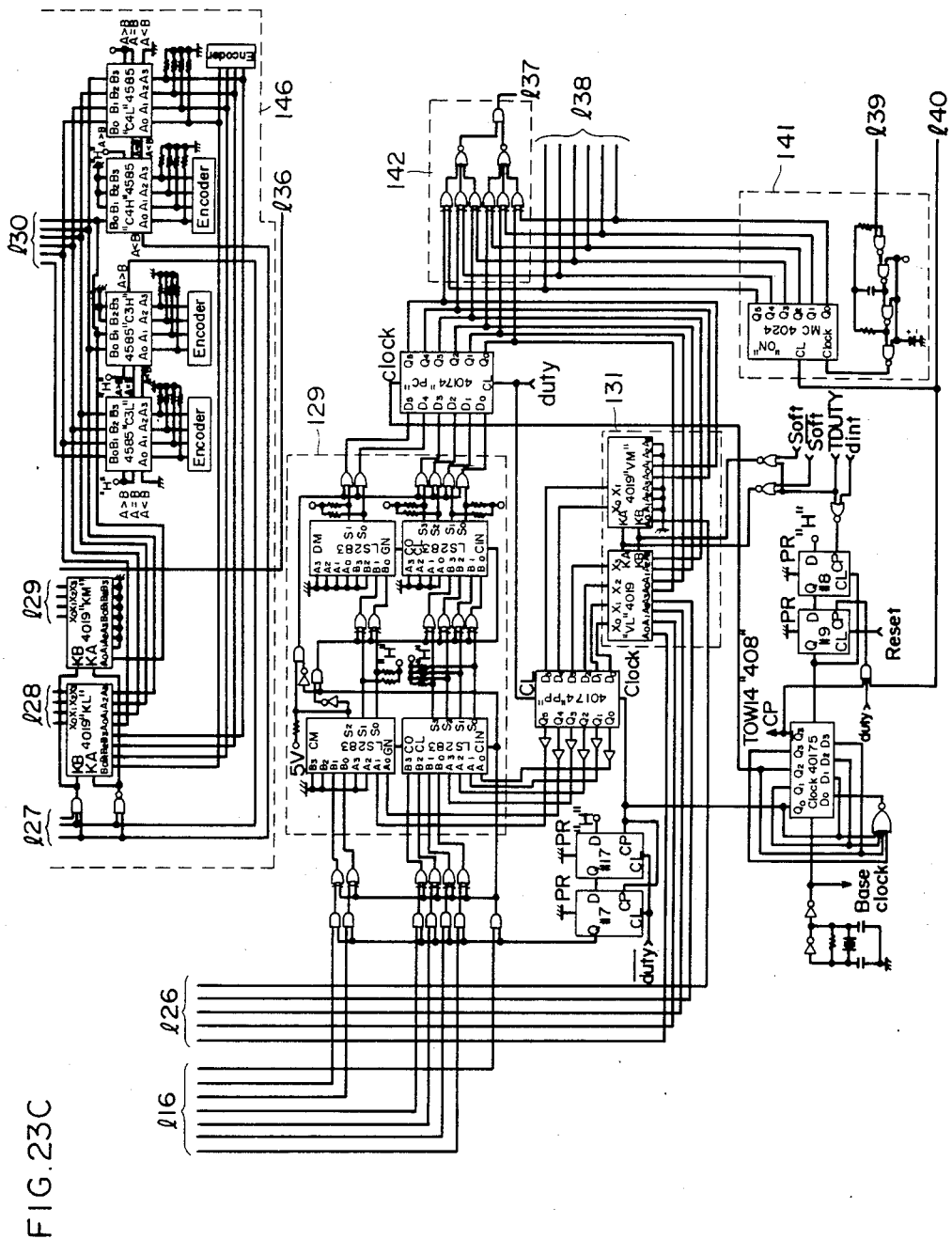
Figure 23D:
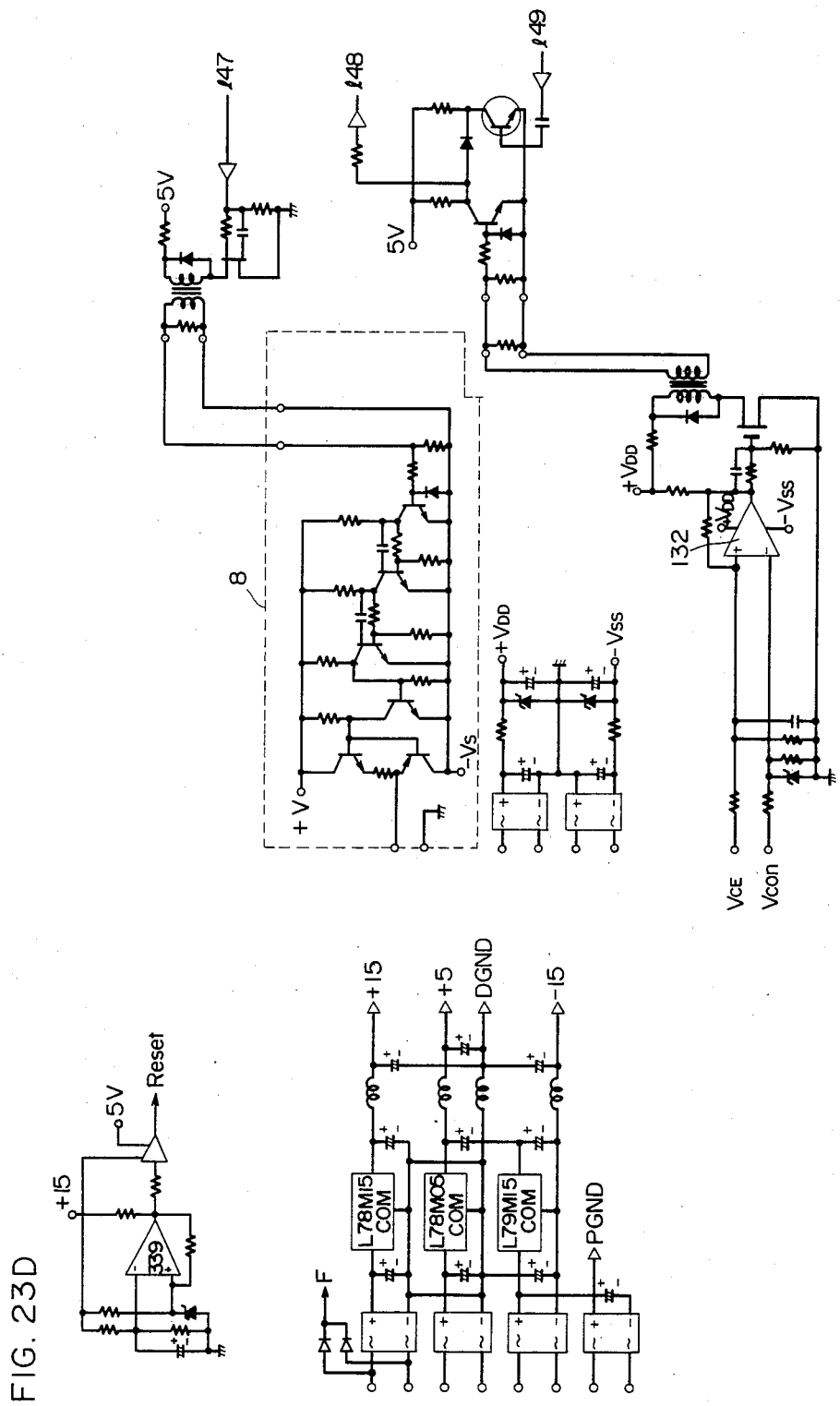
Figure 23E:
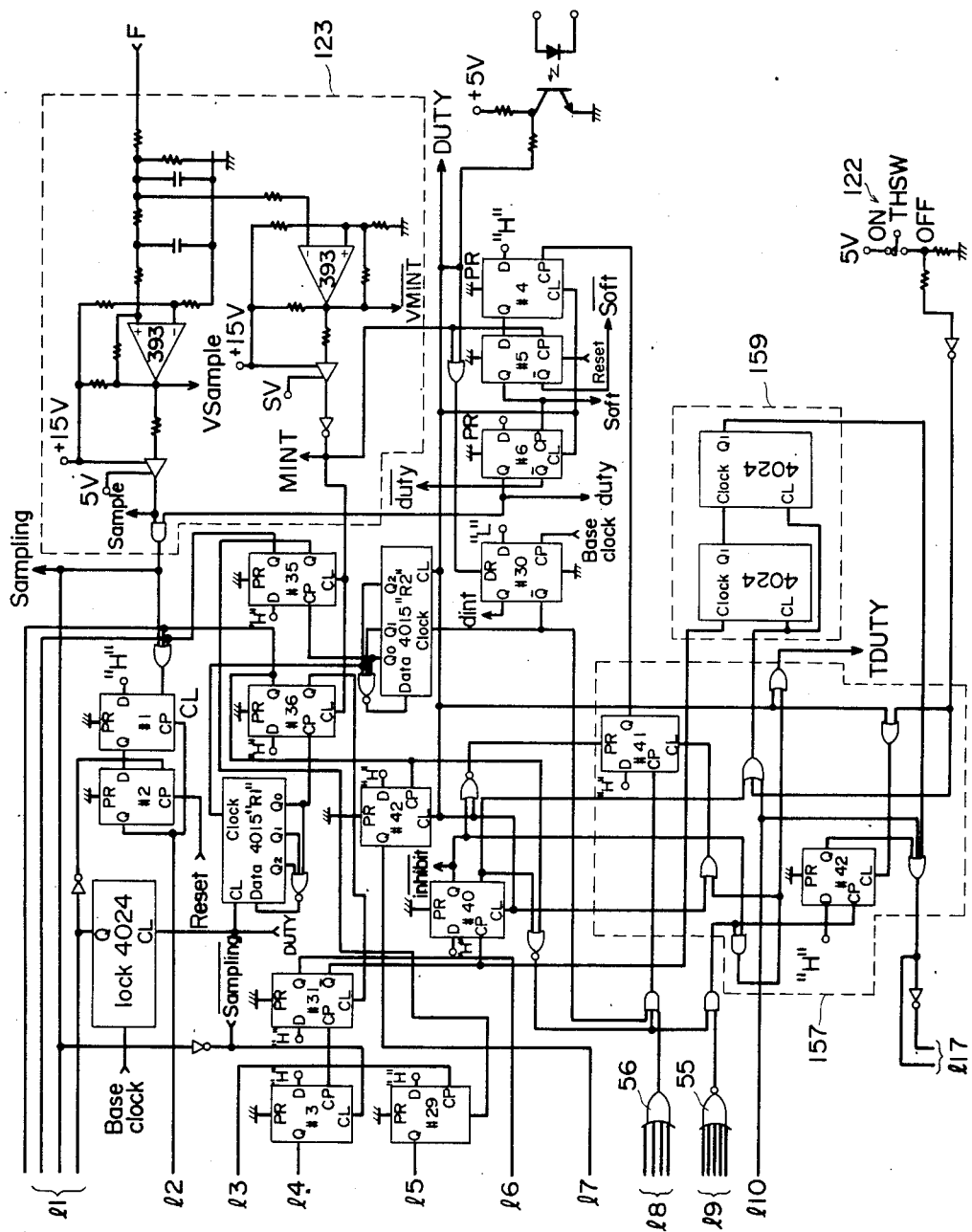
Figure 23F:
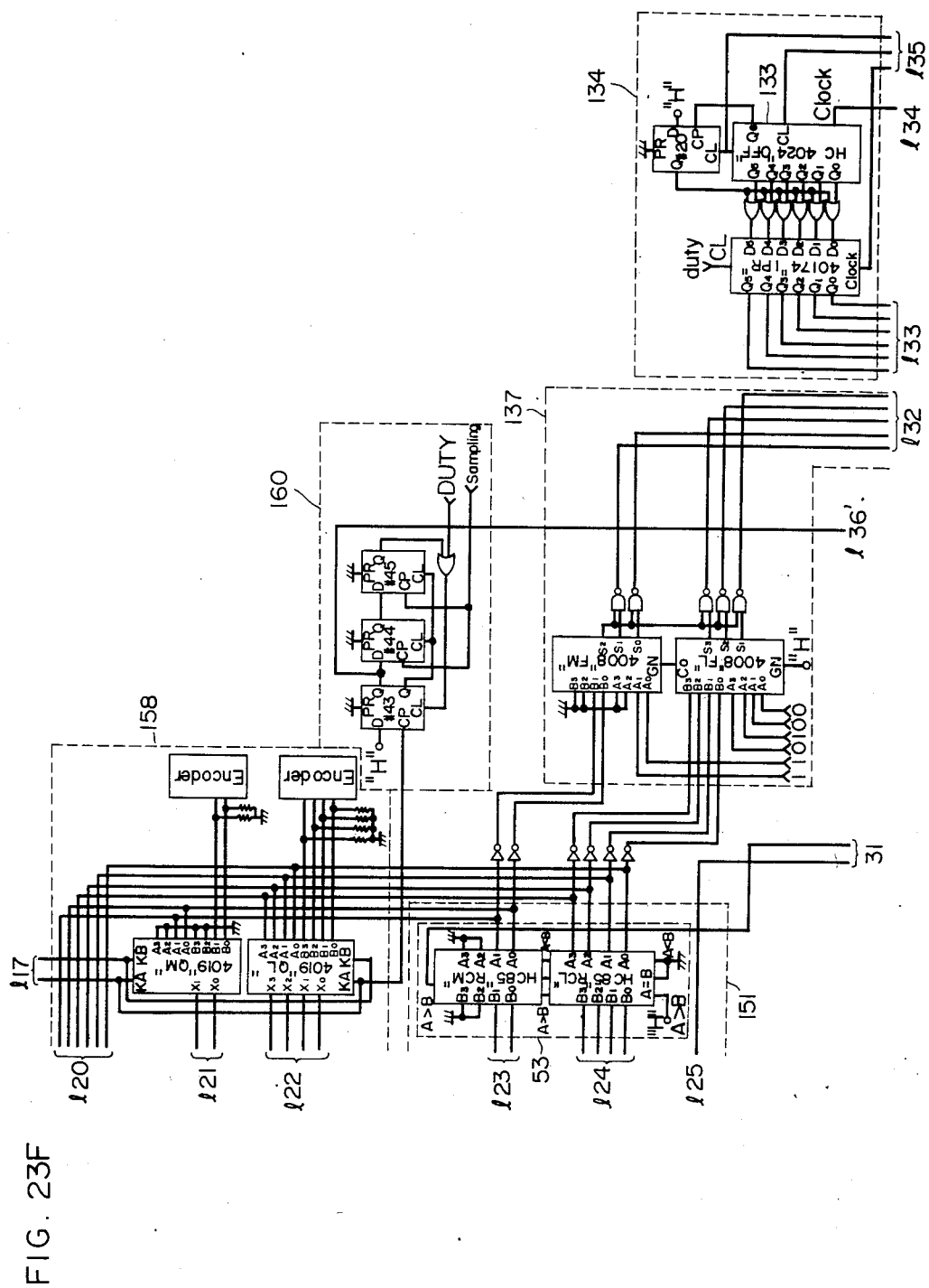
Figure 23G:
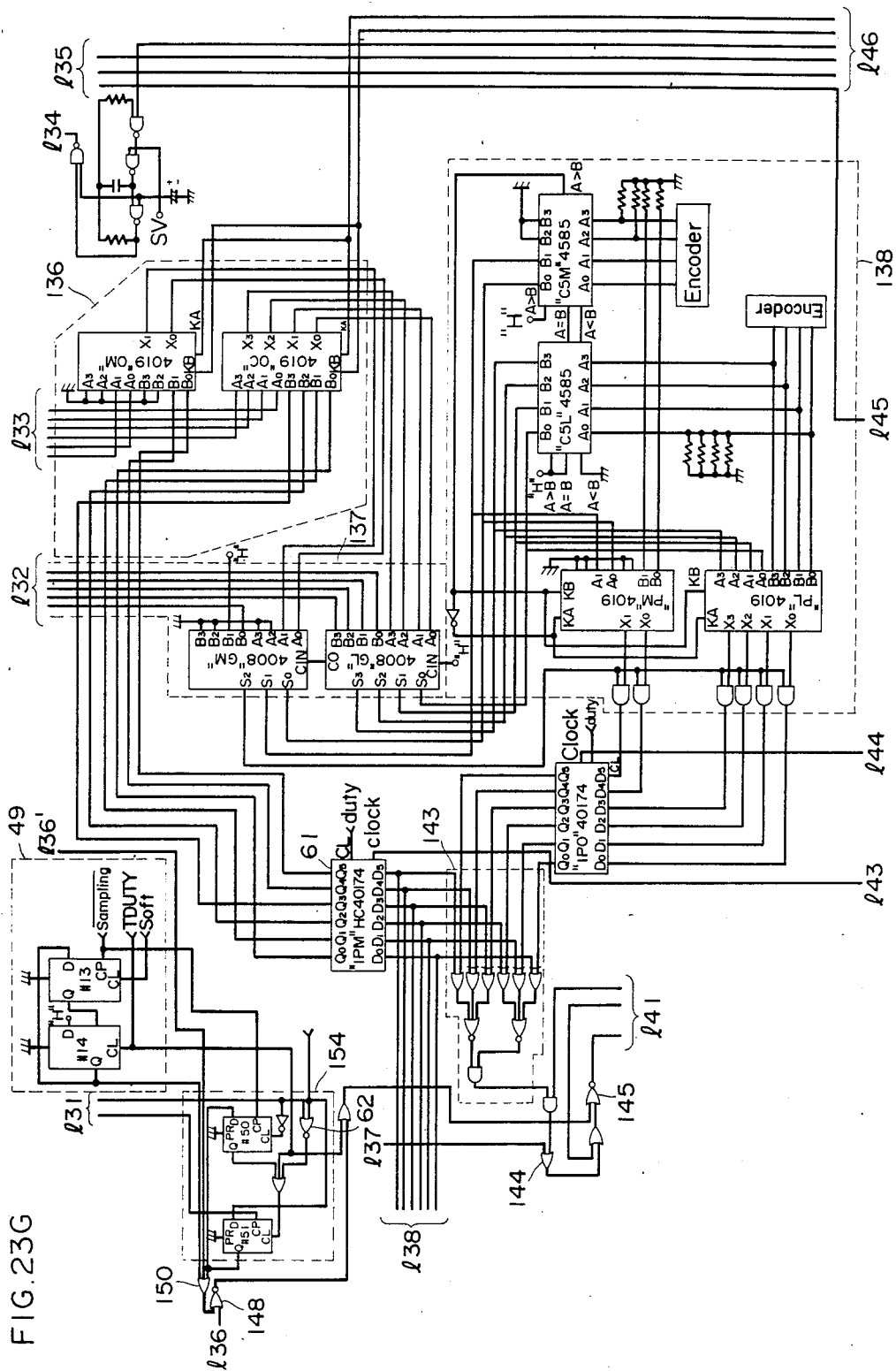
Figure 23H:
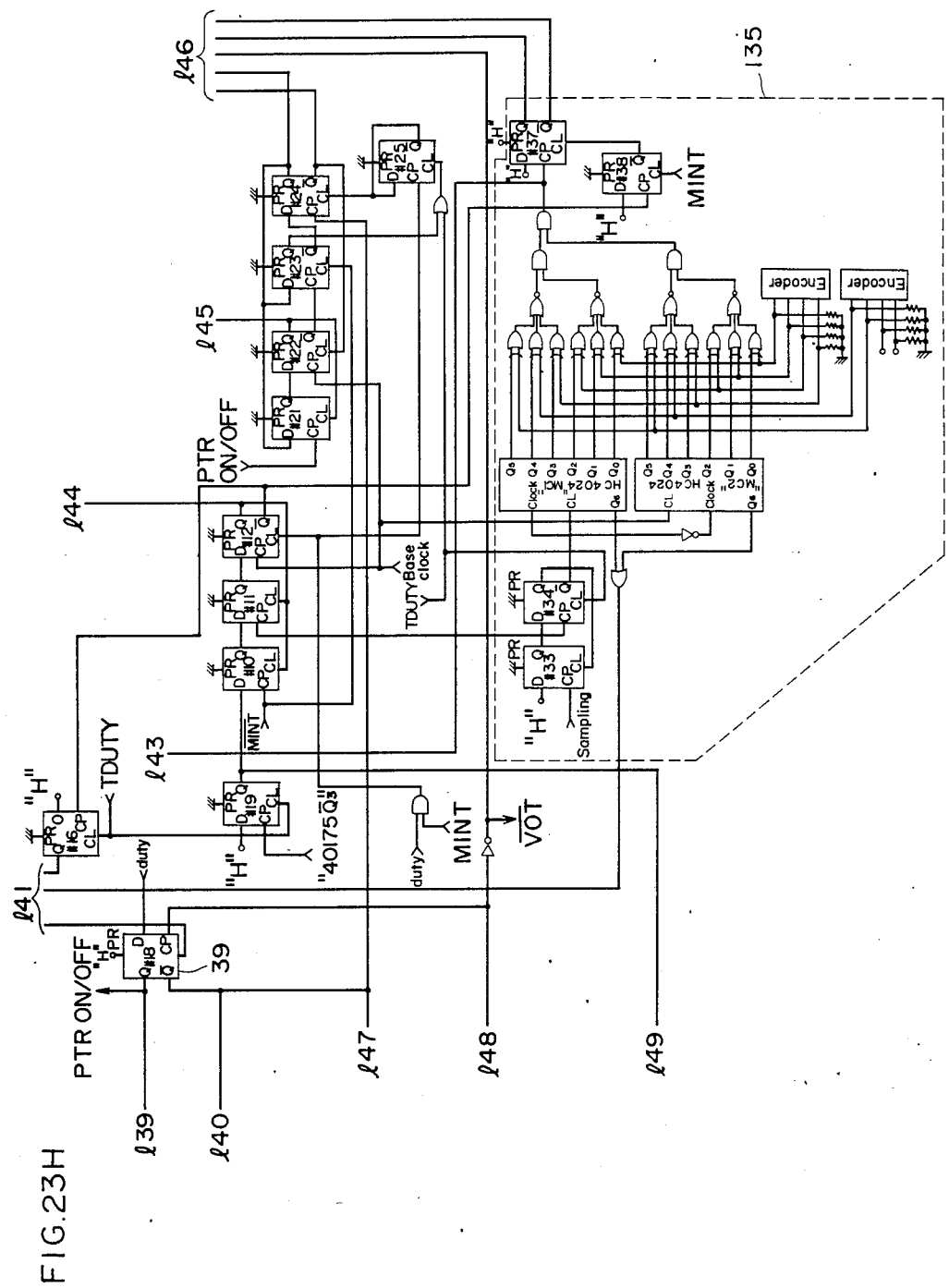

The timing chart at that time is shown in FIG. 26, in which reference numerals #14, #27 and #28 designate the flip-flop circuits shown in FIGS. 23G, A and B.

On the other hand, the small object detection level PLS of power setting data Pref corrected by the circuit for setting level of small object 146 is compared with the data PAD to thereby carry out the small object detection. In other words, in a case where the value of PAD becomes smaller than the small object detection level PLS adjusted corresponding to an increase and decrease of power setting data Pref, assuming that the small object load is disposed in proximity to the heating coil 4, the small object detecting circuit 147 gives a clear signal to the flip-flop circuit 139 through a NOR gate 148 and a NOR gate 145.

However, since the soft start is carried out in the initial oscillation of inverter, the value of power setting data Pref is larger, but the on duration data Pcon is smaller so that there is a fear that the small object detecting circuit 147 carries out the small object detection. Hence, during the soft start operation, the first circuit for inhibiting detection of small object 149 gives the signal to the NOR gate 148, but the small object detecting circuit 147 is adapted not to give the signal to the flip-flop 139. In addition, the timing chart at that time is shown in FIG. 27, in which reference numerals #13 and #14 designate two flip-flop circuits constituting the first circuit for inhibiting detection of small object 149 as shown in FIG. 23G.

Figure 28:
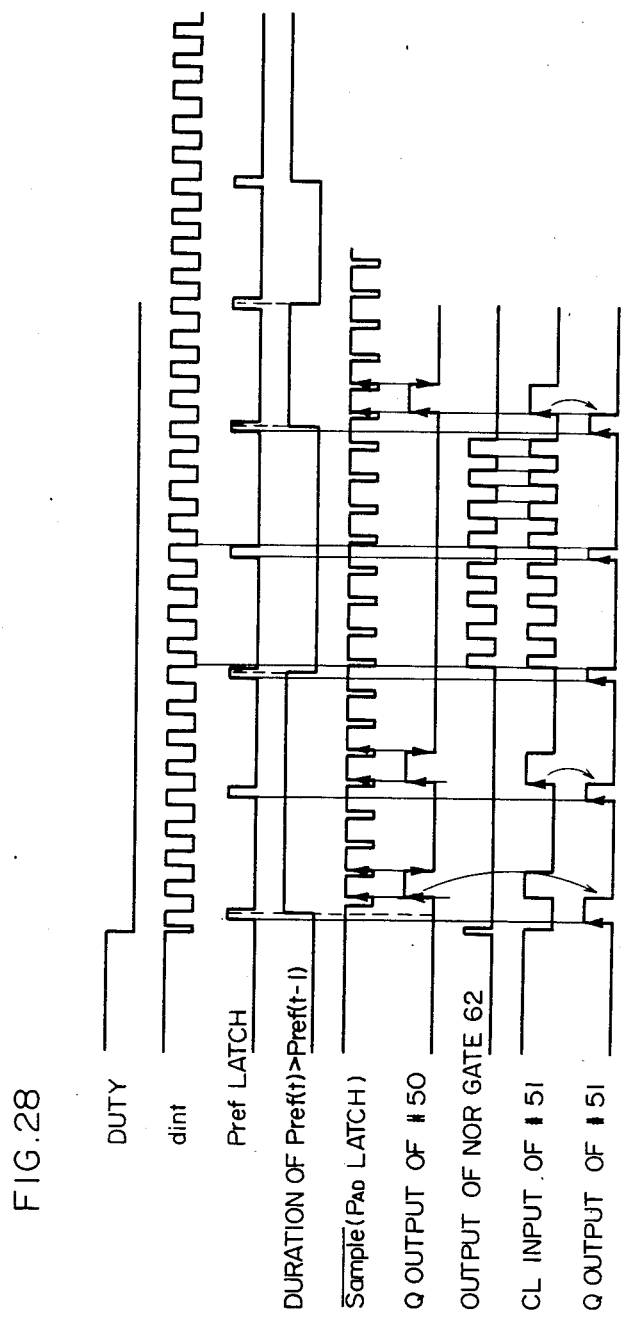

Even when the input power setting circuit 117 is operated to raise the power setting data Pref, the input data PAD does not change until the next sampling time. Hence, the input data PAD does not change in spite that the small object detection level PLS rises due to a rise of power setting data Pref, whereby there is a fear that the small object detecting circuit 147 carries out the small object detection. The variation detecting circuit 151, however, detects whether or not the value of power setting data Pref increases, so that when the power setting data Pref rises, that is, when Pref(t)->Pref(t−1) is obtained, the Q output at the flip-flop circuit #51 of the first circuit for inhibiting detection of small object 149 is put at the "H" level to inhibit the small object detection for the period from the latch timing for the power setting data Pref, that is, the timing for the dint signal in synchronism with the MINT signal, to the latch timing for the input data PAD, that is, the timing for the Sample signal, by the third latch circuit 126. The timing chart at this time is shown in FIG. 28. In addition, the flip-flop circuits #50 and #51 and NOR gate 62 are shown in FIG. 23G.

Furthermore, in such apparatus, when the thermal operation is carried out, the set value by the input power setting circuit 117, as abovementioned, is set 1300 W and the gates of data selector 157 operates to allow the switching circuit 158 to select Pref or P'ref to thereby decide the heating output to be 1300 W or 500 W. Hence, when the heating output is switched from 500 W to 1300 W, even proper load has the fear of being decided to be a small object similarly to the above. In order to avoid the fear, this control circuit, when the gates of data selector 157 operates the switching circuit 158 to switch the heating output from 500 W to 1300 W, the third circuit for inhibiting detection of small object 160 also sends the inhibiting signal to the OR gate 150, so that the inhibiting signal is output continuously until the timing for subsequently latching the input data PAD, in other words, until the timing for the next Sample signal.

Figure 29:
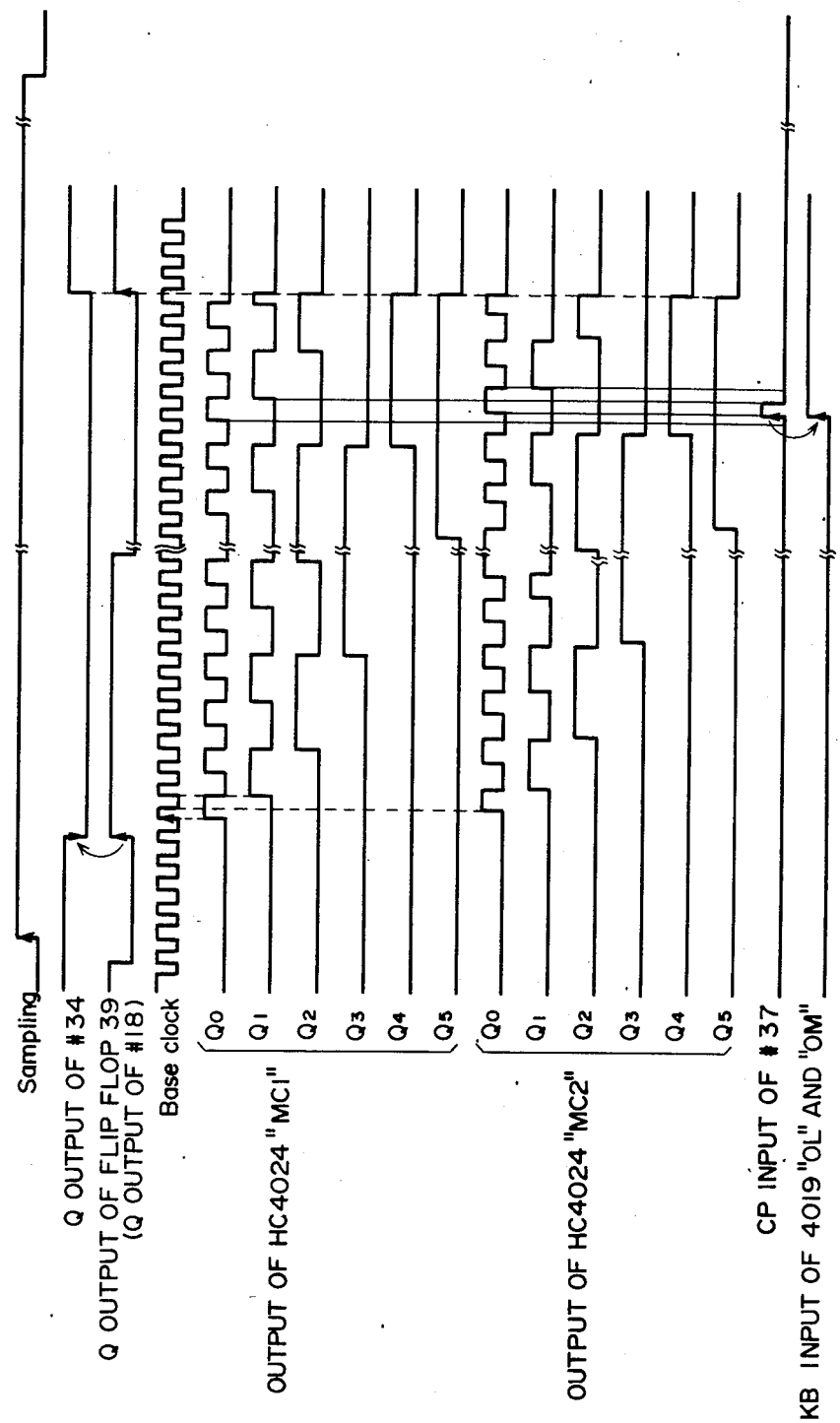

FIG. 29 is a timing chart showing operation of the lowest frequency certifying circuit 135 for certifying the oscillation frequency of the inverter to be 20 kHz or more. The lowest frequency certifying circuit 135 detects for a period of Sample signal whether the oscillation frequency is 20 kHz or more, in other words, whether the time period from the beginning of off duration of switching element 6 to the next off duration is 50 $\mu$second or less, so that when the time period exceeds 50 $\mu$sec, the switching element 6 is off and a count value of on duration counter 141 at this time is held in a data holding circuit 161 comprising HC 40174 (shown in FIG. 23G), thereby being adapted to be given to the selector 136. As seen from FIG. 29, in the lowest frequency certifying circuit 135, when the Q terminal output of flip-flop #37: the component of circuit 135, rises, whose signal is given to the KB terminals of 4019 "OL" and 4019 "OM" constituting the data selector 136, whereby the data from the data holding circuit 161 is adapted to be selected by the date selector 136.

In such induction heating apparatus, when the output operation system carries out the heating operation, the heating output by the input power setting circuit 117 may at starting be set smaller to be 200 W. In such case, the power setting data Pref A/D converted by the A/D converting circuit 121 and latched by the second latch circuit 125, is small, whereby the input current value detected by the input power detecting circuit 13 is also small. Accordingly, the input data PAD of A/D converted input current value becomes small, so that a difference in PAD in a loading condition is difficult to appear to make it difficult to discriminate an unsuitable load, such as a small object load. In order to eliminate such inconvenience, the switching circuit 158 operates as follows: Encoders 63 and 64 (both shown in FIG. 23B) within the switching circuit 158 set data APref at the predetermined level and the first power setting data Pref(1) A/D converted after oscillation of inverter starts, is compared by comparators 4585 "CIL" and "CIM" (both shown in FIG. 23B), so that a larger one either of Pref(1) or APref is selected by data selectors 4019 "UL" and "UM" (both shown in FIG. 23B) and sent to the SUB circuit 128. Hence, when Pref(1)<A-Pref, the following equations are obtained:

Pcon(1)=Soft

Pcon(2)=Soft+(APref−PAD(1)).

The next on duration data Pcon is converted to obtain the following equation:

Pcon(3)=Pcon(1)+(Pref−PAD(2)).

Figure 30:
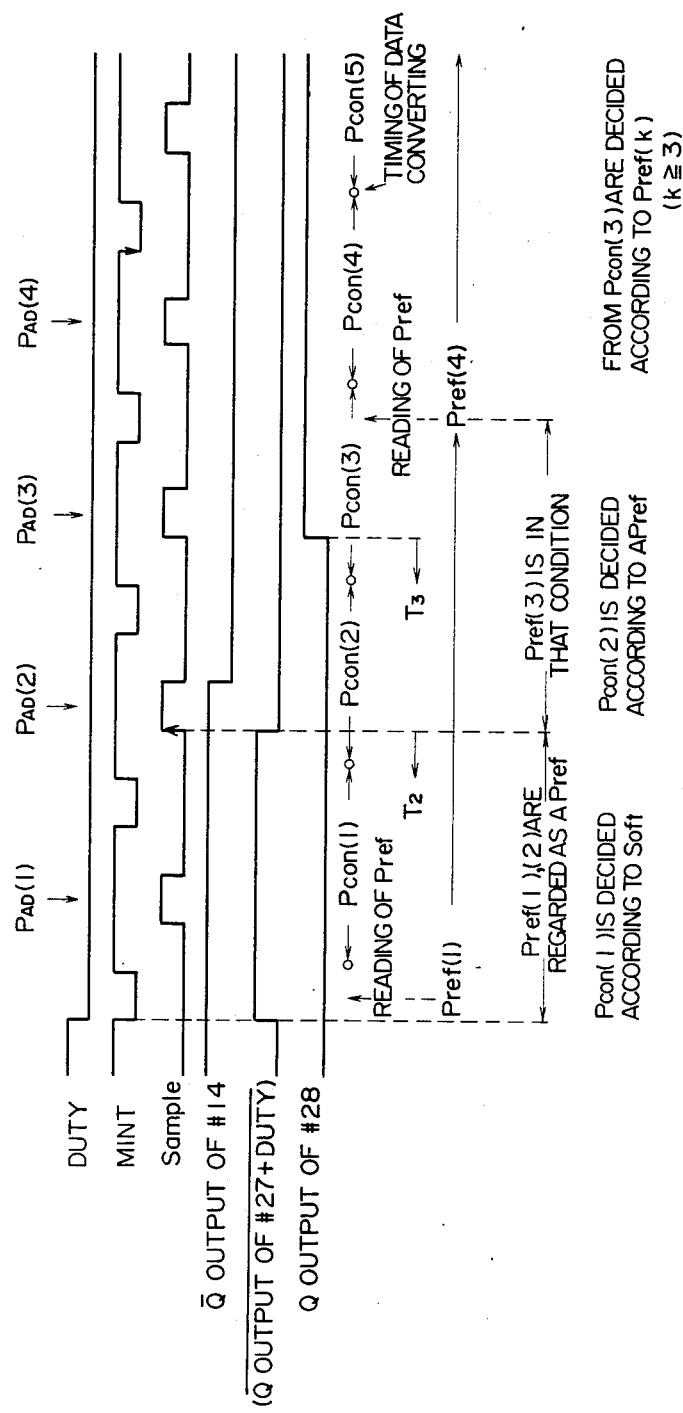

Thus, a normal output control condition is restored. Such timing control is carried out by the aforesaid flip-flop circuits #26 and #27 (see FIG. 23A). Therefore, coupled inductance with the heating coil is larger so that even a load, whose input is not so rapidly raised, is not detected as the small object by mistake. The timing chart at this time is shown in FIG. 30. Also, such switching circuit 158 operates to vary Pcon, in which the small object detection level PLS at the circuit for setting level of small object 146 corresponding to the change in Pcon is corrected to be twice reset.

Figure 31:
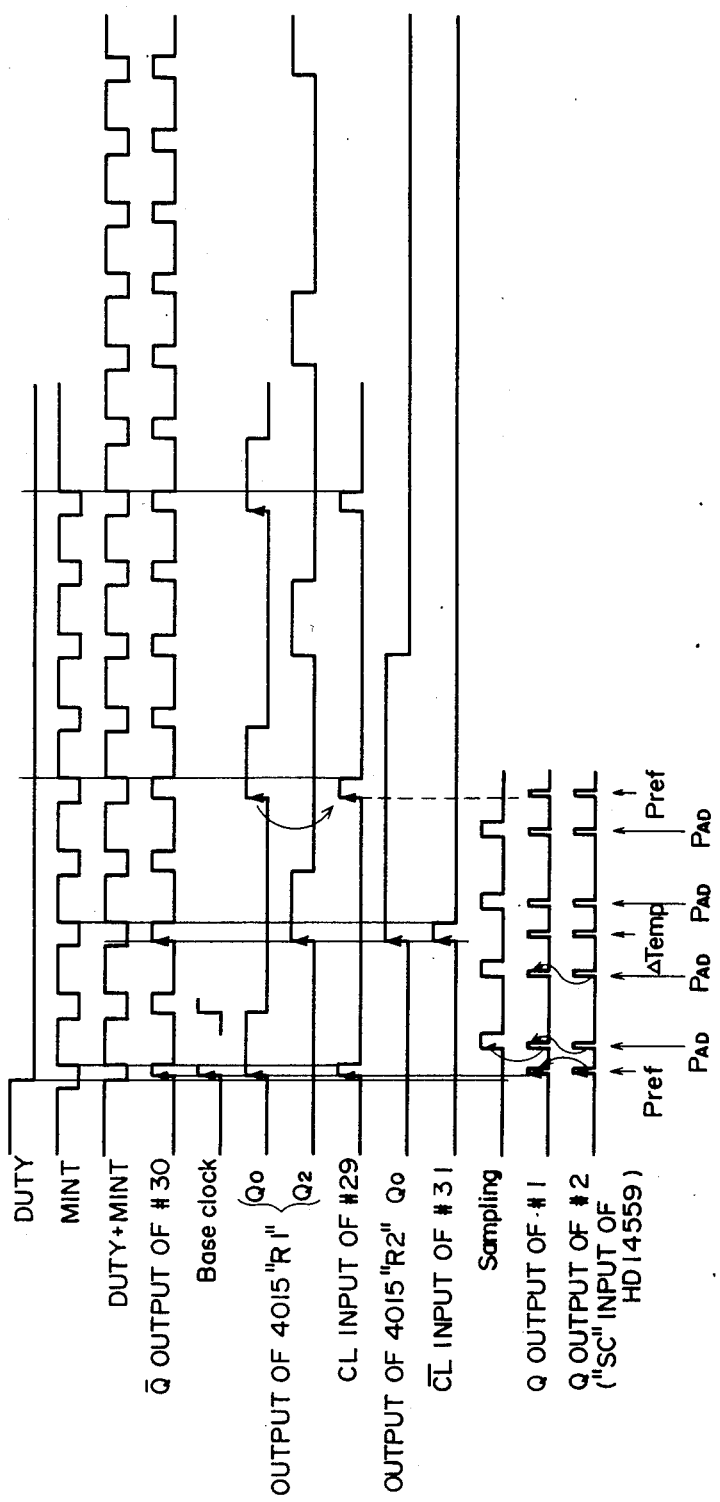

FIG. 31 shows the timing of A/D conversion at the A/D converting circuit 121, in which the duration of base clock is enlarged. In this drawing, the input current detected by the input detection circuit 113, as above-mentioned, is A/D converted into input data PAD with the timing for the Sample signal, and the temperature difference detected by the temperature difference detecting circuit 116 and the set input set by the input power setting circuit 117 are converted into a temperature difference data ΔTemp and power setting data Pref with the timings for the MINT signal not to superpose the timing to each other. In other words, in this embodiment, the A/D conversion from the set input value to the digital power setting data Pref is carried out with the timing for receiving the MINT signal once per four times and that from the temperature difference signal to the digital temperature difference data ΔTemp is done with the timing for receiving MINT signal once per 16 times not to superpose the timing to each other.

Also, in the control circuit of this embodiment, the count value of on duration counter 141 is limited correspondingly to that at the resonance duration counter 133, thereby limiting an on duration length to expect the overcurrent protection similarly to the above-mentioned. Also, the lowest frequency certifying circuit 135, as the same as in the FIG. 17 embodiment, limits the on duration length to keep the oscillation frequency of inverter not less than 20 kHz.

Figure 32:
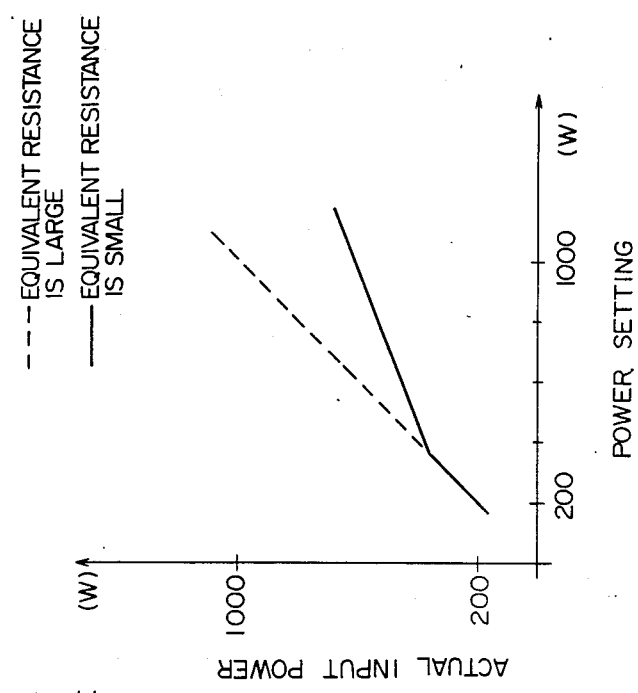
FIG. 32 shows a characteristic of actual input power with respect to the set power value when no correction is carried out by a correcting circuit at the eighth embodiment.
Figure 33:
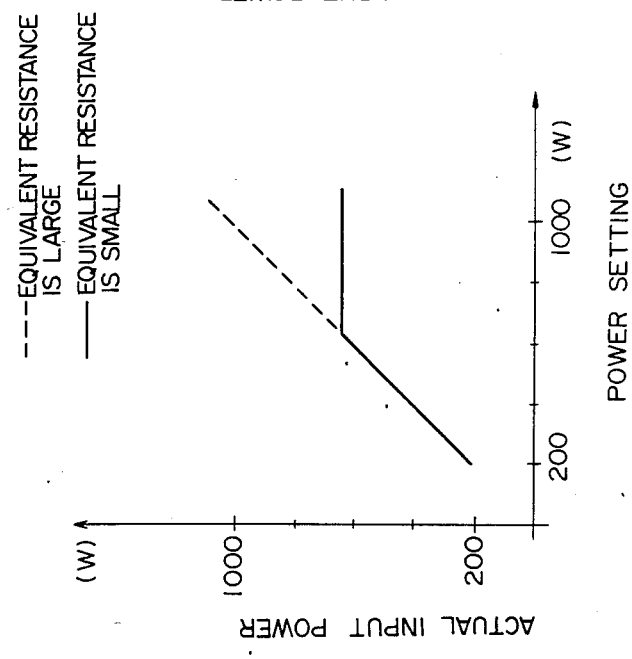
FIG. 33 shows a characteristic of the actual input power with respect to the set power value when correction is carried out by the correcting circuit.
Figure 34:
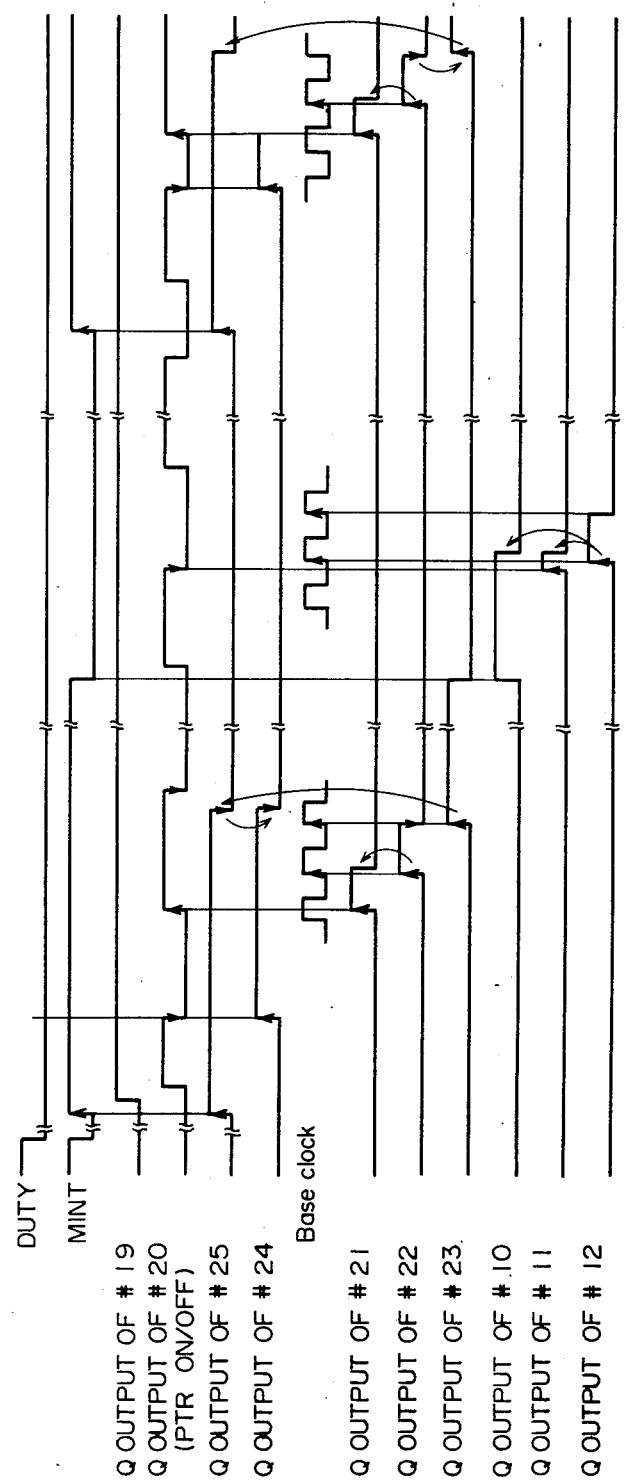

Accordingly, in a case where the cooking utensil 12 is smaller in equivalent inductance, or larger in the same, such construction is limited in the on duration even when the set value by the on duration setting circuit 117 is made larger, whereby the actual heating output, as shown in FIG. 32, does not increase over a certain set value, resulting in the inconvenience for use. In order to eliminate such inconvenience, the control circuit of the embodiment generates by the 4008 "FL" and "FM" (see FIG. 23F) within the correction circuit 137 a difference 52−Pref of subtracting Pref from a count value 52 (in binary notation, "110100") of the count value by the on duration counter 141 and corresponding to the maximum set input power of 1300 W, the value 52−Pref and the data IP′con from the data selector 136 are used to compute IP′con−(52−Pref)/2 by 4008 "GL" and "GM" (see FIG. 23G), which value is output as the limiting data IPcon for the on duration, IPcon being compared with BPcon set by the minimum value setting circuit 138. When IPcon≧BPcon, IPcon is adapted to be given to the second comparator 143, and when IPcon<BPcon, BPcon is adapted to do so. Hence, the heating output, as shown in FIG. 33, increases corresponding to an increase in the set value of input power, thereby being inconvenient to usage. Also, the minimum value setting circuit 138 sets the minimum value of IPcon to clarify a difference between the input powers due to the unsuitable load and suitable one, thereby enabling accurate load detection. FIG. 34 shows the timing chart representing operations of the fourth latch circuit 134, data selector 136, correcting circuit 137 and minimum value setting circuit 138, where the time base of base clock is enlarged.

In addition, for reference, parts used in the control circuits shown in FIGS. 23A through H are shown of article number, function, and makers, in the following table.

TABLE

| Article No. | Function | Manufacturer |
|---|---|---|
| HD 14559 | Successive Approximation Registers | Hitachi |
| μ PD 603D | D/A Converter (6 bits) | NEC |
| 40174 | D-FF (6 bits) | Toshiba |
| 4019 | AND-OR (4 bits) Data Selector | Tokyo Sanyo |
| 4008 | Full Adder (4 bits) | Toshiba |
| 4585 | Comparator (4 bits) | Moto Rora |
| 4024 | 7-Stage Counter | NEC |
| HC 85 | Comparator (4 bits) | Moto Rora |
| LS 283 | Full Adder (4 bits) | Hitachi |
| 40175 | D-FF (4 bits) | Toshiba |
| HC 4024 | 7-Stage Counter | Moto Rora |
| 4015 | Shift Register (4 bits) | NEC |

As seen from the above, in this embodiment, when in thermal operation, the heating output is switched alternatively 500 W and the maximum 1300 W while the detected temperature Tth by the temmperature detecting circuit 114 is rising up to the set temperature Pref. Hence, the power is effectively used in the heating process until the detected temperature Tth reaches the set temperature Tref.

Also, this embodiment has inhibiting means for inhibiting oscillation stop by the unsuitable load detecting circuit from a change in the value of power setting data Pref until the input current value next is A/D converted to give new input data PAD, thereby inhibiting the oscillation stop due to the unsuitable load detection circuit from a change in Pref to that in PAD, thereby being free from the inconvenience to stoppage of apparatus due to malfunction by a proper load during the heating operation, thus enabling exact load detection.

In addition, the control circuit of the induction heating apparatus of the invention is applicable to an induction heating apparatus which is controlled by duty controlling.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. In an induction heating apparatus provided with:
   a rectifying circuit for rectifying an AC power source,
   an induction heating coil connected to said rectifying circuit,
   a resonance capacitor constituting together with said induction heating coil a resonant circuit, and
   a switching element connected to said resonant circuit and allowing said resonant circuit to generate a resonance current, so that said switching element is ON/OFF controlled to allow said resonant circuit to generate said resonance current, an oscillation control circuit comprising:
   a power setting circuit for setting a heating output and outputting a signal corresponding thereto as a digital power setting data signal Pref;
   an on duration setting circuit which stores outputs a digital duration data signal Pcon which corresponds to the time duration during which said switching element is on in order to obtain said heating output set by said power setting circuit;
   a resonance duration detecting circuit for detecting a resonance duration time period wherein a terminal voltage of said switching element is larger than a predetermined voltage after said switching element is turned off;
   an overcurrent protection circuit which counts said resonance duration time period detected by said resonance duration detecting circuit and outputs digital data corresponding to the results of said counting as limiting digital data signals Icp, and
   a time counter which starts time counting by turning on said switching element so that when the result of time counting coincides with said digital duration data Pcon or said limiting digital data Icp, said switching element is given an off signal.

2. The oscillation control circuit in the induction heating apparatus as set forth in claim 1, wherein a clock signal for said time counter is provided by a separate clock generator.

3. The oscillation control circuit in the induction heating apparatus as set forth in claim 1, further comprising a soft start circuit for outputting digital data of a smaller value than said heating output set in said power setting circuit as an initial value of said digital duration data signal Pcon stored in said on duration setting circuit.

4. The oscillation control circuit in the induction heating apparatus as set forth in claim 1, wherein said digital data signal Pcon output from said on duration setting circuit is fed to said time counter through a switching means so that said switching element is fed an off signal only when said time counting value of said time counter coincides with said digital limiting data signal Icp.

5. The oscillation control circuit in the induction heating apparatus as set forth in claim 4, wherein said switching means is actuated only when said heating output is set maximum.

6. The oscillation control circuit in the induction heating apparatus as set forth in claim 1, further comprising a correcting circuit for correcting said digital limiting data Icp to increase corresponding to the increment of said digital power setting data signal Pref.

7. In an induction heating apparatus provided with:
   a rectifying circuit for rectifying an AC power source,
   an induction heating coil connected to said rectifying circuit, and
   a switching element connected to said induction heating coil, so that said switching element is ON/OFF controlled to allow said induction heating coil to generate an oscillating current, an oscillation control circuit comprising:
   an input current detecting circuit for detecting an input current value from said AC power source;
   an A/D converting circuit for converting the input current value detected by said input current detecting circuit into digital input data PAD;
   a power setting circuit for setting a heating output and outputting a digital power setting data signal Pref corresponding thereto;
   an on duration setting circuit which stores digital on duration data Pcon corresponding to the last on duration of said switching element and corrects the last digital on duration data Pcon by said input data PAD output from said A/D converting circuit and said power setting data Pref output from said power setting circuit, thereby outputting and storing the next digital on duration data Pcon, and
   an on duration time counter which starts time counting when said switching element is on, and outputs an off signal to said switching element when the result of said time counting coincides with the digital on duration data Pcon stored in said on duration setting circuit.

8. The oscillation control circuit in the induction heating apparatus as set forth in claim 7, wherein said A/D converting circuit samples said input current at the phase at which the output of said rectifying circuit is substantially at its peak.

9. The oscillation control circuit in the induction heating apparatus as set forth in claim 7, wherein a clock signal for said on duration time counter for is provided by a separate clock generator.

10. The oscillation control circuit in the induction heating apparatus as set forth in claim 7, wherein said on duration setting circuit comprises a subtraction circuit for obtaining a difference between the input digital data PAD of m-bits and the digital power setting data Pref of m-bits and
    further comprises an adder which outputs new digital on duration data Pcon by changing said digital on duration data Pcon stored therein as digital data of n-bits ($n \geq m$) and corresponding to the duration during which said switching element is to be on only to an extent of Pref-PAD of the computation result of said subtraction circuit.

11. The oscillation control circuit in the induction heating apparatus as set forth in claim 10, wherein said on duration setting circuit outputs new digital on duration data Pcon at the phase at which the output of said rectifying circuit is at a near zero level.

12. The oscillation control circuit in the induction heating apparatus as set forth in claim 10, further comprising a data clear circuit which makes said Pref-PAD of computation result of said subtraction circuit equal to zero.

13. The oscillation control circuit in the induction heating apparatus as set forth in claim 10, further comprising a decoder which decodes all bits of said digital on duration data Pcon into "1" when said adder outputs a carry signal.

14. The oscillation control circuit in the induction heating apparatus as set forth in claim 7, further comprising a soft start circuit which outputs digital data of a value which is smaller than the heating output set in said power setting circuit as an initial value of said digital on duration data Pcon stored by said on duration setting circuit.

15. The oscillation control circuit in the induction heating apparatus as set forth in claim 7, wherein said digital on duration data Pcon of the output from said on duration setting circuit is fed to said on duration time counter through a switching means so that said switching element is fed an off signal only when a time counting value of said on duration time counter coincides with a predetermined limiting data value Icp.

16. The oscillation control circuit in the induction heating apparatus as set forth in claim 7, wherein said A/D converting circuit converts the input signal into digital data only once per a plurality of sampling cycle periods.

17. An induction heating apparatus as set forth in claim 7, wherein said A/D converting circuit converts the input signal into digital data only once per a plurality of sampling cycle periods.

18. In an induction heating apparatus provided with:
a rectifying circuit for rectifying an AC power source,
an induction heating coil connected to said rectifying circuit, and
a switching element connected to said induction heating coil, so that said switching element is ON/OFF controlled to allow said induction heating coil to generate an oscillating current, an oscillation control circuit comprising:
an input current value detecting circuit for detecting the input current value from said AC power source;
an A/D converting circuit for converting into digital input data PAD the input current value detected by said input current value detecting circuit;
a power setting circuit for setting the heating output and for outputting a digital power setting data signal Pref corresponding thereto;
an unsuitable load detecting circuit which compares said input data PAD with said power setting data Pref to determine if the load is suitable, and
an inhibiting circuit which inhibits actuation of said unsuitable load detecting circuit until said A/D converting circuit carries out a next A/D conversion of the input current value when said power setting data Pref output from said power setting circuit varies.

19. The oscillation control circuit in the induction heating apparatus as set forth in claim 18, wherein said A/D converting circuit converts the input signal into digital data only once per a plurality of sampling cycle periods.

20. In an induction heating apparatus provided with:
a rectifying circuit for rectifying an AC power source,
an induction heating coil connected to said rectifying circuit, and
a switching element connected to said induction heating coil, so that said switching element is ON/OFF controlled to allow said induction heating coil to generate an oscillating current, an oscillation control circuit comprising:
a temperature setting circuit for setting a heating temperature;
a temperature detecting circuit for detecting a temperature of an object to be heated;
a temperature difference detecting circuit for detecting the difference between the value set by said temperature setting circuit and the value detected by said temperature detecting circuit, and
a heating output switching circuit which repeatedly switches heating output determined by an on duration of said switching circuit to be relatively larger heating output and relatively smaller heating output after said oscillating current of said induction heating coil starts until a value detected by said temperature difference detecting circuit reaches zero and selects one of said heating outputs after said detected value reaches zero, so that after said detected value reaches zero, the commencement and cessation of said oscillating current of said heating coil are alternatively repeated correspond to the variation of said value detected by said temperature detecting circuit.

21. The oscillation control circuit in the induction heating apparatus as set forth in claim 20, wherein said temperature detecting circuit is disposed between said object to be heated and said induction heating coil.

* * * * *